(12) United States Patent
Park et al.

(10) Patent No.: US 10,608,797 B2
(45) Date of Patent: Mar. 31, 2020

(54) DISTRIBUTED UNIT CONNECTION ISSUE

(71) Applicants: Kyungmin Park, Herndon, VA (US);
Esmael Dinan, Herndon, VA (US);
Alireza Babaei, Fairfax, VA (US);
Hyoungsuk Jeon, Centreville, VA (US)

(72) Inventors: Kyungmin Park, Herndon, VA (US);
Esmael Dinan, Herndon, VA (US);
Alireza Babaei, Fairfax, VA (US);
Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/011,363

(22) Filed: Jun. 18, 2018

(65) Prior Publication Data

US 2018/0368204 A1    Dec. 20, 2018

Related U.S. Application Data

(60) Provisional application No. 62/520,952, filed on Jun. 16, 2017, provisional application No. 62/520,943, (Continued)

(51) Int. Cl.
*H04L 12/24* (2006.01)
*H04L 5/00* (2006.01)
(Continued)

(52) U.S. Cl.
CPC .......... *H04L 5/0048* (2013.01); *H04L 41/06* (2013.01); *H04W 16/28* (2013.01);
(Continued)

(58) Field of Classification Search
CPC ...... H04W 76/30; H04W 88/08; H04L 12/24; H04L 41/06
See application file for complete search history.

(56) References Cited

U.S. PATENT DOCUMENTS

| 2010/0003982 A1* | 1/2010 | Somasundaram .... H04L 1/1877 455/436 |
| 2013/0136015 A1* | 5/2013 | Ojala ...................... H04L 5/001 370/252 |

(Continued)

OTHER PUBLICATIONS

3GPP TS 38.401 V0.2.0 (Jul. 2017); Technical Specification; 3rd Generation Partnership Project; Technical Specification Group Radio Access Network; NG-RAN; Architecture description (Release 15).

(Continued)

*Primary Examiner* — Chi Ho A Lee
(74) *Attorney, Agent, or Firm* — David Grossman; Kavon Nasabzadeh; Philip Smith

(57) ABSTRACT

A base station central unit may transmit packet data convergence protocol (PDCP) packets of a radio bearer. The base station distributed unit may transmit the PDCP packets to a wireless device via the radio bearer. The base station central unit may receive, from a base station distributed unit, a first message comprising a first data radio bearer identifier of the radio bearer to be released. The first message may initiate a bearer release procedure. The base station central unit may transmit, to the base station distributed unit, a second message confirming release of the radio bearer. The base station central unit may transmit, to the base station distributed unit, a radio resource control message for the wireless device. The radio resource control message may comprise the first data radio bearer identifier. The base station distributed unit may transmit the radio resource control message to the wireless device.

20 Claims, 53 Drawing Sheets

Centralized deployment

Related U.S. Application Data filed on Jun. 16, 2017, provisional application No. 62/522,263, filed on Jun. 20, 2017, provisional application No. 62/522,276, filed on Jun. 20, 2017.

(51) Int. Cl.

| | | |
|---|---|---|
| *H04W 76/34* | (2018.01) | |
| *H04W 72/08* | (2009.01) | |
| *H04W 76/32* | (2018.01) | |
| *H04W 16/28* | (2009.01) | |
| *H04W 72/04* | (2009.01) | |
| *H04W 76/30* | (2018.01) | |
| *H04W 88/08* | (2009.01) | |

(52) U.S. Cl.
CPC ....... *H04W 72/046* (2013.01); *H04W 72/085* (2013.01); *H04W 76/30* (2018.02); *H04W 76/32* (2018.02); *H04W 76/34* (2018.02); *H04W 88/08* (2013.01)

(56) References Cited

U.S. PATENT DOCUMENTS

| | | | | |
|---|---|---|---|---|
| 2015/0223282 A1* | 8/2015 | Vajapeyam | ........... | H04W 76/18 |
| | | | | 370/221 |
| 2015/0280905 A1* | 10/2015 | Shah | ........... | H04L 7/048 |
| | | | | 370/504 |
| 2016/0029376 A1* | 1/2016 | Fukuta | ........... | H04W 72/0426 |
| | | | | 370/329 |
| 2016/0262118 A1* | 9/2016 | Kim | ........... | H04W 52/365 |
| 2017/0013650 A1* | 1/2017 | Fujishiro | ........... | H04W 88/06 |
| 2017/0141771 A1* | 5/2017 | Feng | ........... | H03K 3/313 |
| 2017/0374705 A1* | 12/2017 | Mitsui | ........... | H04W 76/15 |
| 2018/0206275 A1* | 7/2018 | Jain | ........... | H04W 40/02 |
| 2018/0227805 A1* | 8/2018 | Jang | ........... | H04W 72/1242 |
| 2018/0279358 A1* | 9/2018 | Babaei | ........... | H04W 72/0453 |
| 2018/0368166 A1* | 12/2018 | Jheng | ........... | H04W 72/14 |

OTHER PUBLICATIONS

R2-1704227; 3GPP TSG-RAN WG2 Meeting #98; Hangzhou, China, May 15-19, 2017; Source: CATT; Title: Beam Recovery Failure and RLF.
R2-1704487; 3GPP TSG-RAN WG2 Meeting #98; Hangzhou, P. R. China, May 15-19, 2017; Agenda Item: 10.2.8; Source: AT&T; Title: Beam Failure (BF) and Radio Link Interruption (RLI).
R2-1704860; 3GPP TSG-RAN WG2#98; Hangzhou, China, May 15-19, 2017; Source: Huawei, HiSilicon; Title: RLF for NR.
R2-1704920; 3GPP TSG-RAN WG2 #98; Hangzhou, China, May 15-19, 2017; Agenda Item: 10.2.8; Source: InterDigital Inc.; Title: RLM/RLF for NR.
R3-171450; 3GPP TSG-RAN WG3 Meeting #96; Hangzhou, China, May 15, 2017-May 19, 2017; Agenda item: 10.10.1; Source: LG Electronics Inc.; Title: Fast re-transmission of lost RLC PDUs.
R3-171456; 3GPP TSG RAN WG3 Meeting #96; Hangzhou,China, May 15-19, 2017; Source: CATT; Title: Consideration on the RRC message transfer between CU and DU.
R3-171457; 3GPP TSG RAN WG3 Meeting #96; Hangzhou,China, May 15-19, 2017; Source: CATT; Title: Discussion on L2 measurements support in case of CU/DU split; Agenda Item: 10.10.1.
R3-171458; 3GPP TSG-RAN WG3 #96; Hangzhou, P. R. China, May 15-19, 2017; Agenda item: 10.10.1; Source: CATT; Title: Discussion on UE Context Management.
R3-171460; 3GPP TSG-RAN WG3 Meeting #96; Hangzhou,China, May 15-19, 2017; Agenda Item: 10.10.1; Source: CATT; Title: Stage 2 TP for RRC message transfer between CU and DU.
R3-171460; 3GPP TSG-RAN WG3 Meeting #96; Hangzhou,China, May 15-19, 2017; Agenda Item: 10.10.1; Source: CATT; Title: Stage 3 TP for RRC message transfer in F1 interface.
R3-171462; 3GPP TSG-RAN WG3 Meeting #96; Hangzhou,China, May 15-19, 2017; Agenda Item: 10.10.1; Source: CATT; Title: Stage 2 TP for L2 measurements support in case of CU/DU split.
R3-171463; 3GPP TSG-RAN WG3 Meeting #96; Hangzhou,China, May 15-19, 2017; Agenda Item: 10.10.1; Source: CATT; Title: Stage 3 TP for L2 measurements support in case of CU/DU split.
R3-171464; 3GPP TSG-RAN WG3 #96; Hangzhou, P. R. China, May 15-19, 2017; Agenda item: 10.10.1; Source: CATT; Title: Stage2 TP for UE Context management in F1AP.
R3-171465; 3GPP TSG-RAN WG3 #96; Hangzhou, P. R. China, May 15-19, 2017; Source: CATT; Title: Stage3 TP for UE context management in F1AP.
R3-171475; 3GPP TSG-RAN WG3 Meeting #96; Hangzhou, P. R. China, May 15-19, 2017; Source: IAESI, Thales, Fairspectrum, VTT; Title: Central RRM functions and gNB-DU reporting.
R3-171491; was R3-171342; 3GPP TSG-RAN WG3 Meeting #96; Hangzhou, P.R. China, May 15-19, 2017.
R3-171548; 3GPP TSG-RAN WG3 Meeting #96; Hangzhou, China, May 15, 2017-May 19, 2017; Agenda item: 10.10.1; Source: LG Electronics Inc.; Title: Functions of the F1 interface.
R3-171588; 3GPP TSG-RAN WG3 Meeting #96; Hangzhou, China, May 15, 2017-May 19, 2017; Agenda item: 10.10.1; Source: LG Electronics Inc.; Title: TP for functions of the F1 interface.
R3-171590; 3GPP TSG-RAN3 Meeting #96; Hangzhou, P. R. China, May 15-19, 2017; Title: CU-DU interface: On RRC message transport; Source: China Telecom.
R3-171593; 3GPP TSG RAN WG3 Meeting #96; Hangzhou, P. R. China, May 15-19, 2017; Agenda item: 10.10.1; Source: ZTE; Title: Solution on RRC message transmission.
R3-171597; 3GPP TSG RAN WG3 Meeting #96; Hangzhou, P. R. China, May 15-19, 2017; Agenda item: 10.10.1; Source: ZTE; Title: Discussion on UE Radio Bearer Management over F1 interface.
R3-171599; 3GPP TSG RAN WG3 Meeting #96; Hangzhou, P. R. China, May 15-19, 2017; Agenda item: 10.10.1; Source: ZTE; Title: Discussion on flow control over F1-U.
R3-171631; 3GPP TSG RAN WG3 Meeting #96; Hangzhou, P. R. China, May 15-19, 2017; Agenda item: 10.10.1; Source: Samsung, KT, SK Telecom; Title: Relationship among gNB-CU, gNB-DU and cell.
R3-171632; 3GPP TSG RAN WG3 Meeting #96; Hangzhou, P. R. China, May 15-19, 2017; Agenda item: 10.10.1; Source: Samsung, KT, SK Telecom; Title: Text proposal for TS38.401 on definition of gNB-DU.
R3-171633; 3GPP TSG RAN WG3 Meeting #96; Hangzhou, P. R. China, May 15-19, 2017; Agenda item: 10.10.1; Source: Samsung; Title: RRC messages over F1 interface.
R3-171634; 3GPP TSG RAN WG3 Meeting #96; Hangzhou, P. R. China, May 15-19, 2017; Agenda item: 10.10.1; Source: Samsung; Title: Text proposal for TS38.401 on RRC messages over F1 interface.
R3-171635; 3GPP TSG RAN WG3 Meeting #96; Hangzhou, P. R. China, May 15-19, 2017; Agenda item: 10.10.1; Source: Samsung, KT, SK Telecom; Title: Interface between gNB-CU/gNB-DU and O&M.
R3-171636; 3GPP TSG RAN WG3 Meeting #96; Hangzhou, P. R. China, May 15-19, 2017; Agenda item: 10.10.1; Source: Samsung, KT, SK Telecom; Title: Text proposal for TS38.401 on gNB-DU management.
R3-171637; 3GPP TSG RAN WG3 Meeting #96; Hangzhou, P. R. China, May 15-19, 2017; Agenda item: 10.10.1; Source: Samsung; Title: F1AP functions.
R3-171638; 3GPP TSG RAN WG3 Meeting #96; Hangzhou, P. R. China, May 15-19, 2017; Agenda item: 10.10.1; Source: Samsung; Title: Text proposal for TS38.401 on F1-C functions.
R3-171658; 3GPP TSG RAN WG3 Meeting #96; Hangzhou, P. R. China, May 15-19, 2017; Agenda item: 10.10.1; Source: ZTE; Title: CU/DU ID and conception discussion.
R3-171661; 3GPP TSG RAN WG3 Meeting #96; Hangzhou,P.R. China, May 15-19, 2017; Title: Solution on PDCP PDU retransmission.

(56) References Cited

OTHER PUBLICATIONS

R3-171689; 3GPP TSG-RAN WG3 #96; Hangzhou, P. R. China, May 15-19, 2017; Agenda Item: 10.10.1. CU-DU interface principle and definition; Source: NEC; Title: Specification of L1/L2 configuration Info in F1AP.
R3-171691; 3GPP TSG-RAN WG3 #96; Hangzhou, P. R. China, May 15-19, 2017; Agenda Item: 10.10.1; Source: Vodafone; Title: Reliability for Core Network and RRC Signalling.
R3-171696; 3GPP TSG-RAN WG3 Meeting #96; Hangzhou, P.R. China, May 15-19, 2017; Agenda item: 10.10.1; Source: Samsung, KT; Title: Global gNB ID (gNB-CU ID & gNB-DU ID) & Cell ID.
R3-171697; 3GPP TSG-RAN WG3 Meeting #96; Hangzhou, P.R. China, May 15-19, 2017; Agenda item: 10.10.1; Source: Samsung, KT, SK Telecom; Title: Intra-CU/Inter-DU Handover support.
R3-171699; 3GPP TSG-RAN WG3 Meeting #96; Hangzhou, P.R. China, May 15-19, 2017; Agenda item: 10.10.1; Source: Samsung, KT, SK Telecom; Title: Termination of NG and S1-U Interface.
Tdoc R2-1704089; 3GPP TSG-RAN WG2 #97bis; Spokane, USA Apr. 3-7, 2017 (updated version of R2-1702677); Agenda Item: 10.2.8; Source: Ericsson; Title: RLM and RLF in NR.
Tdoc R3-171724; 3GPP TSG-RAN WG3 #95bis; Spokane, USA, Apr. 3-7, 2017; Agenda Item: 10.10.1; Source: Ericsson; Title: F1 interface functions.
Tdoc R3-171725; 3GPP TSG-RAN WG3 #96; Hangzhou, China, May 15-19, 2017; Agenda Item: 10.10.1; Source: Ericsson, AT&T, Vodafone; Title: Separation of CP and UP.
3GPP TS 36.331 V14.2.2 (Apr. 2017); Technical Specification; 3rd Generation Partnership Project; Technical Specification Group Radio Access Network; Evolved Universal Terrestrial Radio Access (E-UTRA); Radio Resource Control (RRC);; Protocol specification.
R2-1704089—RLM and RLF in NR; 3GPP TSG-RAN WG2 #97bisTdoc ; Spokane, USA Apr. 3-7, 2017(updated version of R2-1702677); ; Agenda Item:10.2.8; Source:Ericsson; Title: RLM and RLF in NR.
R2-1704382—SPS UL skipping in NR; 3GPP TSG-RAN WG2 #98Tdoc ; Hangzou, P.R. of China, May 15-19, 2017; ; Agenda Item:10.3.1.7; Source:Ericsson; Title:Semi-Persistent Scheduling UL skipping in NR.
R2-1704496 Semi-persistent scheduling in NR; 3GPP TSG-RAN WG2 Meeting #98; Hangzhou, China, May 15-19, 2017; ; ; Agenda Item: 10.3.1.7 (NR_newRAT-Core); Source: LG Electronics Inc.
R2-1704570 Considerations on main issues with Semi-Persistent Scheduling (SPS) in NR; 3GPP TSG-RAN WG2 #98; Hangzhou, China, May 15-19, 2017; ; Agenda item:10.3.1.7; Source: Samsung Electronics R&D Institute UK; Title: Considerations on main issues with Semi-Persistent Scheduling (SPS) in NR.
R2-1704698 Consideration on SPS; 3GPP TSG-RAN WG2 Meeting#98 ; Hangzhou, China, May 15-19, 2017; ; Source: ZTE; Title: Consideration on SPS; Agenda item:10.3.1.7.
R2-1704699 consideration on grant-free transmission; 3GPP TSG-RAN WG2 Meeting#98 ; Hangzhou, China, May 15-19, 2017; ; Source: ZTE; Title: Consideration on grant-free transmission; Agenda item:10.3.1.7.
R2-1704929_LAA sharing_v1; 3GPP TSG-RAN WG2 #98; Hangzhou, China, May 15-19, 2017; ; ; Agenda Item: 7.1 ; Source:Apple.
R2-1704934_CR to 36300 for LAA sharing_r13; 3GPP TSG-RAN WG2 #98 ; Hangzhou, China, May 15-19, 2017; CR-Form-v11.2; ; CHANGE REQUEST.
R2-1705047; 3GPP TSG-RAN WG2 Meeting #98; Hangzhou, China, May 15-19, 2017; ; Source: Potevio; Title:Discussion on UL grant-free transmission for URLLC; Agenda Item:10.3.1.7.
R2-1705118 Grant-free resource configuration; 3GPP TSG-RAN WG2 Meeting #98; Hangzhou, China, May 15-19, 2017; Source: Huawei, HiSilicon; Title: Grant-free resource configuration; Agenda item:10.3.1; Document for:Discussion and decision.
R2-1705242 Grant free transmission in NR; 3GPP TSG-RAN WG2 Meeting #98; Hangzhou, China, May 15-19, 2017; ; Agenda Item: 10.3.1.7 (NR_newRAT-Core); Source: LG Electronics Inc.; Title: Grant free transmission in NR.
R2-1705249_UP latency enhancement; 3GPP TSG-RAN WG2 Meeting #98; Hangzhou, China, May 15-19, 2017; ; Agenda item:10.3.1.7; Source:Samsung; Title:RAN2 consideration on user plane latency enhancement.
R2-1705504; 3GPP TSG-RAN WG2 Meeting #98; Hangzhou, China, May 15-19, 2017; CR-Form-v11.1; ; CHANGE REQUEST.
R2-1705594—Potential Issues for UL Transmision with Shared UL Grant among Multiple UEs; 3GPP TSG RAN WG2 #98 ; Hangzhou, China, May 15-19, 2017Resubmission; Agenda Item:10.3.1.5; Souce:Samsung; Title:Potential Issues for UL Transmision with Shared UL Grant; among Multiple UEs.
R2-1706064_CR to 36300 for LAA sharing_R13_r2; 3GPP TSG-RAN WG2 #98 ; Hangzhou, China, May 15-19, 2017; CR-Form-v11.2; ; CHANGE REQUEST.
R2-1706091_CR to 36300 for LAA sharing_R13; 3GPP TSG-RAN WG2 #98 ; Hangzhou, China, May 15-19, 2017; CR-Form-v11.2; ; CHANGE REQUEST.
R3-171815 Discussions on mobility procedure; 3GPP TSG-RAN3 Meeting#96R3-171815 Hang Zhou, China, May 15-19, 2017; ; ; Title: Discussions on mobility procedures; Source: Huawei.
R3-171818 HLS Architecture Principles—Altiostar; 3GPP TSG RAN WG3 Meeting #96 R3-171818 Hangzhou, P. R. China, May 15-19, 2017; ; Agenda item:10.10.1; Source:Altiostar Networks ; Title:HLS Architecture Principles.
R3-171819 CU-DU RRM Functions—Altiostar; 3GPP TSG RAN WG3 Meeting #96 R3-171819 Hangzhou, P. R. China, May 15-19, 2017; ; Agenda item:10.10.1; Source:Altiostar Networks, Orange ; Title: Consideration of RRM Functions in CU-DU Split Architecture.
R3-171820 CU-DU Flow Control—Altiostar; 3GPP TSG RAN WG3 Meeting #96 R3-171820 Hangzhou, P. R. China, May 15-19, 2017; ; Agenda item:10.10.1; Source:Altiostar Networks, Orange ; Title:Flow Control in CU-DU Split Architecture.
R3-171823; TSG-RAN Working Group 3 meeting #96R3-171823 Hangzhou, China, May 15-19, 2017; ; Source: NTT DOCOMO, Inc.; Title: F1 interface: Radio resource configuration management; Agenda item:10.10.1.

\* cited by examiner

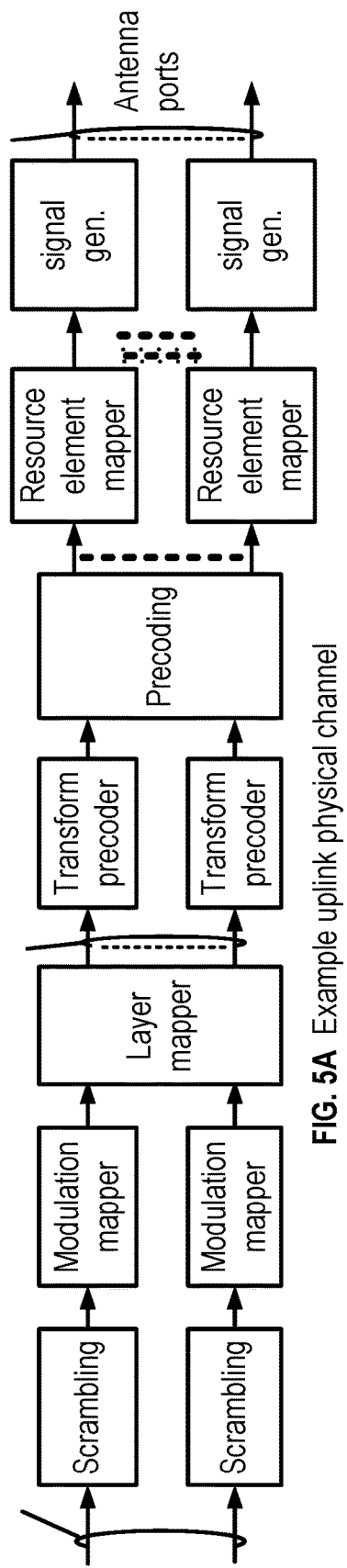
FIG. 5A Example uplink physical channel
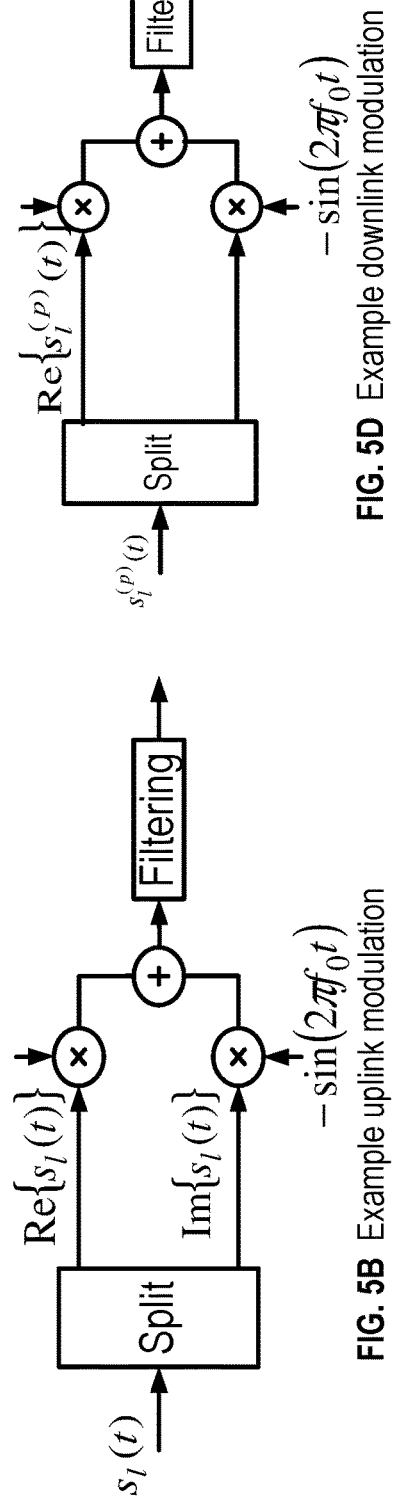
FIG. 5B Example uplink modulation
FIG. 5D Example downlink modulation
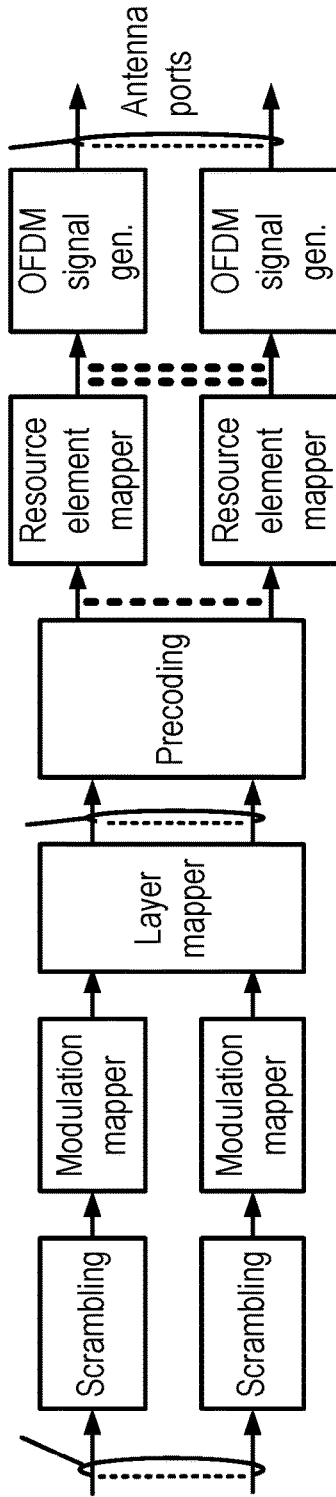
FIG. 5C Example downlink physical channel Dual-Connectivity- two MAC entities at UE side

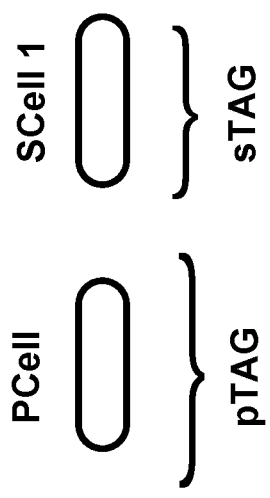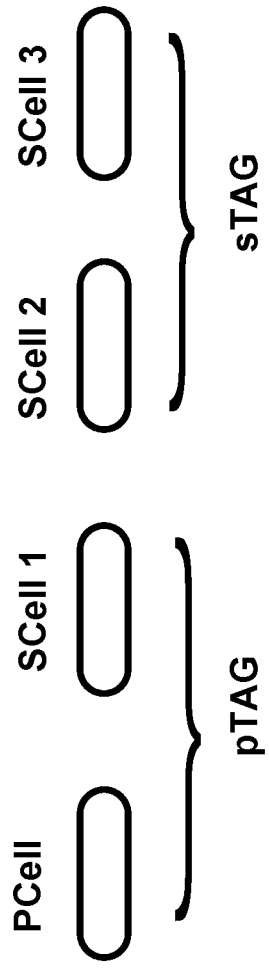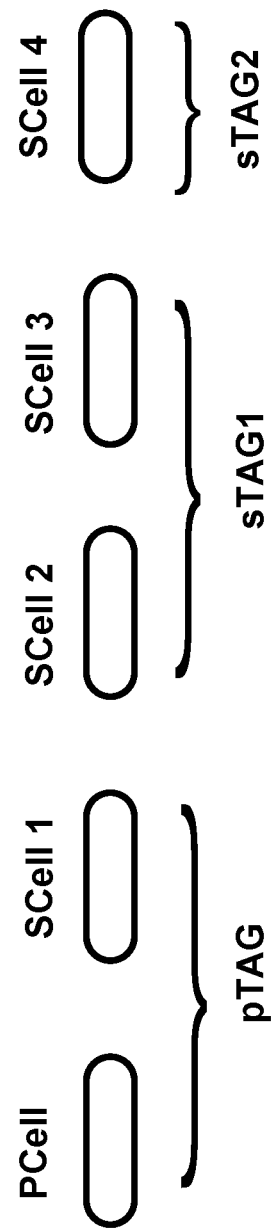
FIG. 8 gNB connected to NGC eLTE eNB connected to NGC

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

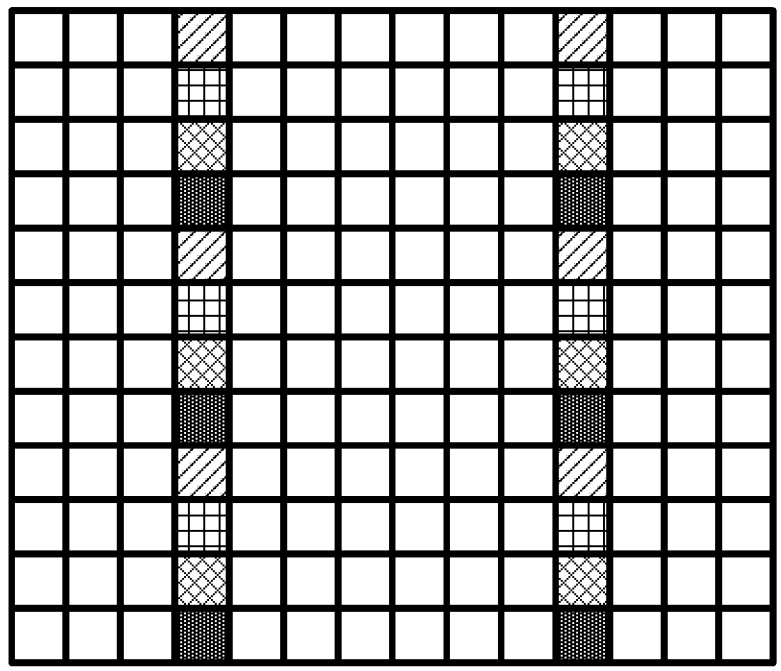
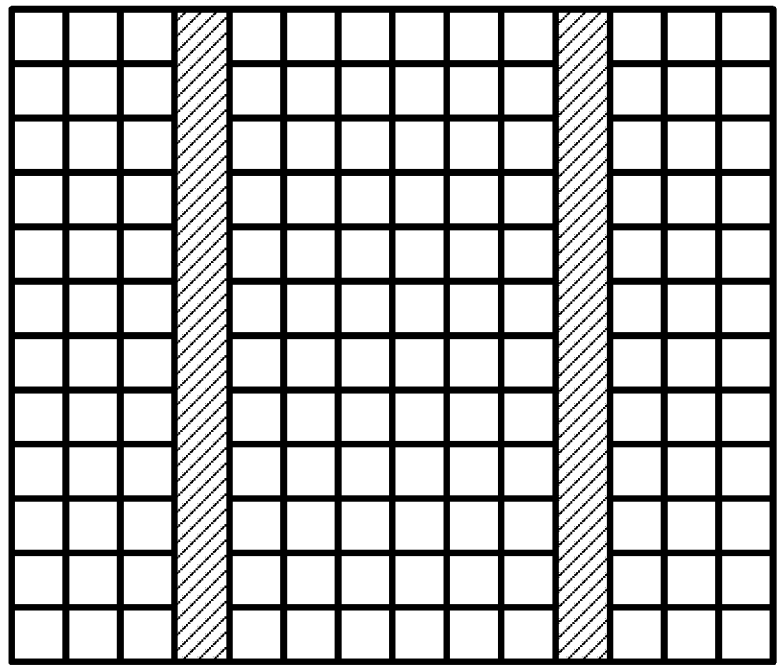
FIG. 34

| GF config index | System frame number | Subframe number |
|---|---|---|
| 1 | Even | 1 |
| 2 | Even | 4 |
| 3 | Even | 7 |
| 4 | Any | 1 |
| 5 | Any | 4 |
| 6 | Any | 7 |
| 7 | Any | 1,6 |
| 8 | Any | 2,7 |

FIG. 38

Transmit packet data convergence protocol packets of a radio bearer established between a wireless device and the base station central unit, where the base station distributed unit transmits the packet data convergence protocol packets to the wireless device via a radio link
4710

Receive a first message comprising one or more parameters, where the one or more parameters comprise a first information element indicating a radio link outage of the radio link and a cell identifier of a first cell associated with the radio link outage
4720

Transmit, in response to the one or more parameters, a second message indicating a release of a first wireless device context of the radio bearer of the wireless device
4730

FIG. 47

DISTRIBUTED UNIT CONNECTION ISSUE

CROSS-REFERENCE TO RELATED APPLICATIONS

This application claims the benefit of U.S. Provisional Patent Application No. 62/520,952, filed Jun. 16, 2017, U.S. Provisional Patent Application No. 62/520,943, filed Jun. 16, 2017, U.S. Provisional Patent Application No. 62/522,263, filed Jun. 20, 2017, and U.S. Provisional Patent Application No. 62/522,276, filed Jun. 20, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 34 is an example diagram of an aspect of an embodiment of the present disclosure.

FIG. 38 is an example diagram of an aspect of an embodiment of the present disclosure.

FIG. 47 is a flow diagram of an aspect of an embodiment of the present disclosure.

DETAILED DESCRIPTION OF EMBODIMENTS

Figure 1:
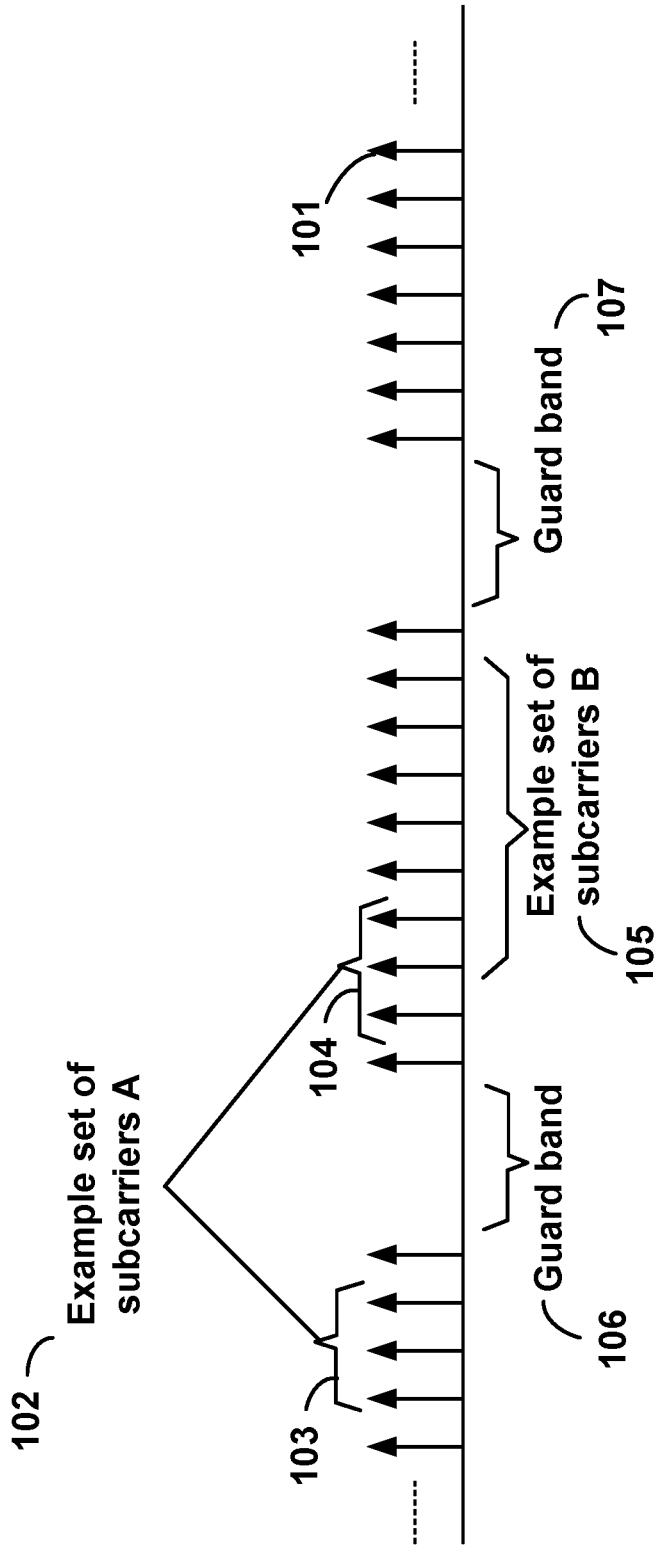
FIG. 1 is a diagram depicting example sets of OFDM subcarriers as per an aspect of an embodiment of the present invention.

Example embodiments of the present invention enable operation of wireless communication systems. Embodiments of the technology disclosed herein may be employed in the technical field of multicarrier communication systems. More particularly, the embodiments of the technology disclosed herein may relate to cellular wireless systems in a multicarrier communication systems.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
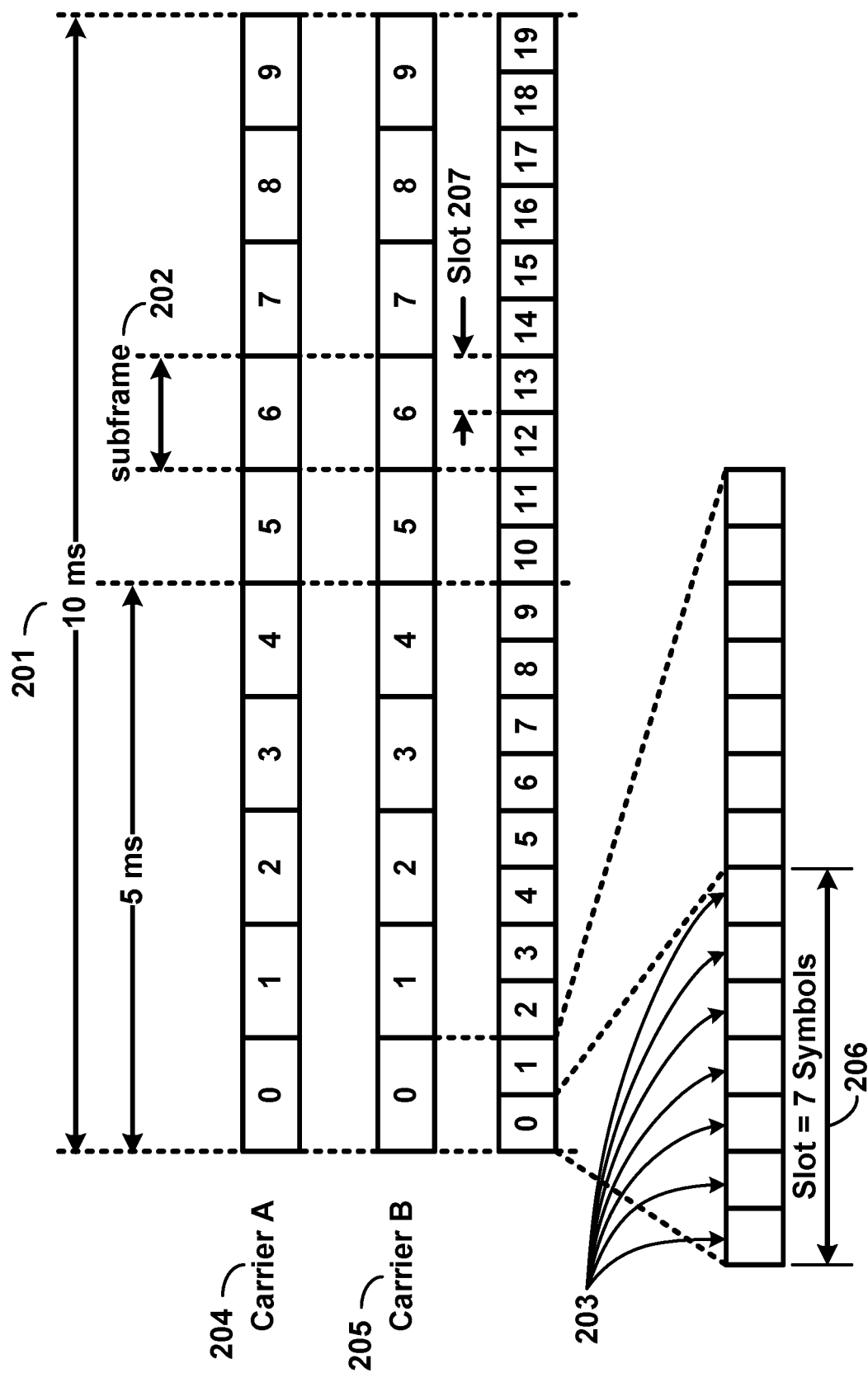
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
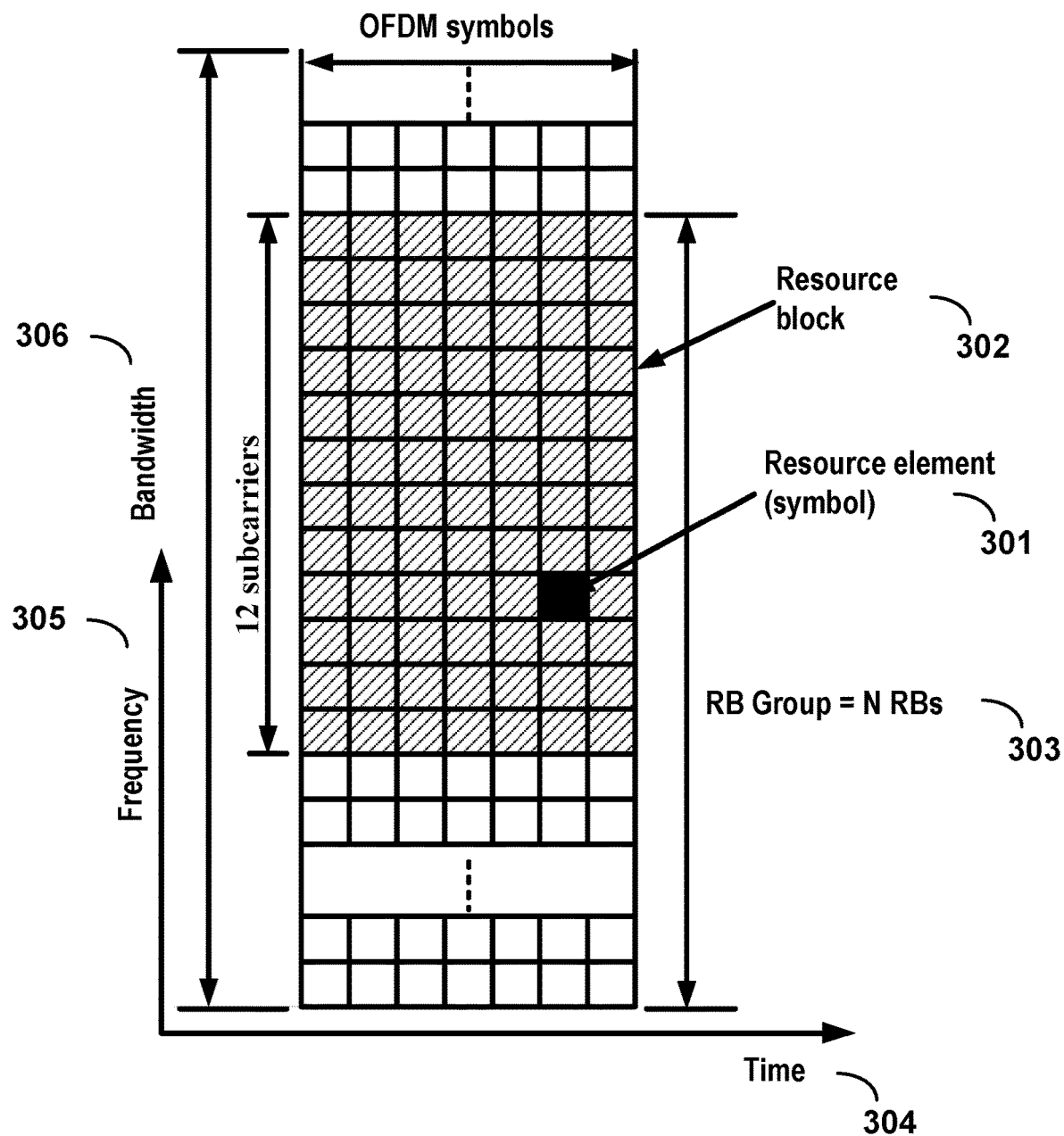
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
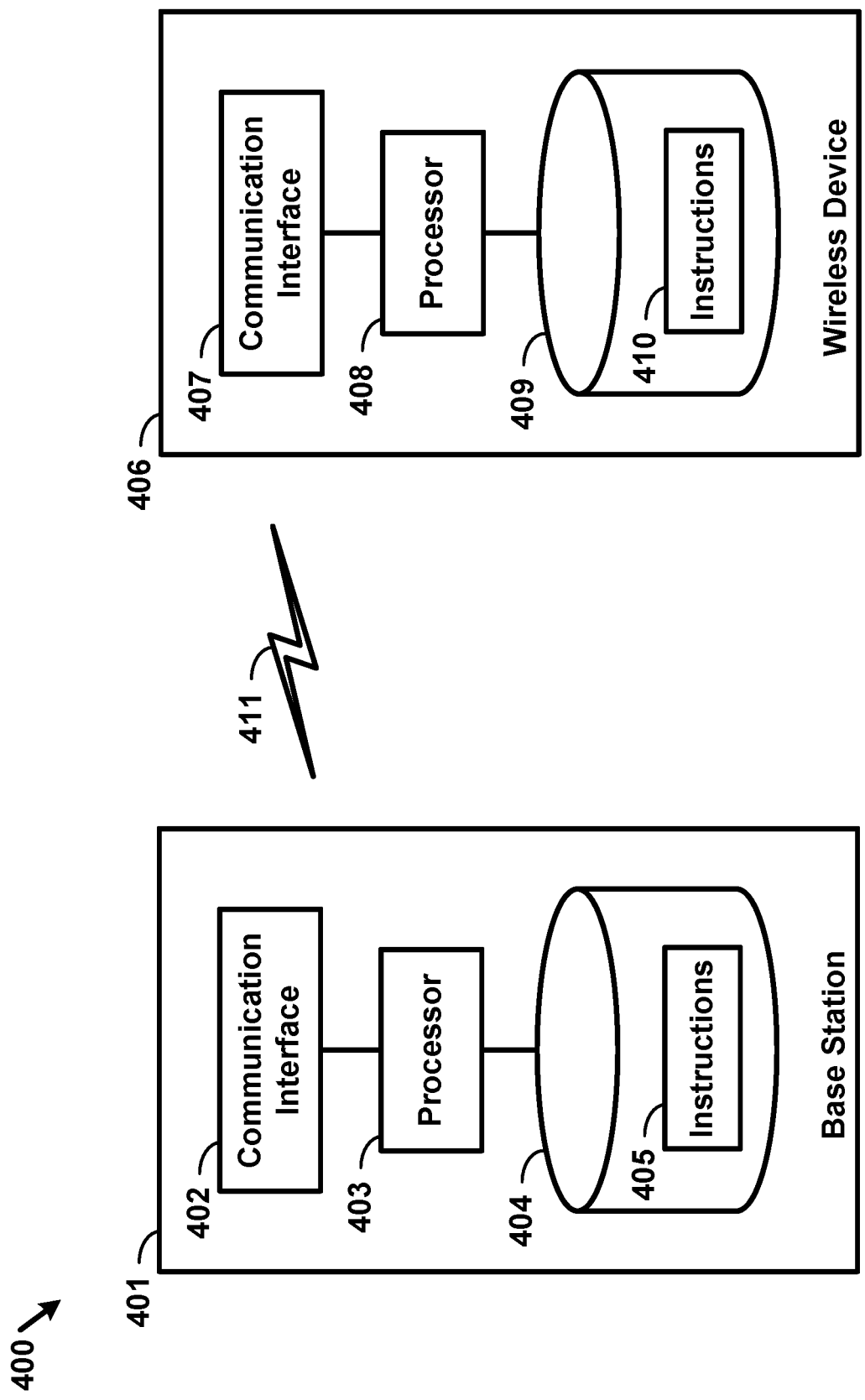
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
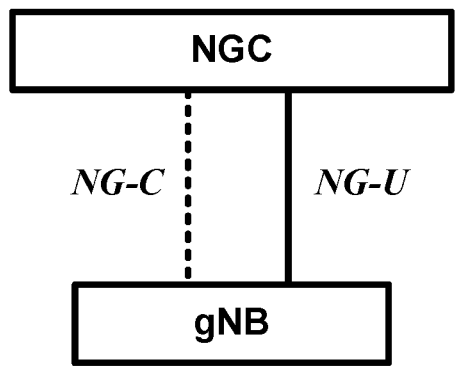
FIG. 10A and FIG. 10B are example diagrams for interfaces between a 5G core network (e.g. NGC) and base stations (e.g. gNB and eLTE eNB) as per an aspect of an embodiment of the present invention.
Figure 10B:
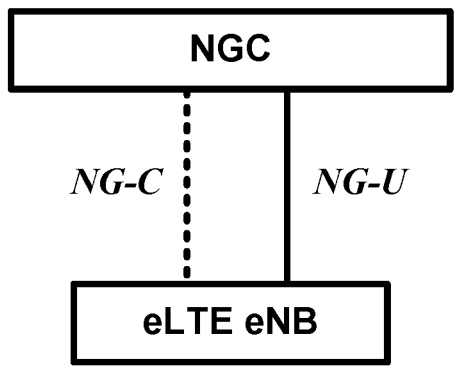

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
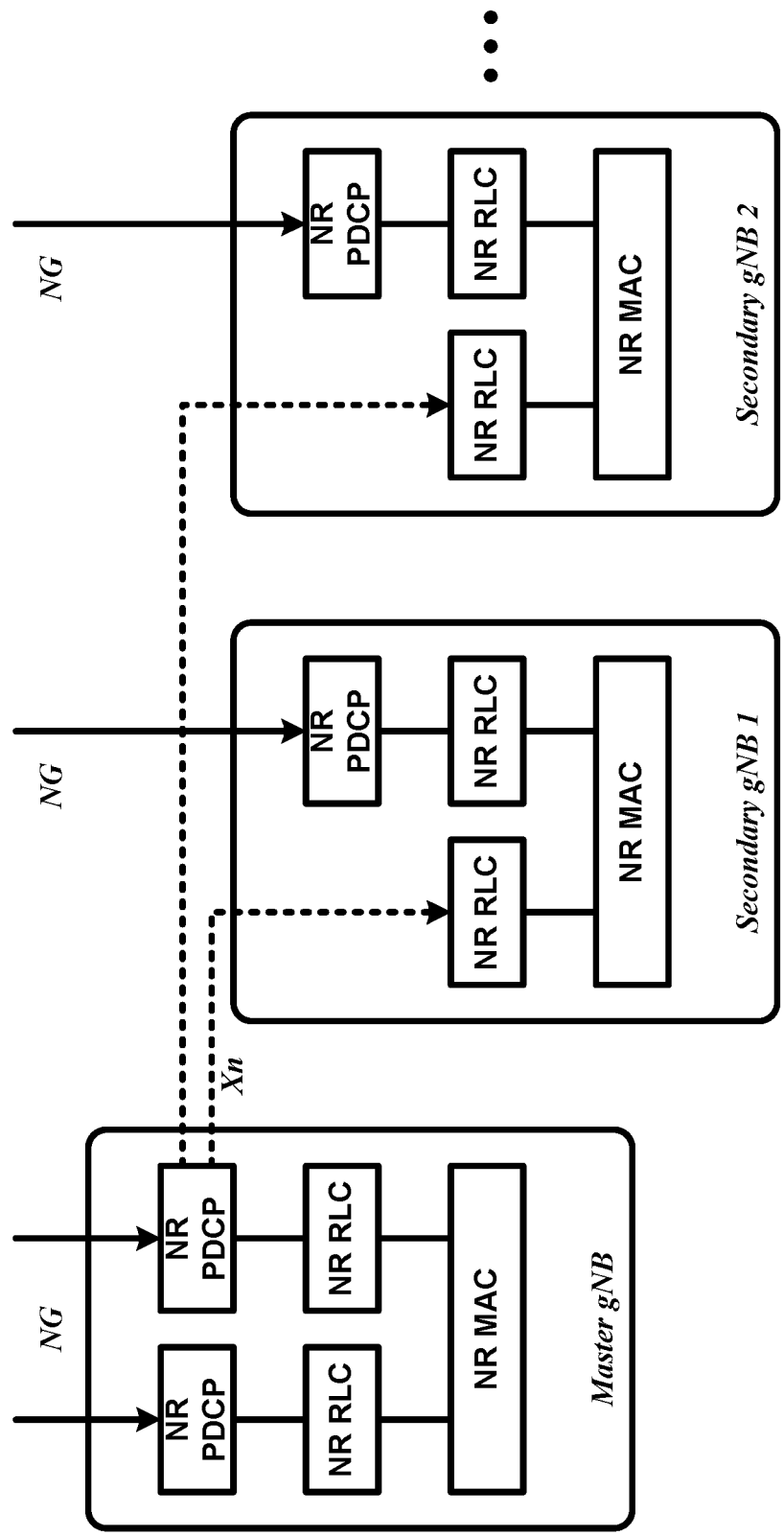
FIG. 6 is an example diagram for a protocol structure with multi-connectivity as per an aspect of an embodiment of the present invention.
Figure 7:
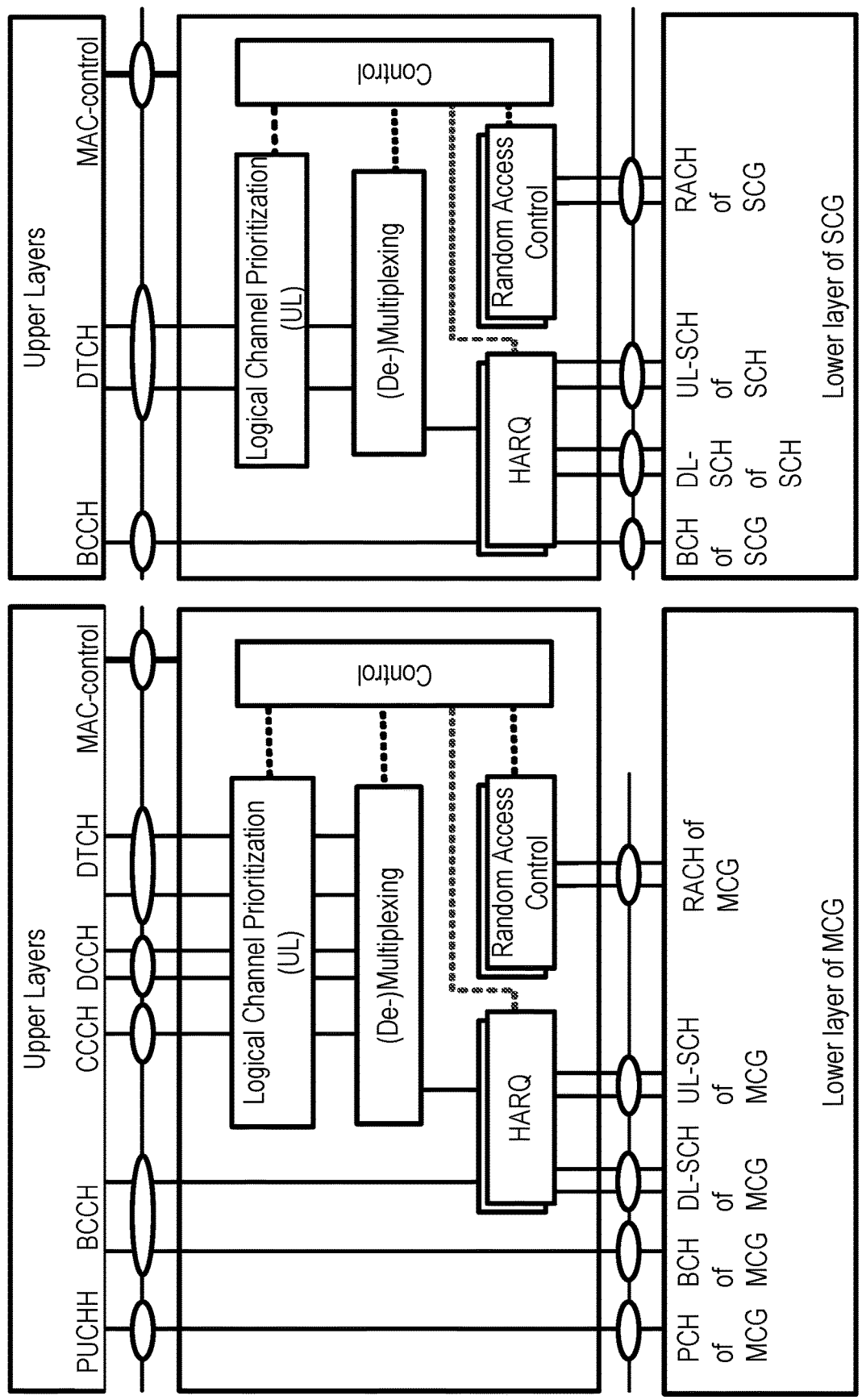
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
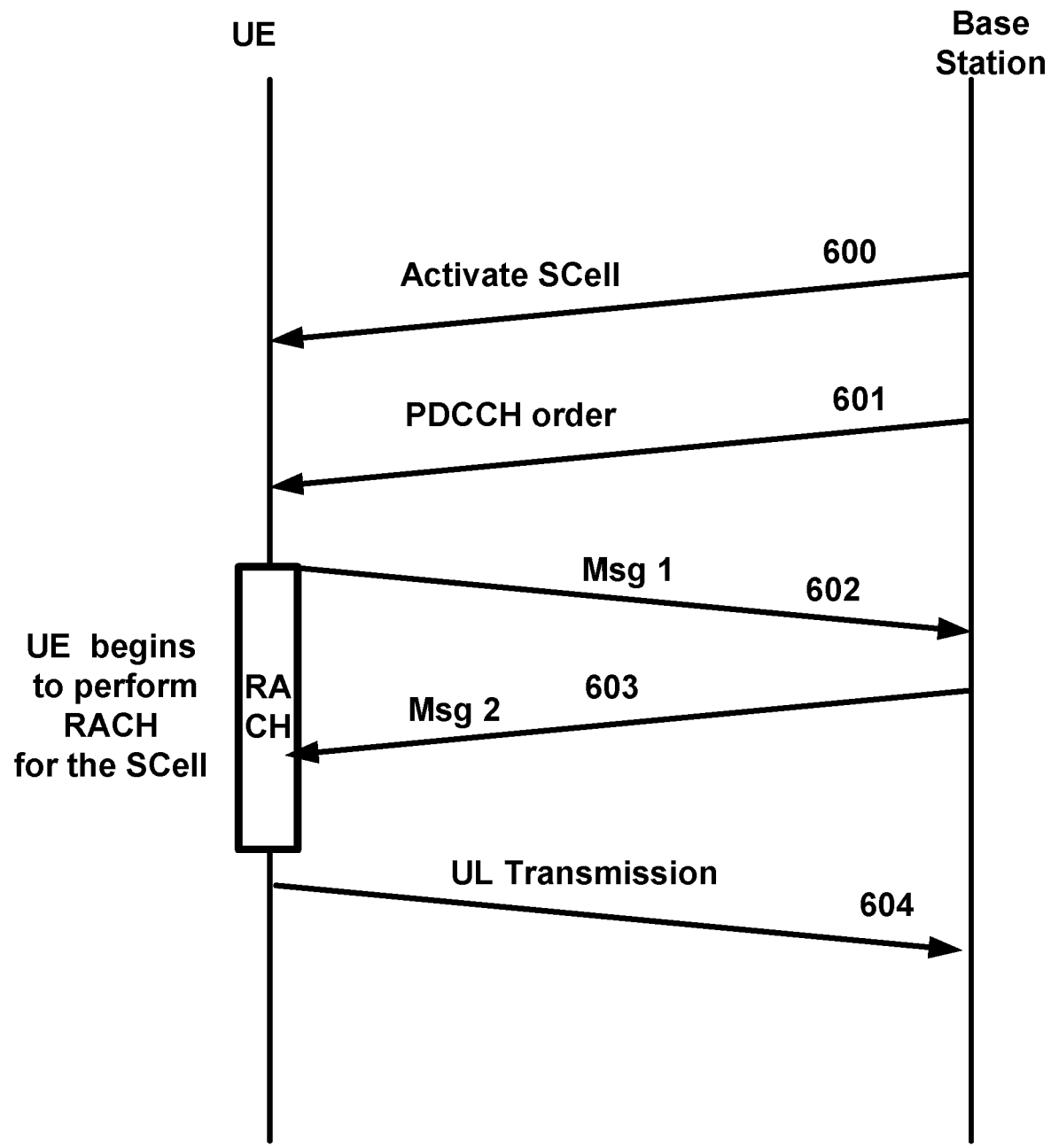
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/orif the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC- _CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

Figure 11A:
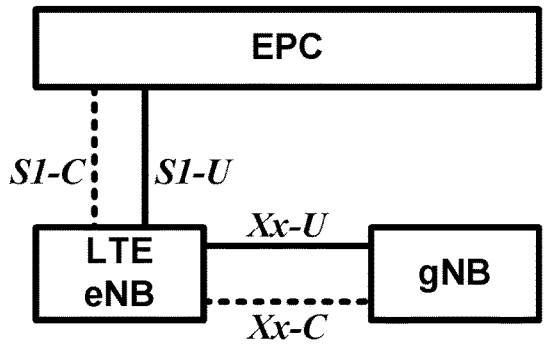
FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.
Figure 11B:
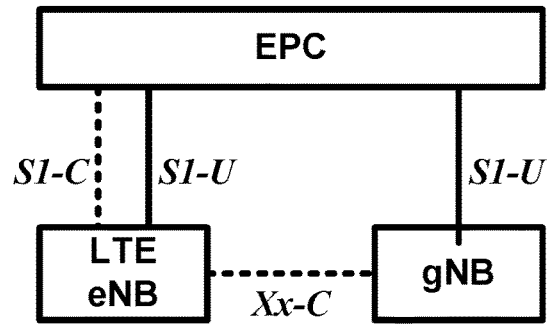

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

Figure 11C:
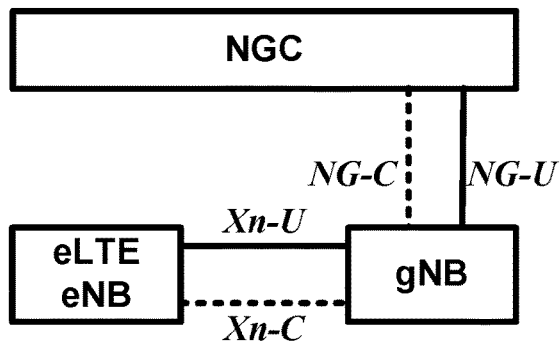
Figure 11D:
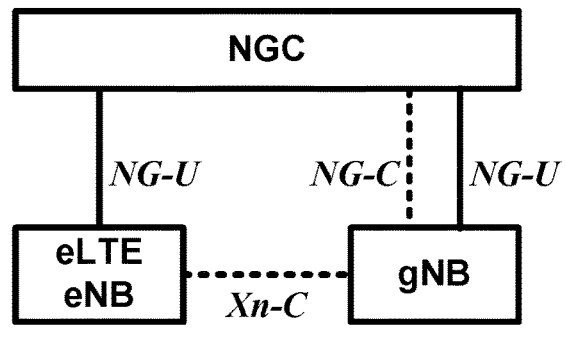

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

Figure 11E:
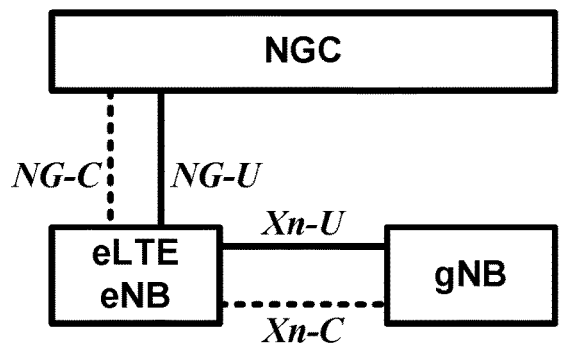
Figure 11F:
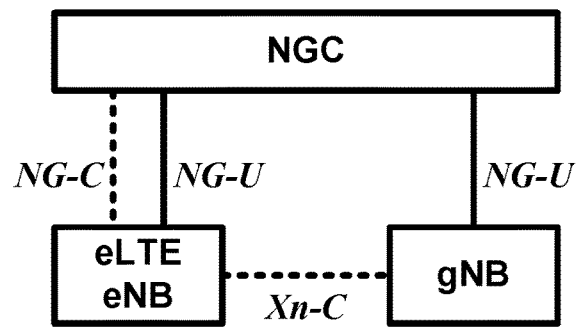

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
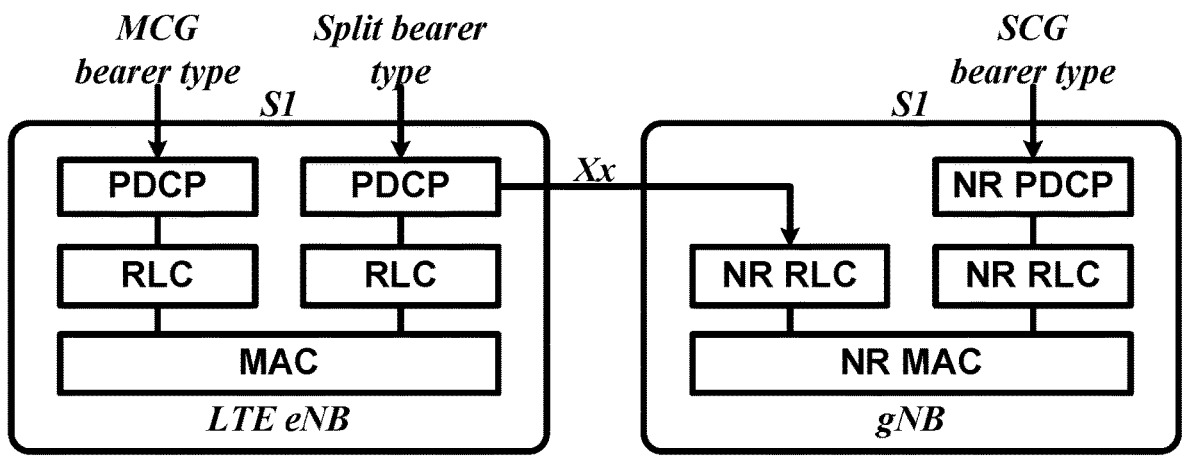
FIG. 12A, FIG. 12B, and FIG. 12C are example diagrams for radio protocol structures of tight interworking bearers as per an aspect of an embodiment of the present invention.
Figure 12B:
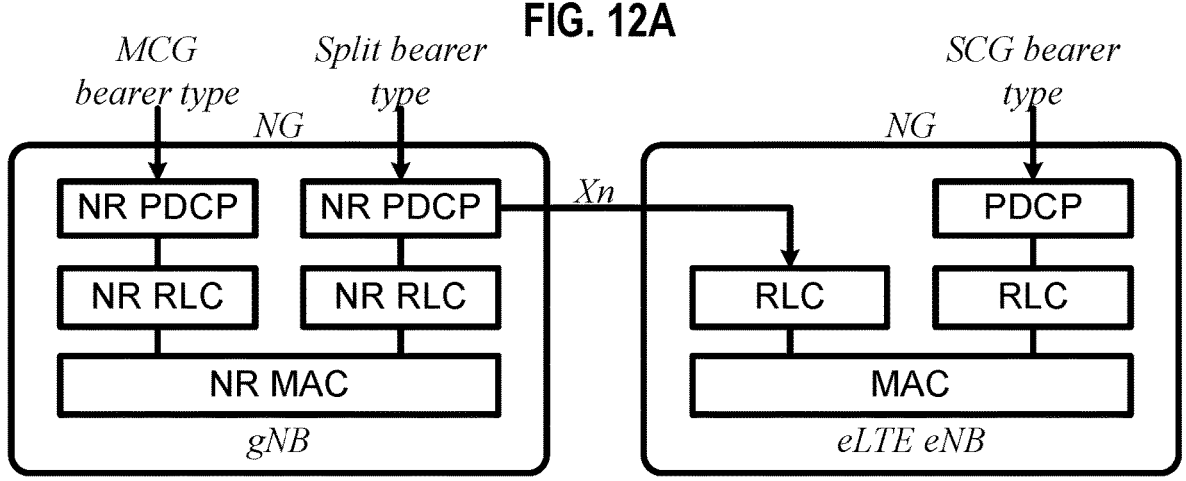
Figure 12C:
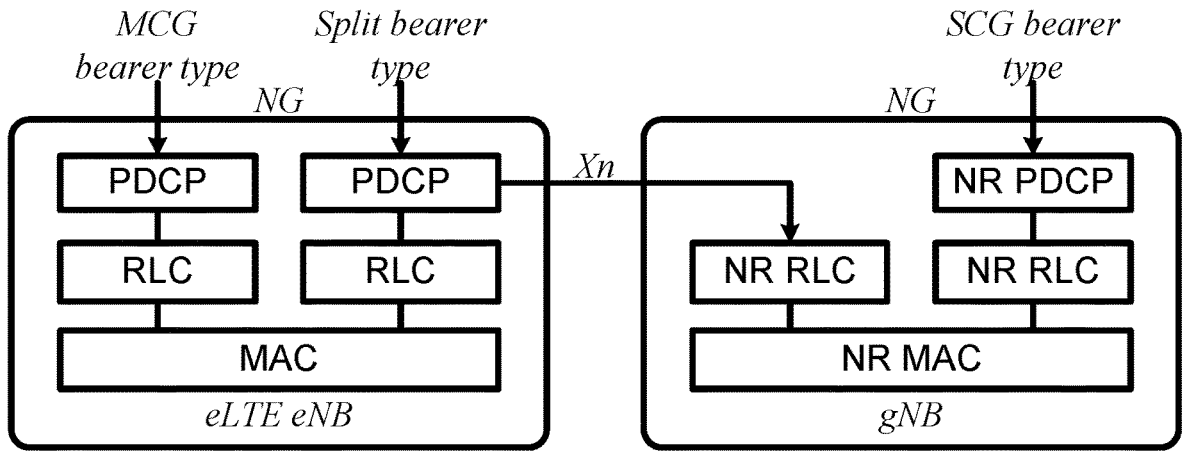

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station.

Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
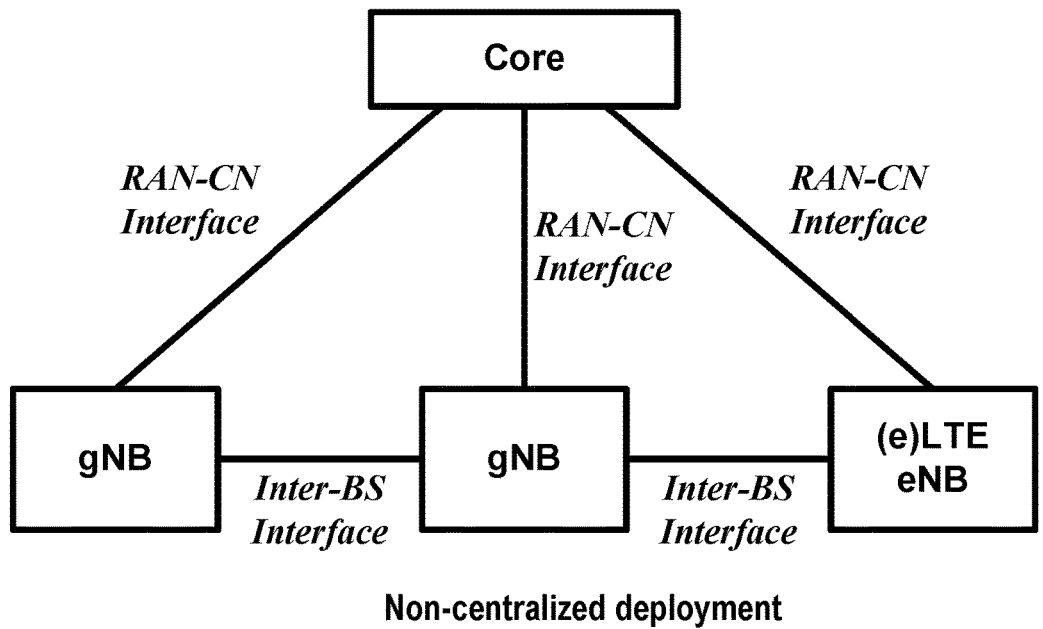
FIG. 13A and FIG. 13B are example diagrams for gNB deployment scenarios as per an aspect of an embodiment of the present invention.
Figure 13B:
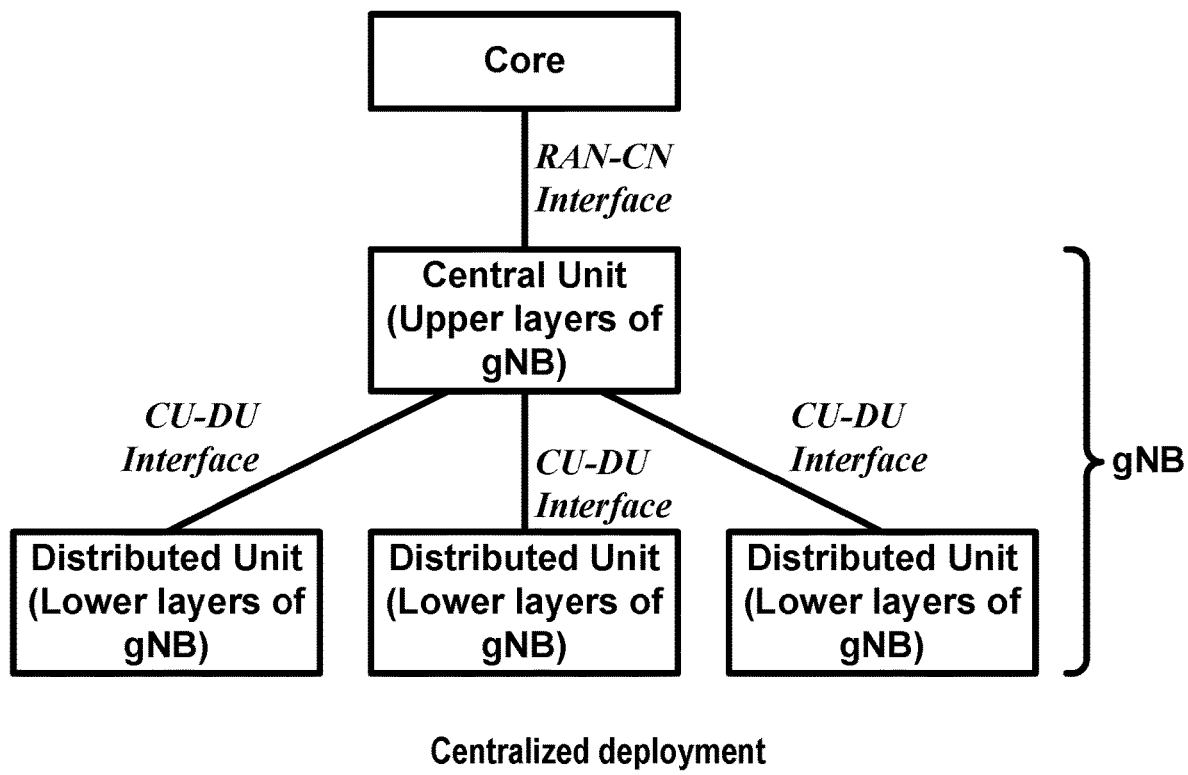

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
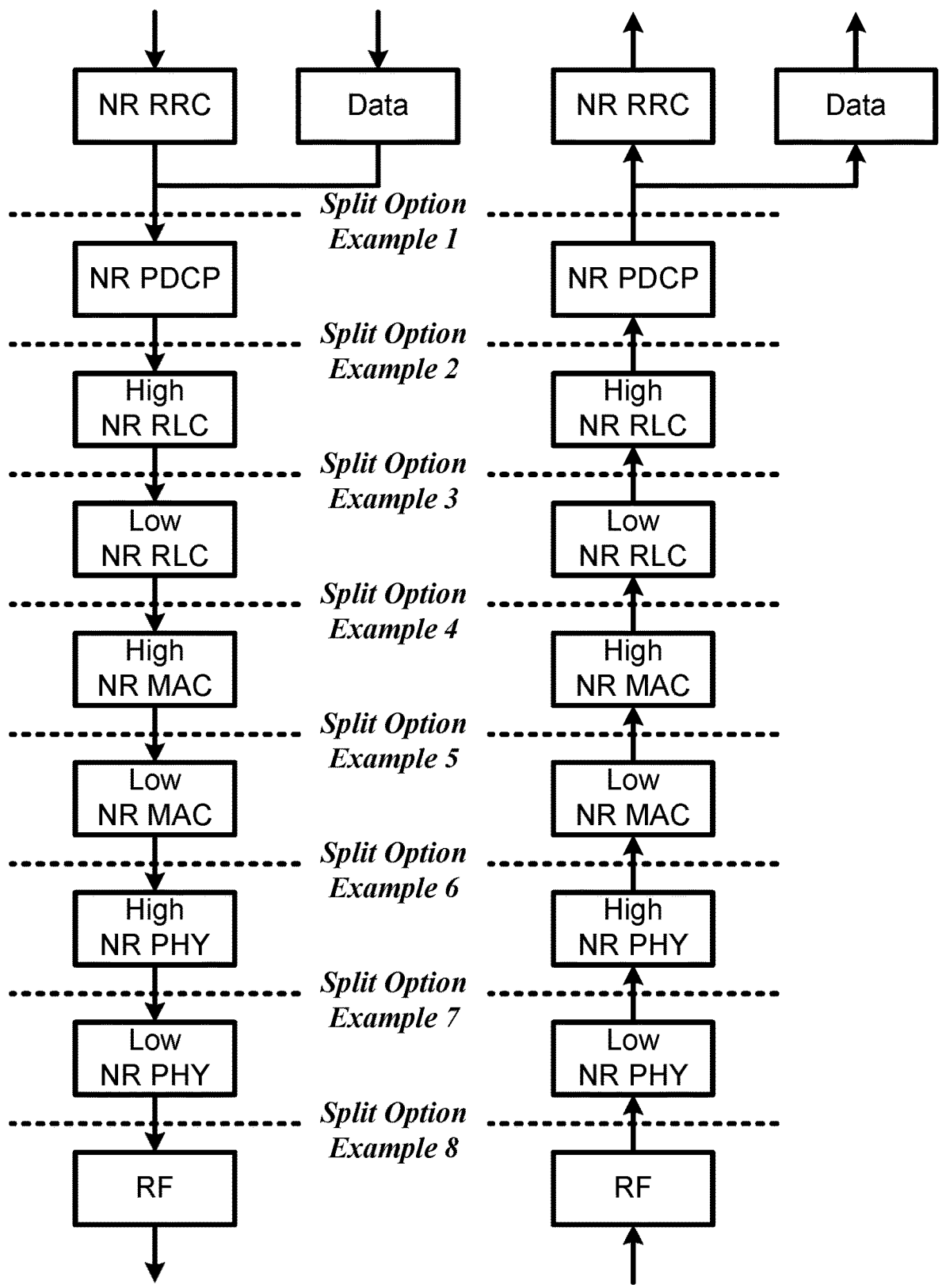
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Distributed Unit Connection Issue

In an example, a base station may consider radio resource condition and traffic status to configure wireless device control parameters, resource configuration parameters, and/or cell configuration parameters. In the functional split scenario, a base station central unit configures wireless device control parameters, and a base station distributed unit may monitor radio resource condition and traffic status of the distributed unit. In an existing technology, a base station CU may have less information of lower layer radio condition (e.g. physical layer, MAC layer, RLC layer, and/or the like). When a central unit configure wireless device configuration parameters, resource parameters, and/or cell configuration parameters, the lack of lower layer radio condition and/or status information may cause inappropriate configurations, which may decrease cellular system performance. The inappropriate configuration may cause increased call dropping ratio, packet error rate, and/or packet transmission delay, and further may decrease communication reliability and/or increase data transmission latency.

Example implementation of embodiments may support a base station central unit to consider lower layer radio condition information and/or traffic status of cells. In an example embodiment, a distributed unit (DU) may transmit a radio link state information for a wireless device to a central unit (CU). The radio link state information may comprise one or more indications indicating that the wireless device may experience a radio link failure and/or that the distributed radio access network entity may lose a connection with the wireless device. The central unit may determine a radio link failure of the wireless device at least based on one or more elements of the radio link state information, and/or may determine to release a wireless device context of the wireless device. Example implementation of embodiments may increase communication reliability and/or reduce data transmission latency of wireless communication systems.

Figure 27:
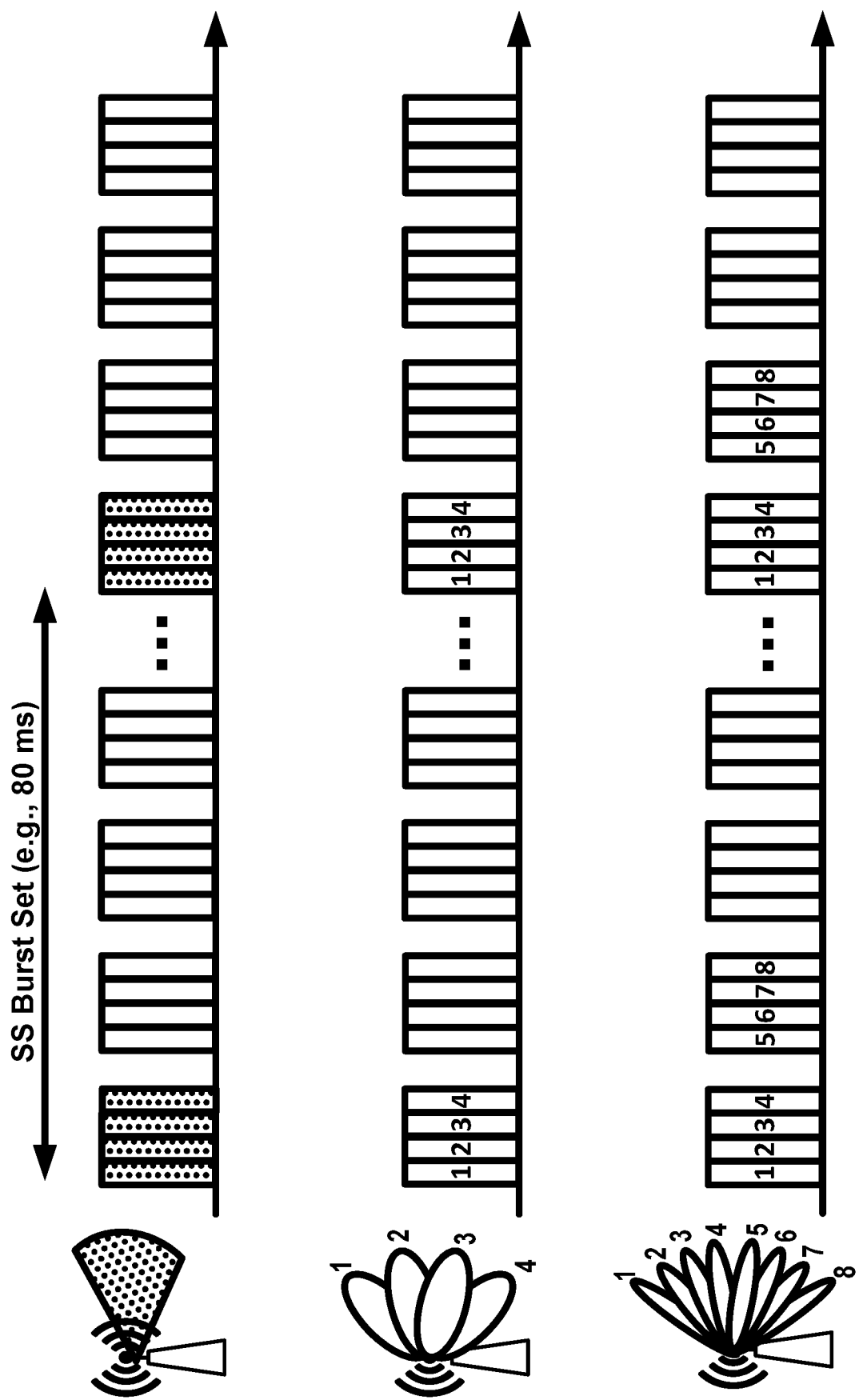
FIG. 27 is an example diagram of an aspect of an embodiment of the present disclosure.

In an example, a cell may be operated with one or more beams employing a multi-antenna system, as shown in FIG. 27. A beam may have a spatial direction, and/or may cover a part of a cell coverage area. A combination of one or more beam spatial areas may form a cell coverage. In an example, a beam transmitting a synchronization signal and/or receiving a signal from a wireless device may be swept over a cell coverage area in a predetermined way. A synchronization signal index, a synchronization signal scheduling information, and/or a synchronization signal sequence information may be used to identify a swept beam. A swept beam may broadcast one or more control information comprising at least one of a system information, a master information, a PDCCH, a PRACH resource, a random access preamble information, a synchronization signal, a reference signal, and/or the like. In an example, a beam may transmit a reference signal (e.g. CSI-RS). A beam may be also identified by a reference signal (e.g. CSI-RS, DM-RS, and the like) index, a reference signal scheduling information, and/or a reference signal sequence information.

In an example, one or more beams may be managed via a set of L1/L2 procedures to acquire and maintain a set of TRP(s)(Transmission Reception Point) and/or UE beams that may be used for DL and UL transmission/reception, which may include at least following aspects: Beam determination (for TRP(s) or UE to select of its own Tx/Rx beam(s)), Beam measurement (for TRP(s) or UE to measure characteristics of received beamformed signals), Beam reporting (for UE to report information of beamformed signal(s) based on beam measurement), and/or Beam sweeping (operation of covering a spatial area, with beams transmitted and/or received during a time interval in a predetermined way).

In an example, the followings may be defined as Tx/Rx beam correspondence at TRP and UE. Tx/Rx beam correspondence at TRP holds if at least one of the following is satisfied: TRP may be able to determine a TRP Rx beam for the uplink reception based on UE's downlink measurement on TRP's one or more Tx beams; and/or TRP may be able to determine a TRP Tx beam for the downlink transmission based on TRP's uplink measurement on TRP's one or more Rx beams. Tx/Rx beam correspondence at UE may hold if at least one of the following is satisfied: UE may be able to determine a UE Tx beam for the uplink transmission based on UE's downlink measurement on UE's one or more Rx beams; UE may be able to determine a UE Rx beam for the downlink reception based on TRP's indication based on uplink measurement on UE's one or more Tx beams; and/or capability indication of UE beam correspondence related information to TRP may be supported.

In an example, the following DL L1/L2 beam management procedures (e.g. P-1, P-2, and P-3) may be supported within one or multiple TRPs. P-1 may be used to enable UE measurement on different TRP Tx beams to support selection of TRP Tx beams/UE Rx beam(s). For beamforming at TRP, it typically may include a intra/inter-TRP Tx beam sweep from a set of different beams. For beamforming at UE, it may include a UE Rx beam sweep from a set of different beams. P-2 may be used to enable UE measurement on different TRP Tx beams to possibly change inter/intra-TRP Tx beam(s). From a possibly smaller set of beams for beam refinement than in P-1. P-2 may be a special case of P-1. P-3 may be used to enable UE measurement on the same TRP Tx beam to change UE Rx beam in the case UE uses beamforming. At least network triggered aperiodic beam reporting may be supported under P-1, P-2, and P-3 related operations.

In an example, UE measurement based on RS for beam management (at least CSI-RS) may be composed of K (=total number of configured beams) beams, and/or UE may report measurement results of N selected Tx beams, where N may not be necessarily fixed number. The procedure based on RS for mobility purpose may be not precluded. Reporting information may at least include measurement quantities for N beam (s) and information indicating N DL Tx beam(s), if N<K. Specifically, when a UE is configured with K'>1 non-zero power (NZP) CSI-RS resources, a UE may report N' CRIs (CSI-RS Resource Indicator). A UE may be configured with the following high layer parameters for beam management. N≥1 reporting settings, M≥1 resource settings: the links between reporting settings and resource settings may be configured in the agreed CSI measurement setting; CSI-RS based P-1 & P-2 may be supported with resource and reporting settings; and/or P-3 may be supported with or without reporting setting. A reporting setting at least including: information indicating selected beam(s); L1 measurement reporting; time-domain behavior, e.g. aperiodic, periodic, semi-persistent; and/or frequency-granularity if multiple frequency granularities are supported. A resource setting at least including: time-domain behavior, e.g. aperiodic, periodic, semi-persistent; RS type, e.g. NZP CSI-RS at least; at least one CSI-RS resource set, with each CSI-RS resource set having K≥1 CSI-RS resources (Some parameters of K CSI-RS resources may be the same, e.g. port number, time-domain behavior, density and periodicity if any).

In an example, a beam reporting may be supported at least based on an alternative 1 as follow. UE may report information about TRP Tx Beam(s) that may be received using selected UE Rx beam set(s) where a Rx beam set may refer to a set of UE Rx beams that may be used for receiving a DL signal. It may be UE implementation issues on how to construct the Rx beam set. One example may be that each of Rx beam in a UE Rx beam set may correspond to a selected Rx beam in each panel. For UEs with more than one UE Rx beam sets, the UE may report TRP Tx Beam(s) and an identifier of the associated UE Rx beam set per reported TX beam(s). Different TRP Tx beams reported for the same Rx beam set may be received simultaneously at the UE. Different TRP TX beams reported for different UE Rx beam set may not be possible to be received simultaneously at the UE.

In an example, a beam reporting may be supported at least based on an alternative 2 as follow. UE may report information about TRP Tx Beam(s) per UE antenna group basis where UE antenna group may refer to receive UE antenna panel or subarray. For UEs with more than one UE antenna group, the UE may report TRP Tx Beam(s) and an identifier of the associated UE antenna group per reported TX beam. Different TX beams reported for different antenna groups may be received simultaneously at the UE. Different TX beams reported for the same UE antenna group may not be possible to be received simultaneously at the UE.

In an example, NR may support the following beam reporting considering L groups where L>=1 and/or each group may refer to a Rx beam set (alternative 1) or a UE antenna group (alternative 2) depending on which alternative may be adopted. For each group L, UE may report at least the following information: information indicating group at least for some cases; measurement quantities for N_L beam(s), which may support L1 RSRP and CSI report (when CSI-RS is for CSI acquisition); and/or information indicating N_L DL Tx beam(s) when applicable. This group based beam reporting may be configurable per UE basis. This group based beam reporting may be turned off per UE basis, e.g. when L=1 or N_L=1. Group identifier may not be reported when it is turned off.

In an example, NR (New Radio) may support that UE may be able to trigger mechanism to recover from beam failure. Beam failure event may occur when the quality of beam pair link(s) of an associated control channel falls low enough (e.g. comparison with a threshold, time-out of an associated timer). Mechanism to recover from beam failure may be triggered when beam failure occurs. The beam pair link may be used for convenience, and may or may not be used in specification. Network may configure to UE with resources for UL transmission of signals for recovery purpose. Configurations of resources may be supported where the base station may be listening from all or partial directions, e.g. random access region. The UL transmission/resources to report beam failure may be located in the same time instance as PRACH (resources orthogonal to PRACH resources) and/or at a time instance (configurable for a UE) different from PRACH. Transmission of DL signal may be supported for allowing the UE to monitor the beams for identifying new potential beams.

In an example, NR may support beam management with and without beam-related indication. When beam-related indication is provided, information pertaining to UE-side beamforming/receiving procedure used for CSI-RS-based measurement may be indicated through QCL (Quasi Co-Location) to UE. NR may support using the same or different beams on control channel and the corresponding data channel transmissions.

In an example, for NR-PDCCH transmission supporting robustness against beam pair link blocking, UE may be configured to monitor NR-PDCCH on M beam pair links simultaneously, where M≥1 and the maximum value of M may depend at least on UE capability. UE may be configured to monitor NR-PDCCH on different beam pair link(s) in different NR-PDCCH OFDM symbols. Parameters related to UE Rx beam setting for monitoring NR-PDCCH on multiple beam pair links may be configured by higher layer signaling or MAC CE and/or considered in the search space design. At least, NR may support indication of spatial QCL assumption between an DL RS antenna port(s), and DL RS antenna port(s) for demodulation of DL control channel. Candidate signaling methods for beam indication for a NR-PDCCH (i.e. configuration method to monitor NR-PDCCH) may be MAC CE signaling, RRC signaling, DCI signaling, specification-transparent and/or implicit method, and combination of these signaling methods. Indication may not be needed for some cases.

In an example, for reception of unicast DL data channel, NR may support indication of spatial QCL assumption between DL RS antenna port(s) and DMRS antenna port(s) of DL data channel. Information indicating the RS antenna port(s) may be indicated via DCI (downlink grants). The information may indicate the RS antenna port(s) which may be QCL-ed with DMRS antenna port(s). Different set of DMRS antenna port(s) for the DL data channel may be indicated as QCL with different set of RS antenna port(s). Indication may not be needed for some cases.

In an example, a CU-DU interface between CU and DU may be defined as an F1 interface. In an example, there may be transport networks with performances that may vary from high transport latency to low transport latency in the real deployment. For transport network with higher transport latency, higher layer splits may be applicable. For transport network with lower transport latency, lower layer splits may also be applicable and preferable to realize enhanced performance (e.g. centralized scheduling). Thus, preferable option may be different between different types of transport networks (ranging from lower layer split for transport networks with lower transport latency to higher layer split for transport networks with higher transport latency). Furthermore, within lower layer split discussion, there may be both demands to reduce transport bandwidth and demands to support efficient scheduling and advanced receivers.

In an example, LTE<->NR interworking may be based on Dual-Connectivity-like mechanisms. Such approach may not imply a particular functional split. The requirement that may be extrapolated by the LTE-NR tight interworking requirement may be that of allowing aggregation of PDCP functionalities, in case of split bearers.

In an example, some possible options for the granularity of the CU/DU functional split may be per CU (each CU may a fixed split, and DUs may be configured to match this) and/or per DU (each DU may be configured with a different split. The choice of a DU split may depend on specific topology or backhaul support in an area). For 2 cases, one possible way on how the CU/DU decide or coordinate the split may be through configuration. Alternatively, the split may be negotiated taking into account capabilities of the two units (CU and DU), and deployment preference e.g. based on backhaul topology. In an example, additional split granularity options may be as followings: per UE (different UEs may have different service levels, or belong to different categories, that may be best served in different ways by the RAN e.g. a low rate IoT-type UE with no need for low latency may not necessarily require higher layer functions close to the RF), per bearer (different bearers may have different QOS requirements that may be best supported by different functionality mapping. For example, QCI=1 type bearer may require low delay but may not not SDU error sensitive, while eMBB may not be delay sensitive but may have challenging requirements on throughput and SDU error rate), and/or per slice (it may be expected that each slice may have at least some distinctive QOS requirements. Regardless of how exactly a slice is implemented within the RAN, different functionality mapping may be suitable for each slice).

Per CU and Per DU options may pertain to flexibility of network topology, and may be straightforward to support. Whether procedures may be required to handle the initial configuration (or O&M may be relied upon) may not be discussed during the study phase. Note that in the Per DU option, one CU may need to support different split levels in different interfaces, which may not the case in the Per CU option. Further granularity (Per UE, Per bearer, Per slice) may require analysis and justification based on QoS and latency requirements. Note that the Per UE, Per bearer and Per slice options may imply that a particular instance of the interface between CU/DU may need to support simultaneously multiple granularity levels on user plane. The baseline may be CU based or DU based. If there are demands to have finer granularity (e.g. Per UE, Per bearer, Per slice), justification may be made clear first.

In an example, dynamicity may imply that the protocol distribution and the interface between the CU and DU may need to be reconfigured. If the switching occurs in CU-DU setup procedure (F1 interface setup procedure), the interface design may not be influenced largely as the split option may not be changed during operation. If the switching occurs during operation, there may be impact on complexity of interface.

In an example, it may be possible that not all of the defined functional splits allow for having RRM functions like Call Admission Control and Load balancing in the CU controlling multiple DUs. This may allow for the potential of increased efficiency in inter-cell coordination for RRM functions like the coordination of interference management, load balancing and Call Admission Control. However, that efficiency may only be realized if the CU may have reliable and accurate understanding of the current environment at the DU which may include issues beyond just radio conditions, but may include current processing capabilities, or in the case of wireless or mesh backhauling help in determining current terrestrial capacity.

In an example, functional split Option 5, Option 6, Option 7 and Option 8 may allow for scheduling of data transmission in the CU. Having centralized scheduling may provide benefit particularly for interference management and coordinated transmission in multiple cells (like soft handover in UMTS, or CoMP in LTE). However, this may require the CU to have an even better understanding of the state of the DU radio conditions than for CAC and other centralized RRM functions. It also may require either very low latency/jitter transport or sufficiently tight coordination of timing and reception of user plane data (one solution may be the window mechanism used on the UP in UMTS), but this may be challenging particularly for lower latency use cases in NR. Centralization of RAN functions may have strong potential for some benefits such as reduced cost, improved scalability, more efficient inter-cell coordination for interference management as well as improved mobility in ultra-dense deployments.

In an example, the RRC related functions may be located in the CU. The RRC message between the gNB and the UE may be transferred through the interface (e.g. F1 interface) between the CU and the DU. RRC messages may require a differentiated transport between CU and DU compared to data transport, e.g. in terms of robustness and delay.

In an example, F1-C and F1-U may provide C-plane and U-plane over F1 interface, respectively. In this architecture, CU and DU may be defined as follows. Central Unit (CU) may be a logical node that may include a subset of the gNB functions as listed excepting those functions allocated exclusively to the DU. CU may control the operation of DUs. Distributed Unit (DU) may be a logical node that may include, depending on the functional split option, a subset of the gNB functions. The operation of DU may be controlled by the CU.

In an example, gNB-CU UE F1AP ID may be allocated so as to uniquely identify the UE over the F1 interface within a gNB-CU and an associated gNB-DU. When a gNB-DU receives a gNB-CU UE F1AP ID, it may store it for the duration of the UE-associated logical F1-connection for this UE. The gNB-CU UE F1AP ID may be unique within the gNB-CU logical node and the associated gNB-DU logical node. The definition of the AP ID may be pending the decision on whether the DU can be connected to multiple CU. UE-associated signaling may be one or more F1AP messages associated to one UE, wherein the one or more F1AP messages may use the UE-associated logical F1-connection for association of the message to the UE in gNB-DU and gNB-CU. The UE-associated logical F1-connection may use the identities gNB-CU UE F1AP ID. For a received UE associated FLAP message, the gNB-CU and gNB-DU may identify the associated UE based on the gNB-CU UE F1AP ID IE. The UE-associated logical F1-connection may exist before the F1 UE context is setup in gNB-DU.

In an example, the purpose of the F1 Setup procedure may be to exchange application level data needed for the gNB-DU and the gNB-CU to correctly interoperate on the F1 interface (i.e. CU-DU interface). This procedure may be the first FLAP procedure triggered after the TNL association may have become operational. The procedure may use non-UE associated signaling. This procedure may erase existing application level configuration data in the two nodes and may replace it by the one received and may clear gNB-CU overload state information at the gNB-DU. If the gNB-DU and gNB-CU do not agree on retaining the UE Contexts, this procedure may re-initialize the F1AP UE-related contexts and may erase related signaling connections in the two nodes like a Reset procedure would do.

In an example embodiment, a distributed radio access network entity (DU, distributed unit) may transmit a radio link state information for a wireless device to a central radio access network entity (CU, central unit). The radio link state information may comprise one or more indications indicating that the wireless device may experience a radio link failure and/or that the distributed radio access network entity may lose a connection with the wireless device. The central radio access network entity may determine a radio link failure of the wireless device at least based on one or more elements of the radio link state information, and/or may determine to release a wireless device context of the wireless device.

A NR (New Radio) may support both single beam and multi-beam operations. In a multi-beam system, gNB may need a downlink beam sweep to provide coverage for DL synchronization signals (SSs) and common control channels. To enable UEs to access the cell, the UEs may need the similar sweep for UL direction as well.

In the single beam scenarios, the network may configure time-repetition within one synchronization signal (SS) block, which may comprise at least PSS (Primary synchronization signal), SSS (Secondary synchronization signal), and PBCH (Physical broadcast channel), in a wide beam. In multi-beam scenarios, the network may configure at least some of these signals and physical channels (e.g. SS Block) in multiple beams such that a UE identifies at least OFDM symbol index, slot index in a radio frame and radio frame number from an SS block.

An RRC_INACTIVE or RRC_IDLE UE may need to assume that an SS Block may form an SS Block Set and, an SS Block Set Burst, having a given periodicity. In multi-beam scenarios, the SS Block may be transmitted in multiple beams, together forming an SS Burst. If multiple SS Bursts are needed to transmit beams, these SS Bursts together may form an SS Burst Set as illustrated in FIG. 27. FIG. 27 illustrates examples of different configurations of an SS Burst Set. Top: Time-repetition within one SS Burst in a wide beam. Middle: Beam-sweeping of a small number of beams using one SS Burst in the SS Burst Set. Bottom: Beam-sweeping of a larger number of beams using more than one SS Burst in the SS Burst Set to form a complete sweep.

Figure 28:
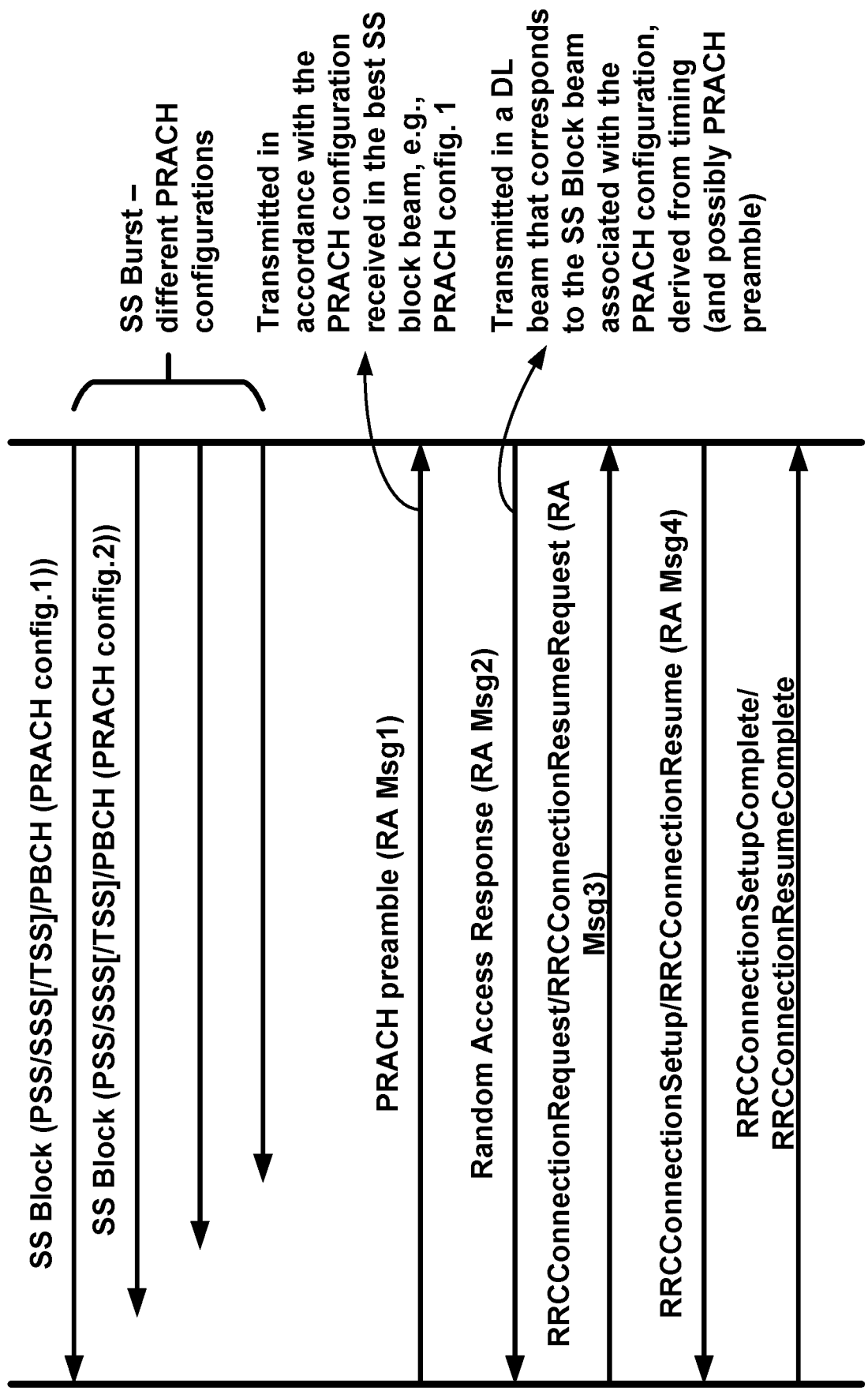
FIG. 28 is an example diagram of an aspect of an embodiment of the present disclosure.

In the multi-beam scenario, for the same cell, PSS/SSS/PBCH may be repeated to support cell selection/reselection and initial access procedures. There may be some differences in the conveyed PRACH configuration implied by the TSS (Tertiary synchronization signal) on a beam basis within an SS Burst. Under the assumption that PBCH carries the PRACH configuration, a gNB may broadcast PRACH configurations possibly per beam where the TSS may be utilized to imply the PRACH configuration differences. FIG. 28 illustrates an example of an RA procedure comprising broadcasting multiple SS blocks.

In an example, the base station may transmit to a wireless device one or more messages comprising configuration parameters of one or more cells. The configuration parameters may comprise parameters of a plurality of CSI-RS signal format and/or resources. Configuration parameters of a CSI-RS may comprise one or more parameters indicating CSI-RS periodicity, one or more parameters indicating CSI-RS subcarriers (e.g. resource elements), one or more parameters indicating CSI-RS sequence, and/or other parameters. Some of the parameters may be combined into one or more parameters. A plurality of CSI-RS signals may be configured. In an example, the one or more message may indicate the correspondence between SS blocks and CSI-RS signals.

The one or more messages may be RRC connection setup message, RRC connection resume message, and/or RRC connection reconfiguration message. In an example, a UE in RRC-Idle mode may not be configured with CSI-RS signals and may receive SS blocks and may measure a pathloss based on SS signals. A UE in RRC-connected mode, may be configured with CSI-RS signals and may be measure pathloss based on CSI-RS signals. In an example, a UE in RRC inactive mode may measure the pathloss based on SS blocks, e.g. when the UE moves to a different base station that has a different CSI-RS configuration compared with the anchor base station.

Figure 29:
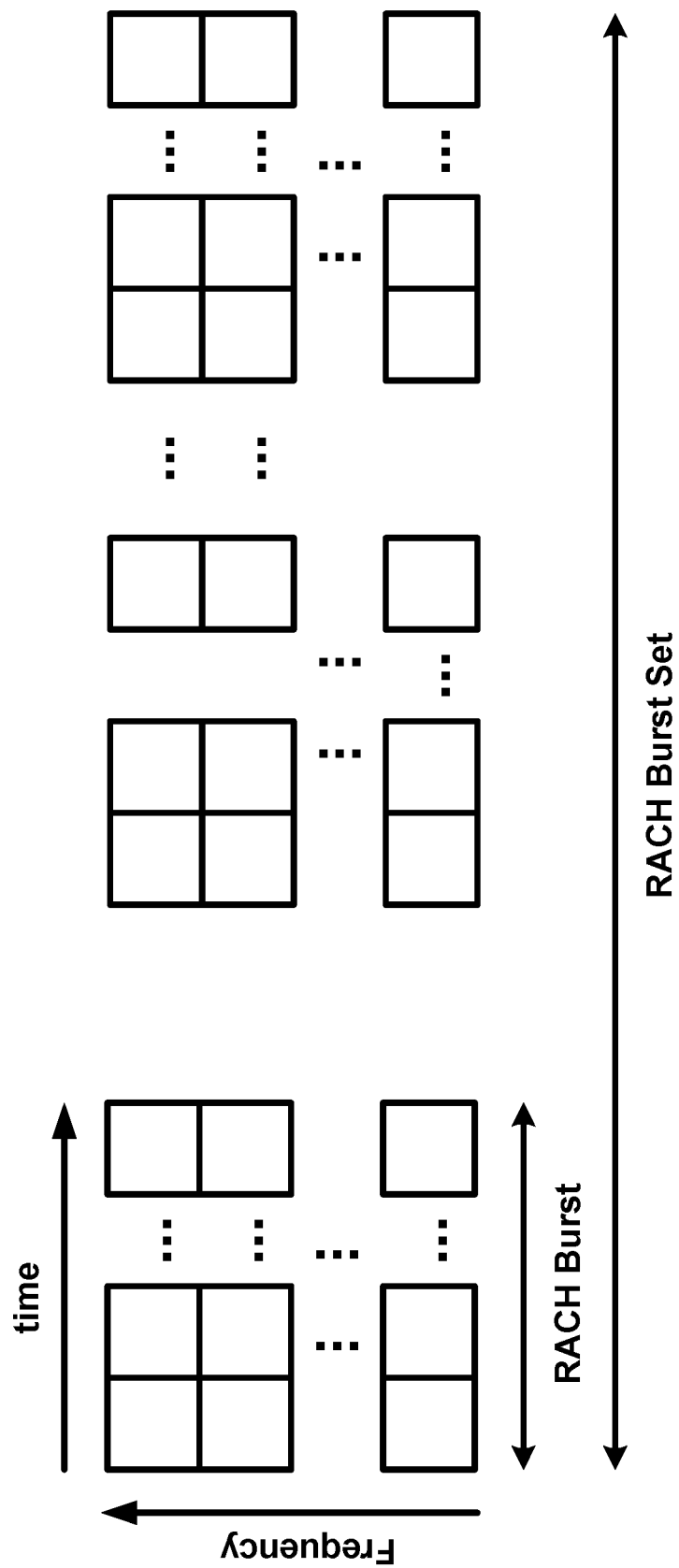
FIG. 29 is an example diagram of an aspect of an embodiment of the present disclosure.

Example PRACH burst/RACH resource partitioning: In a multi-beam system, a NR may configure different types of PRACH resources that may be associated with SS blocks and/or DL beams. In NR, a PRACH transmission occasion may be defined as the time-frequency resource on which a UE transmits a preamble using the configured PRACH preamble format with a single particular Tx beam and for which gNB performs PRACH preamble detection. One PRACH occasion may be used to cover the beam non-correspondence case. gNB may perform RX sweep during PRACH occasion as UE TX beam alignment is fixed during single occasion. A PRACH burst may mean a set of PRACH occasions allocated consecutively in time domain, and a PRACH burst set may mean a set of PRACH bursts to enable full RX sweep. FIG. 29 illustrates an example of configured PRACH occasion, PRACH burst, and PRACH burst set. FIG. 29 illustrates an example of a RACH Occasion, RACH Burst and RACH Burst Set.

There may be an association between SS blocks (DL signal/channel) and PRACH occasion and a subset of PRACH preamble resources. One PRACH occasion may comprise a set of preambles. In multi beam operation, the gNB may need to know which beam or set of beams it may use to send RAR and the preambles may be used to indicate that. NR may configure following partitioning and mappings in multi beam operation:

The timing from SS block to the PRACH resource may be indicated in the MIB. In an example, different TSS may be used for different timings such that the detected sequence within TSS indicates the PRACH resource. This PRACH configuration may be specified as a timing relative to the SS block, and may be given as a combination of the payload in the MIB and another broadcasted system information.

Association between SS block and a subset of RACH resources and/or a subset of preamble indices may be configured so that TRP may identify the best DL beam for a UE according to resource location or preamble index of received preamble. An association may be independent and at least either a subset of RACH resources or subset of preamble indices may not be allowed to be associated with multiple SS blocks.

Figure 30:
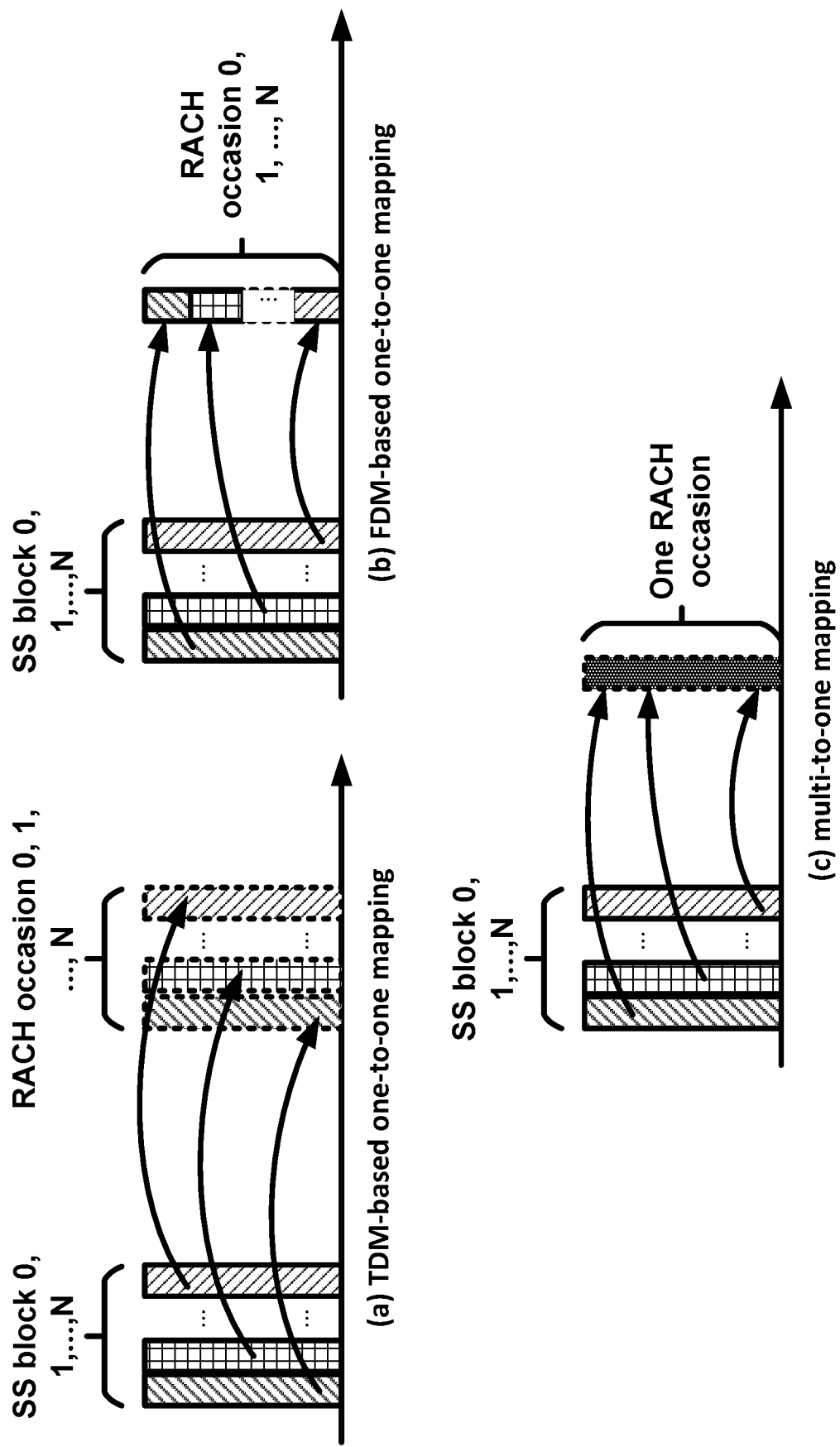
FIG. 30 is an example diagram of an aspect of an embodiment of the present disclosure.

Example SS-block specific PRACH preamble resources: PRACH resources may be partitioned on SS-blocks basis in multiple beams operation. There may be one to one and/or many to one mapping between SS-blocks and PRACH occasions. FIG. 30 illustrates an example of TDD (FIG. 30(a))/FDD (FIG. 30(b)) based one to one mapping and multi-to-one mapping (FIG. 30(c)) between SS-blocks and PRACH occasions.

UE may detect SS-block based on DL synchronization signals and differentiate SS-blocks based on the time index. With one-to-one mapping of beam or beams used to transmit SS-block and a specific PRACH occasion, the transmission of PRACH preamble resource may be an indication informed by a UE to gNB of the preferred SS-block. This way the PRACH preamble resources of single PRACH occasion may correspond to specific SS-block and mapping may be done based on the SS-block index. There may be one to one mapping between an SS-block beam and a PRACH occasion. There may not be such mapping for the SS-block periodicity and RACH occasion periodicity.

Depending on the gNB capability (e.g. the used beamforming architecture), there may not be one to one mapping between single SS-block and single RACH occasion. In case beam or beams used for transmitting SS-block and receiving during RACH occasion do not correspond directly, e.g., gNB may form receive beams that cover multiple SS-blocks beams, the preambles of PRACH occasion may be divided between the different SS-blocks in a manner that a subset of PRACH preambles map to specific SS-block.

FIG. 30 illustrates an example of TDM and FDM mapping of PRACH resources.

Example beam-specific PRACH resources: With beam-specific PRACH resources, a gNB DL TX beam may be associated with a subset of preambles. The beam specific PRACH preambles resources may be associated with DL TX beams that are identified by periodical beam and cell specific CSI-RS for L3 Mobility (same signals may be used for L2 beam management/intra-cell mobility as well). A UE may detect the beams without RRC configuration, e.g., reading the beam configuration from minimum SI (MIB/SIB).

Figure 31:
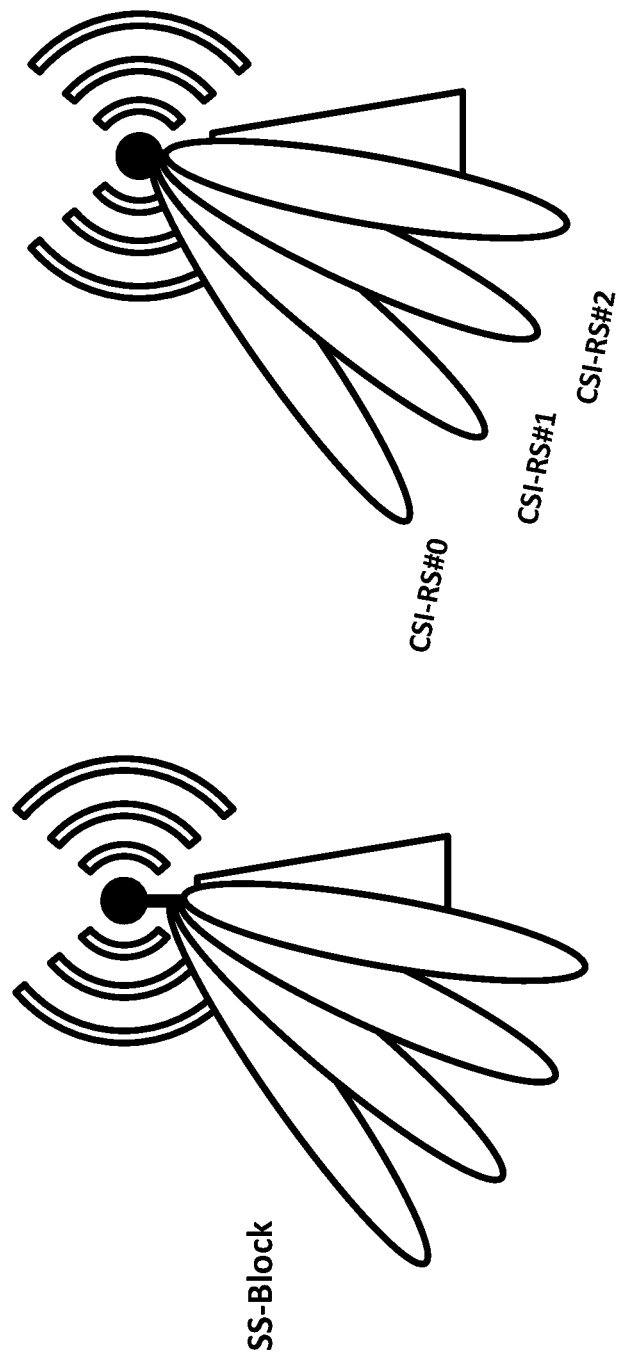
FIG. 31 is an example diagram of an aspect of an embodiment of the present disclosure.

The PRACH resource mapping to specific beams may use SS-block association. Specific beams may be associated with the beams used for transmitting SS-block as illustrated in FIG. 31. In left of FIG. 31, gNB may transmit SS-block using one or multiple beams (in case of analogue/hybrid beamforming), but individual beams may not be detected. From the UE perspective, this is a single beam transmission. In right of FIG. 31, gNB may transmit CSI-RS (for Mobility) using individual beams associated with specific SS-block. A UE may detect individual beams based on the CSI-RS. The left of FIG. 31 illustrates an example of one or more beams configured with an SS block and the right of FIG. 31 illustrates an example of one or more beams configured with CSI-RS.

Figure 32:
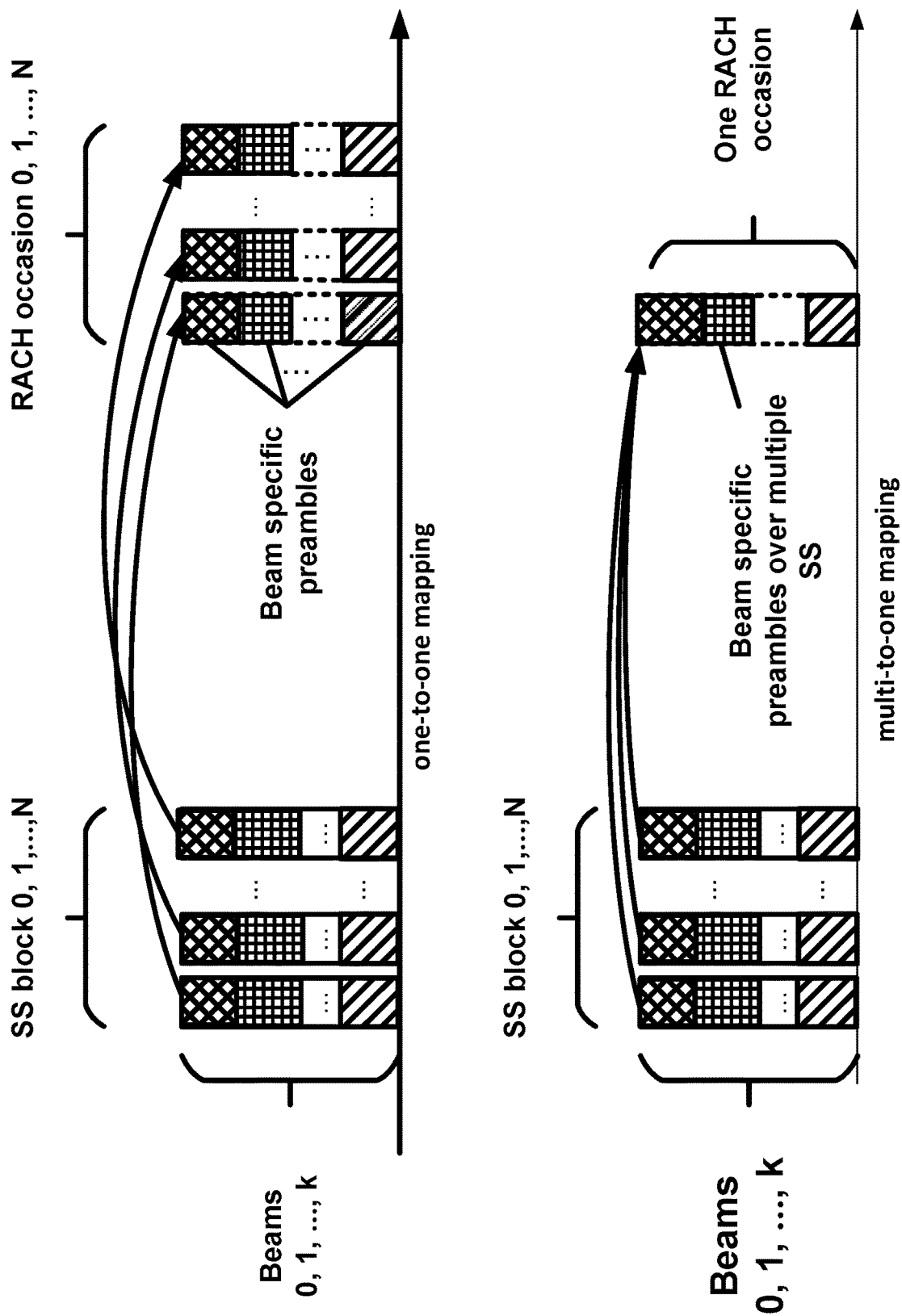
FIG. 32 is an example diagram of an aspect of an embodiment of the present disclosure.

PRACH occasion may be mapped to corresponding SS-block, and a set of PRACH preambles may be divided between beams as illustrated in top of FIG. 32. Similar to mapping of multiple SS-blocks to single PRACH occasion, multiple beams of an SS-block may be mapped to at least one PRACH occasion as illustrated in bottom of FIG. 32. The top of FIG. 32 illustrates an example of mapping beam specific preambles to PRACH occasion with one-to-one mapping and the bottom of FIG. 32 illustrates an example of mapping beam specific preambles to PRACH occasion with k-to-one mapping.

If a PRACH occasion is configured with k preambles, and a PRACH occasion is configured to be SS-block specific, the whole set of preambles may be used to indicate the specific SS-block. In this case, there may be N PRACH occasions corresponding to N SS-blocks.

If multiple SS-blocks are mapped to single PRACH occasion, then the preambles may be divided between SS-blocks and depending on the number of SS-blocks, the available preambles per SS-block may be K/N (K preambles, N SS-blocks).

If K SS-block specific preambles are divided between CSI-RS beams in the corresponding PRACH occasions, the number of available preambles per beam may be determined by the K preambles/number of beams.

If the preambles are partitioned in SS-block specific manner, the UE may indicate preferred SS-block but not the preferred individual DL TX beam to gNB.

The network may configure mapping/partitioning PRACH preamble resources to SS-blocks and/or to individual beams. A UE may determine the used partitioning of PRACH preambles, as much as possible, e.g. based on the PRACH configuration.

Beam-specific PRACH configurations may be configurable when a gNB uses analog RX beamforming. In that case, when a UE sends, for example, a preamble in a beam-specific time/frequency slot associated with one or multiple SS Block transmissions, then the gNB may use the appropriate RX beamforming when receiving the preamble in that time/frequency slot and use the corresponding DL beam when transmitting the RAR. Hence, beam-specific PRACH configurations may allow the gNB to direct its Rx beamforming in the direction of the same beam when monitoring the associated PRACH resources.

Example Subsequent transmissions: In the multi-beam RACH scenario, thanks to the mapping between DL SS beams and PRACH configuration, e.g. time/frequency slot and possibly preamble partitioning, a UE may be under the coverage of a given DL beam or at least a subset of them in a cell. That may enable the network to send a RAR in this best DL beam and/or perform a more optimized beam sweeping procedure e.g. not transmitting the same RAR message in possible beams (e.g. transmitting the RAR in a single beam as in the figure below) as illustrated in FIG. 33.

Figure 33:
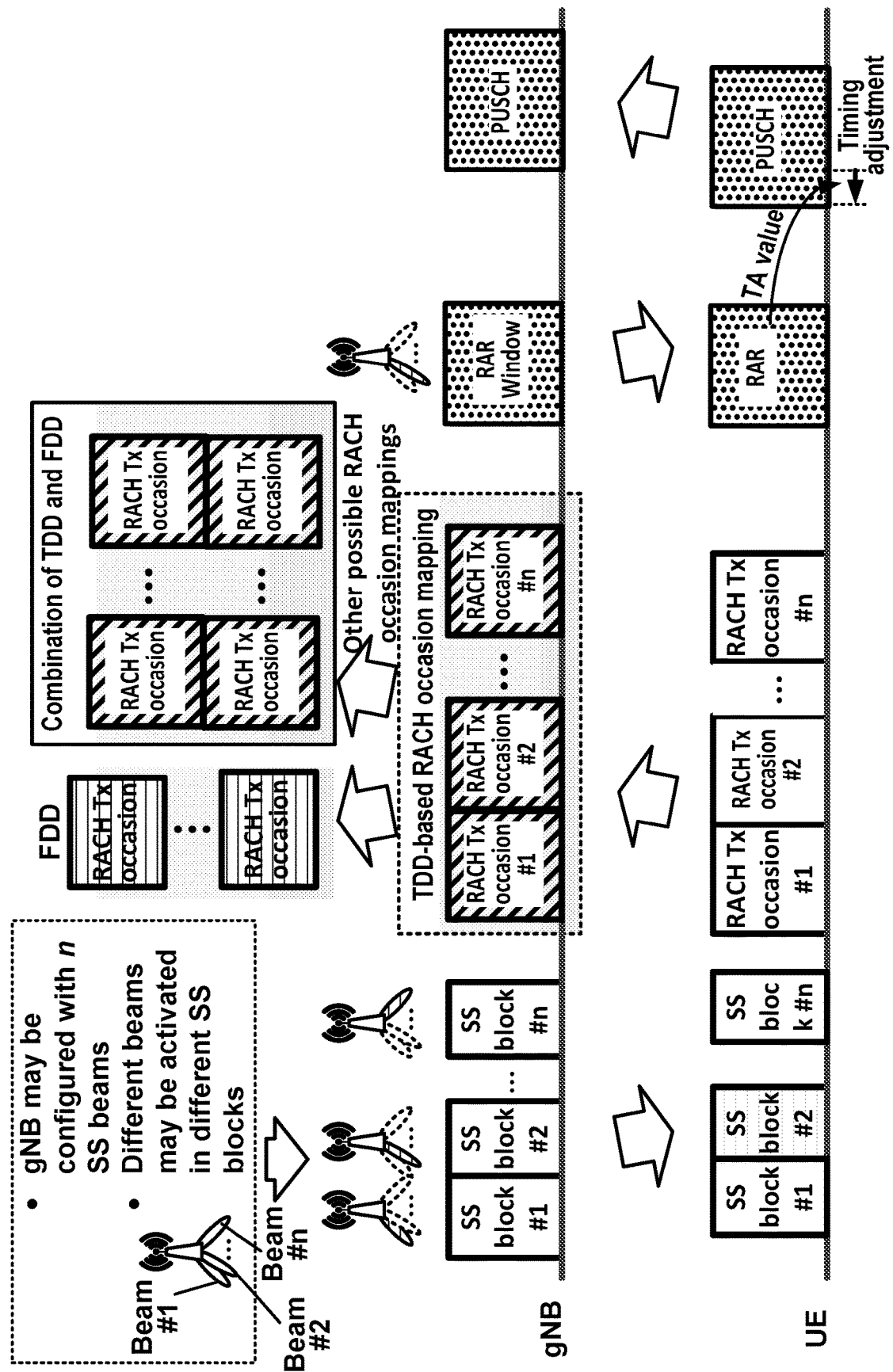
FIG. 33 is an example diagram of an aspect of an embodiment of the present disclosure.

FIG. 33 illustrates an example of an RA procedure with multi-beam; a UE detects the second SS blocks and thereby transmits a preamble on a RACH resource corresponding to the second SS block to inform gNB of the preferred beam. gNB responds with a RAR using the beam that the UE prefers.

Example Contention-free RACH with multi-beam operations: NR may support the contention-free scenarios in a way to provide a dedicated RACH resource for the preamble transmission as in LTE for handover, DL data arrival, positioning and obtaining timing advance alignment for a secondary TAG. For the handover case, a UE may be configured to measure on one or more SS blocks or other RS in a neighboring cell. If one of the neighboring cell SS-block measurements triggers a handover request, the source gNB may signal a preferred beam index in a handover request to the target gNB. The target gNB in turn may provide a beam-specific dedicated RACH resource (including preamble) in the handover command. In an example, the target gNB may provide a set of dedicated resources e.g. one for at least one SS-block in the handover command. The UE then may transmit Msg1 using the dedicated preamble corresponding to the preferred DL beam in the target cell.

Figure 15:
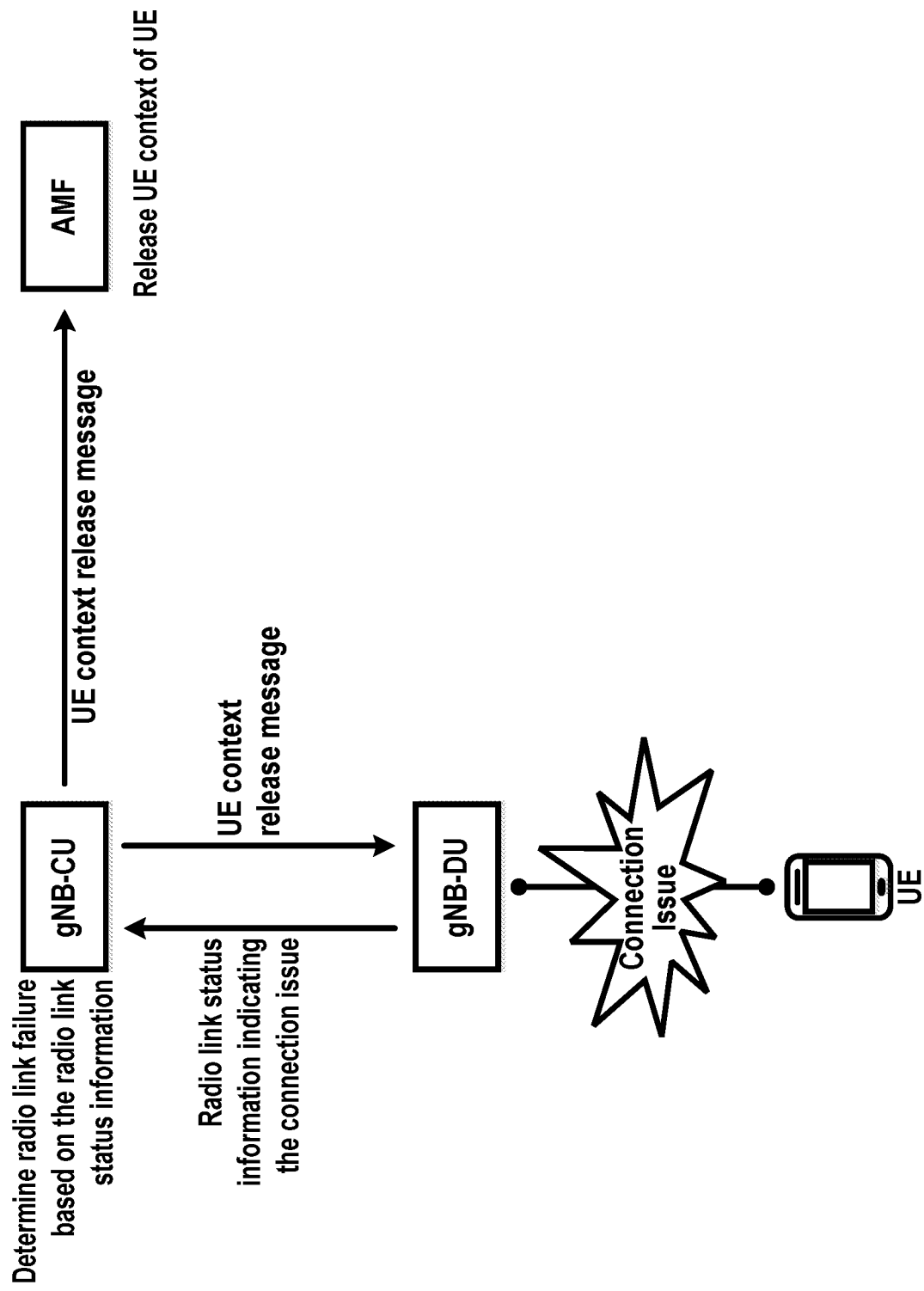
FIG. 15 is an example diagram of an aspect of an embodiment of the present disclosure.
Figure 16:
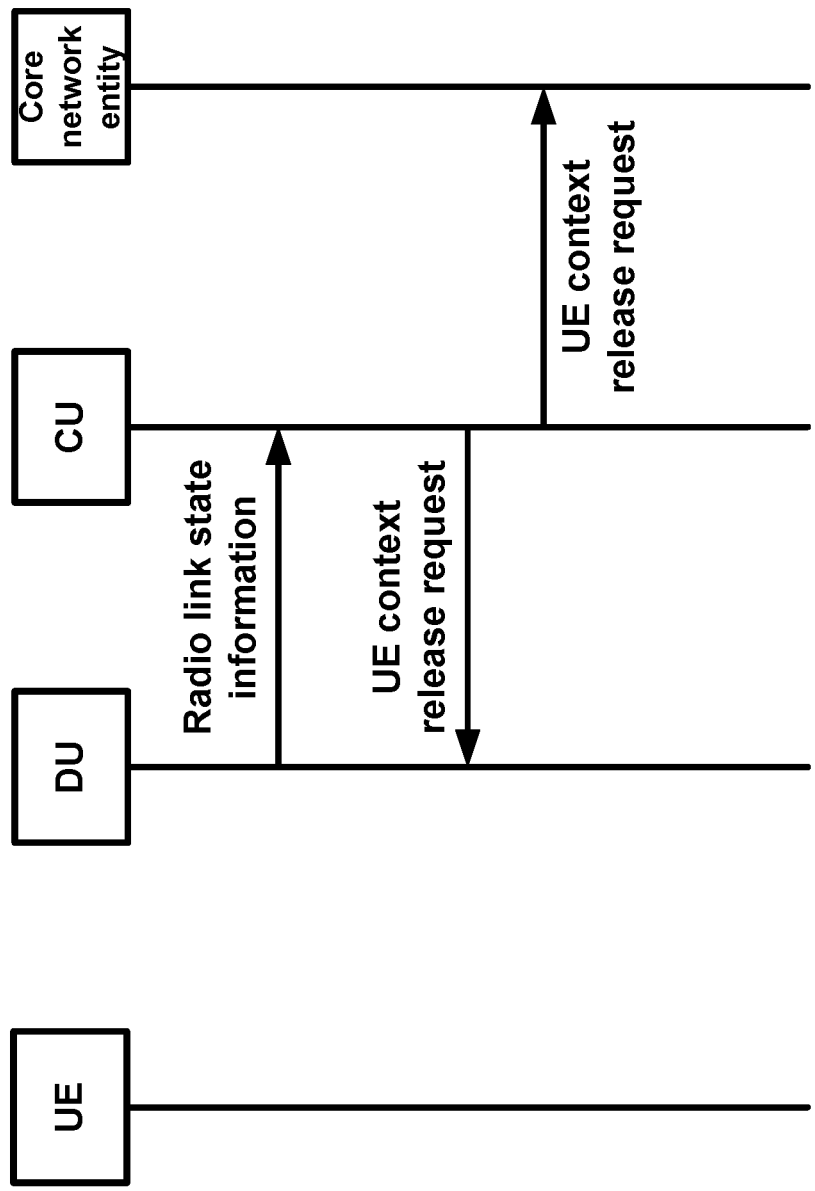
FIG. 16 is an example diagram of an aspect of an embodiment of the present disclosure.

In an example, as shown in FIG. 15 and/or FIG. 16, a distributed radio access network entity (e.g. distributed unit, DU, gNB-DU, and/or the like) may detect one or more radio link state indications indicating that a wireless device (e.g. UE) may experience a radio link failure from the distributed radio access network entity and/or that the distributed radio access network entity may lose and/or have lost a connection with the wireless device. The wireless device may be configured to be served by the distributed radio access network. The one or more radio link state indications may be one or more events that a number of downlink packet retransmissions (e.g. RLC layer packet retransmissions) reaches a threshold number of downlink packet retransmissions. The one or more radio link state indications may be one or more events that the distributed radio access network entity does not receive a (periodic) channel quality indication (CQI) report from the wireless device at least for a first threshold time duration. The one or more radio link state indications may be one or more events that the distributed radio access network entity does not receive at least one packet from the wireless device at least for a second threshold time duration. The one or more radio link state indications may be one or more events that the distributed radio access network entity does not receive a (periodic) precoding matrix indicator (PMI) report and/or a (periodic) rank indicator (RI) from the wireless device at least for a third threshold time duration.

In an example, the distributed radio access network entity may receive at least one of the threshold number of downlink packet retransmissions, the first threshold time duration, the second threshold time duration, and/or the third threshold time duration from a central radio access network entity (e.g. central unit, CU, gNB-CU, and/or the like). In an example, the threshold number of downlink packet retransmissions, the first threshold time duration, the second threshold time duration, and/or the third threshold time duration may be pre-configured to the distributed radio access network entity.

In an example, the one or more radio link state indications may be one or more physical layer link problems and/or one or more MAC/RLC layer link problems between the distributed radio access network entity and the wireless device, the problems detected by the distributed radio access network entity.

In an example, the distributed radio access network entity may transmit, to a central radio access network entity, a first message comprising a radio link state information for the wireless device. The first message may be transmitted via an F1 interface between the distributed radio access network entity and the central radio access network entity. In an example, the first message may comprise a UE context release request message, a UE context modification required message, a UE status information message, and/or an F1 message comprising radio link state related information of the wireless device. The distributed radio access network entity may determine one or more elements of the first message at least based on the detecting of the one or more radio link state indications. In an example, the radio link state information may be associated with one or more serving cells of the distributed radio access network entity. The first message may further comprise one or more cell identifiers of the one or more serving cells associated with the radio link state information.

The radio link state information may comprise at least one of: an indication indicating that a number of downlink packet retransmissions (e.g. RLC layer packet retransmissions) reaches to the threshold number of downlink packet retransmissions; an indication indicating that the distributed radio access network entity does not receive a (periodic) channel quality indication report from the wireless device at least for a first threshold time duration; an indication indicating that the distributed radio access network entity does not receive a sounding reference signal (SRS) from the wireless device at least for a certain threshold time duration; an indication indicating that the distributed radio access network entity does not receive at least one packet from the wireless device at least for the second threshold time duration; an indication indicating that the distributed radio access network entity does not receive a (periodic) precoding matrix indicator (PMI) report and/or a (periodic) rank indicator (RI) from the wireless device at least for the third threshold time duration; one or more indications indicating one or more physical layer link problems and/or one or more MAC/RLC layer link problems between the distributed radio access network entity and the wireless device; and/or the like.

In an example, the radio link state information may comprise a radio link failure indication explicitly indicating that a radio link of the wireless device may be failed (e.g. as a result that a primary cell of the wireless device has a radio link problem (e.g. connection failure)). In an example, the radio link state information may comprise a connection loss indication explicitly indicating that the distributed radio access network entity may lose and/or have lost a connection with the wireless device. The distributed radio access network entity may determine that a radio link of the wireless device is failed and/or that a connection with the wireless device is lost at least based on the detecting of the one or more radio link state indications indicating that the wireless device may experience a radio link failure from the distributed radio access network entity.

In an example, the central radio access network entity may determine a radio link failure of the wireless device and/or may determine a connection loss with the wireless device at least based on one or more elements of the first message (e.g. as a result that the radio link state information of the first message indicates that a primary cell of the wireless device has a radio link problem (e.g. connection failure)). The central radio access network entity may start one or more timers at least based on one or more elements of the radio link state information received via the first message. In an example, if the central radio access network entity receives, from the distributed radio access network entity, an indication indicating that a radio link failure related situation and/or a connection loss related situation (e.g. situations indicated via the one or more elements of the radio link state information) is resolved and/or recovered, the central radio access network entity may stop at least one of the one or more timers. If one or more of the one or more timers are expired, the central radio access network entity may determine a radio link failure of the wireless device and/or may determine a connection loss with the wireless device.

In an example, the central radio access network entity may determine a radio link failure of the wireless device and/or may determine a connection loss with the wireless device at least based on detecting that the central radio access network entity (e.g. PDCP layer) does not receive at least one packet from the wireless device at least for a threshold time duration.

In an example, in response to determining a radio link failure of the wireless device and/or determining a connection loss with the wireless device, the central radio access network entity may release one or more wireless device contexts comprising one or more data radio bearers, one or more bearers, one or more protocol data unit sessions (PDU sessions), one or more QoS flows, one or more security related parameters, one or more configuration parameters for the wireless device, and/or the like.

In an example, in response to determining a radio link failure of the wireless device and/or determining a connection loss with the wireless device, the central radio access network entity may transmit, to the distributed radio access network entity, a second message configured to request a first wireless device context release for the wireless device. The second message may be transmitted via an F1 interface between the distributed radio access network entity and the central radio access network entity. In an example, the second message may comprise a UE context release command message, a UE context modification request message, and/or an F1 message indicating release of UE context of the wireless device. One or more elements of the second message may be determined at least based on one or more elements of the radio link state information of the first message. The second message may comprise a wireless device identifier (e.g. C-RNTI, IMSI, TMSI, UE F1AP ID, gNB-CU UE F1AP ID, gNB-DU UE F1AP ID, and/or an identifier identifying the wireless device at least at the distributed radio access network entity) of the wireless device, a cause of requesting a first wireless device context release, and/or the like. The cause of requesting a first wireless device context release may comprise a radio link failure of the wireless device and/or a connection loss with the wireless device.

In an example, in response to receiving the second message, the distributed radio access network entity may release a first wireless device context of the wireless device. The first wireless device context may comprise one or more bearers (one or more logical channels), one or more security information, one or more configuration parameters associated with the wireless device, and/or the like. In an example, the distributed radio access network entity may transmit, to the central radio access network entity, an indication message indicating that the distributed radio access network entity released (removed) one or more of the first wireless device context in response to the second message.

In an example, if the distributed radio access network entity determines a radio link failure of the wireless device and/or a connection loss with the wireless device at least based on the one or more radio link state indications, the distributed radio access network entity may request, to the central radio access network entity, releasing one or more elements of the first wireless device context for the wireless device. The distributed radio access network entity may transmit a cause of requesting the release. The cause may be at least one of a radio link failure of the wireless device and/or a connection loss with the wireless device.

In an example, in response to determining a radio link failure of the wireless device and/or determining a connection loss with the wireless device, the central radio access network entity may transmit, to a core network entity (e.g. AMF, access and mobility management function), a third message configured to request a second wireless device context release for the wireless device. In an example, the third message may be a UE context release request message (wireless device context release request message). The third message may be transmitted via an interface between the central radio access and the core network entity (e.g. an NG interface). In an example, the third message may comprise a wireless device identifier (e.g. C-RNTI, IMSI, TMSI, AMF UE NGAP ID, gNB UE NGAP ID, gNB-CU UE F1AP ID, gNB-DU UE F1AP ID, and/or an identifier identifying the wireless device at least at the core network entity) of the wireless device, a cause of requesting a second wireless device context release, and/or the like. The cause of requesting a second wireless device context release may comprise a radio link failure of the wireless device and/or a connection loss with the wireless device.

In an example, in response to receiving the third message, the core network entity may release a second wireless device context associated with an interface connection between the central radio access network entity and the core network entity for the wireless device (e.g. NG connection associated with the wireless device). The second wireless device context (for the wireless device) released by the core network entity may comprise one or more bearers (e.g. one or more NG bearers), one or more protocol data unit (PDU) sessions, one or more QoS flows, one or more security information, one or more configuration parameters associated with the wireless device, and/or the like. In an example, the core network entity may transmit, to the central radio access network entity, an indication message indicating that the core network entity released (removed) one or more of the second wireless device context as a response to the third message.

In an example, a distributed radio access network entity may transmit, to a central radio access network entity, a first message comprising a radio link state information for a wireless device. The radio link state information may comprise at least one of: an indication indicating that a number of downlink packet retransmissions reaches to a threshold number of downlink packet retransmissions; an indication indicating that the distributed radio access network entity does not receive a (periodic) channel quality indication report from the wireless device at least for a first threshold time duration; an indication indicating that the distributed radio access network entity does not receive at least one packet from the wireless device at least for a second threshold time duration; and/or a radio link failure indication. The distributed radio access network entity may receive, from the central radio access network entity, a second message configured to request a first wireless device context release for the wireless device. The second message may be determined at least based on one or more elements of the radio link state information.

In an example, the radio link state information may be associated with a cell identifier of a serving cell of the distributed radio access network entity. The central radio access network entity may determine a radio link failure of the wireless device and/or a connection lose for the wireless device at least based on one or more elements of the radio link state information received via the second message. The central radio access network entity may transmit, to a core network entity, a third message configured to request a second wireless device context release for the wireless device. The second wireless device context release may be at least associated with an interface connection between the central radio access network entity and the core network entity for the wireless device. In an example, the first wireless device context release may be associated with releasing a wireless device context of the wireless device. The wireless device context may comprise at least one of: one or more data radio bearers; one or more logical channels; one or more security configuration parameters; and/or one or more information associated with the wireless device.

Distributed Unit Configuration Update

In an example, a base station may consider radio resource condition and traffic status to configure wireless device control parameters, resource configuration parameters, and/or cell configuration parameters. In the functional split scenario, a base station central unit configures wireless device control parameters, and a base station distributed unit may monitor radio resource condition and traffic status of the distributed unit. In an existing technology, a base station CU may have less information of lower layer radio condition (e.g. physical layer, MAC layer, RLC layer, and/or the like). When a central unit configure wireless device configuration parameters, resource parameters, and/or cell configuration parameters, the lack of lower layer radio condition and/or status information may cause inappropriate configurations, which may decrease cellular system performance. In an example, the lack of lower layer status information may cause a central unit to configure system and/or wireless device configuration parameter inappropriate for current radio and/or traffic status. The inappropriate configuration may cause increased call dropping ratio, packet error rate, and/or packet transmission delay, and further may decrease communication reliability and/or increase data transmission latency.

Example implementation of embodiments may support a base station distributed unit to inform a base station central unit of lower layer radio condition information and/or traffic status of cells. Example implementation of embodiments may support a base station distributed unit to request a base station central unit to modify radio and/or wireless device configuration parameters (e.g. release/modify bearers) based on lower layer radio condition information and/or traffic status of cells. In an example embodiment, a distributed unit (DU) may request, to a central unit (CU), a distributed entity modification for a wireless device based on detecting one or more network system state and/or one or more radio network state associated with the distributed unit. The central unit may transmit, to the distributed unit, a response message for the request and/or may modify one or more network configurations for the wireless device at least based on the request. Example implementation of embodiments may increase communication reliability and/or reduce data transmission latency of wireless communication systems.

In an example embodiment, a distributed radio access network entity (DU, distributed unit) may request, to a central radio access network entity (CU, central unit), a distributed entity modification for a wireless device based on detecting one or more network system state and/or one or more radio network state associated with the distributed radio access network entity. The central radio access network entity may transmit, to the distributed radio access network entity, a response message for the request and/or may modify one or more network configurations for the wireless device at least based on the request.

Figure 17:
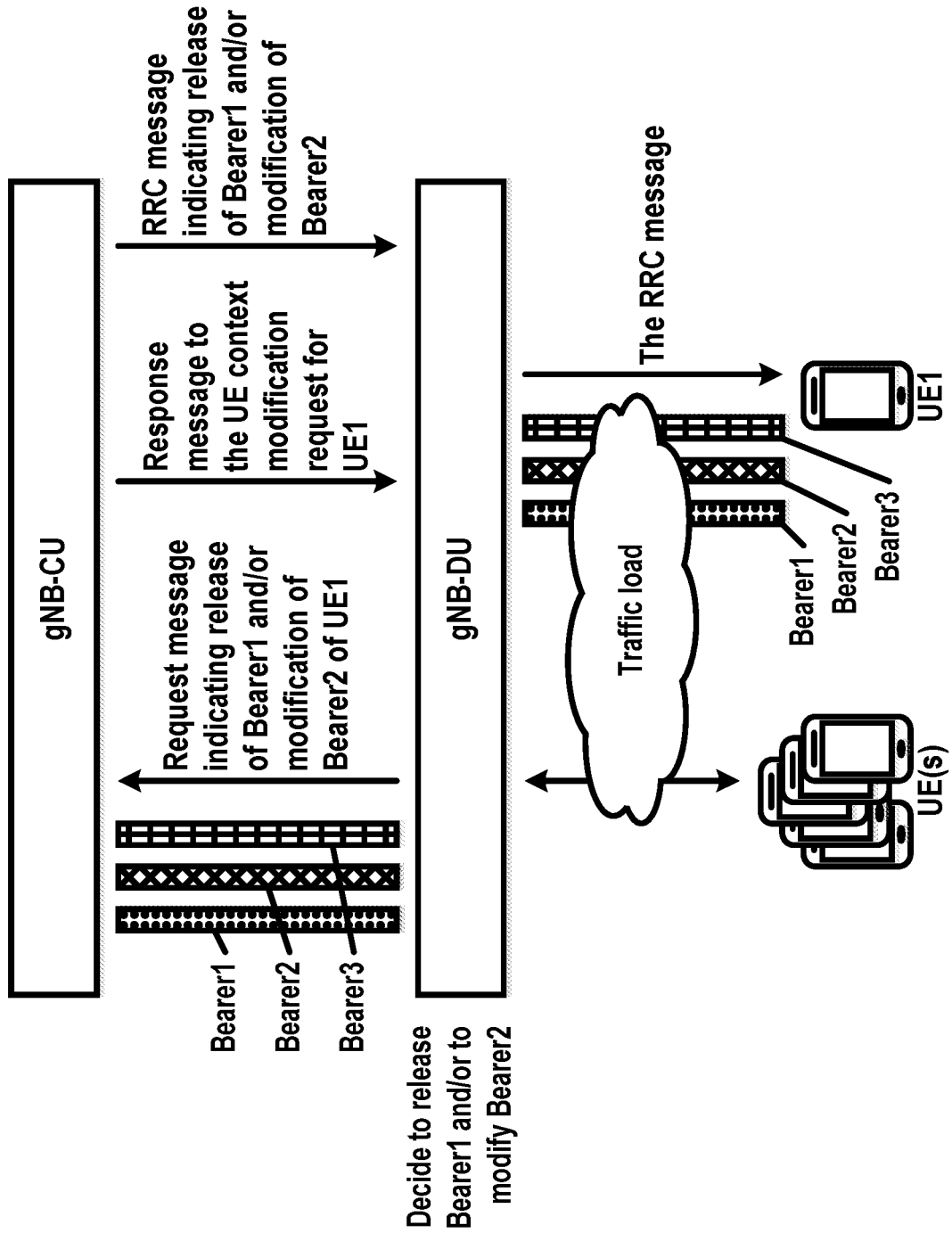
FIG. 17 is an example diagram of an aspect of an embodiment of the present disclosure.
Figure 18:
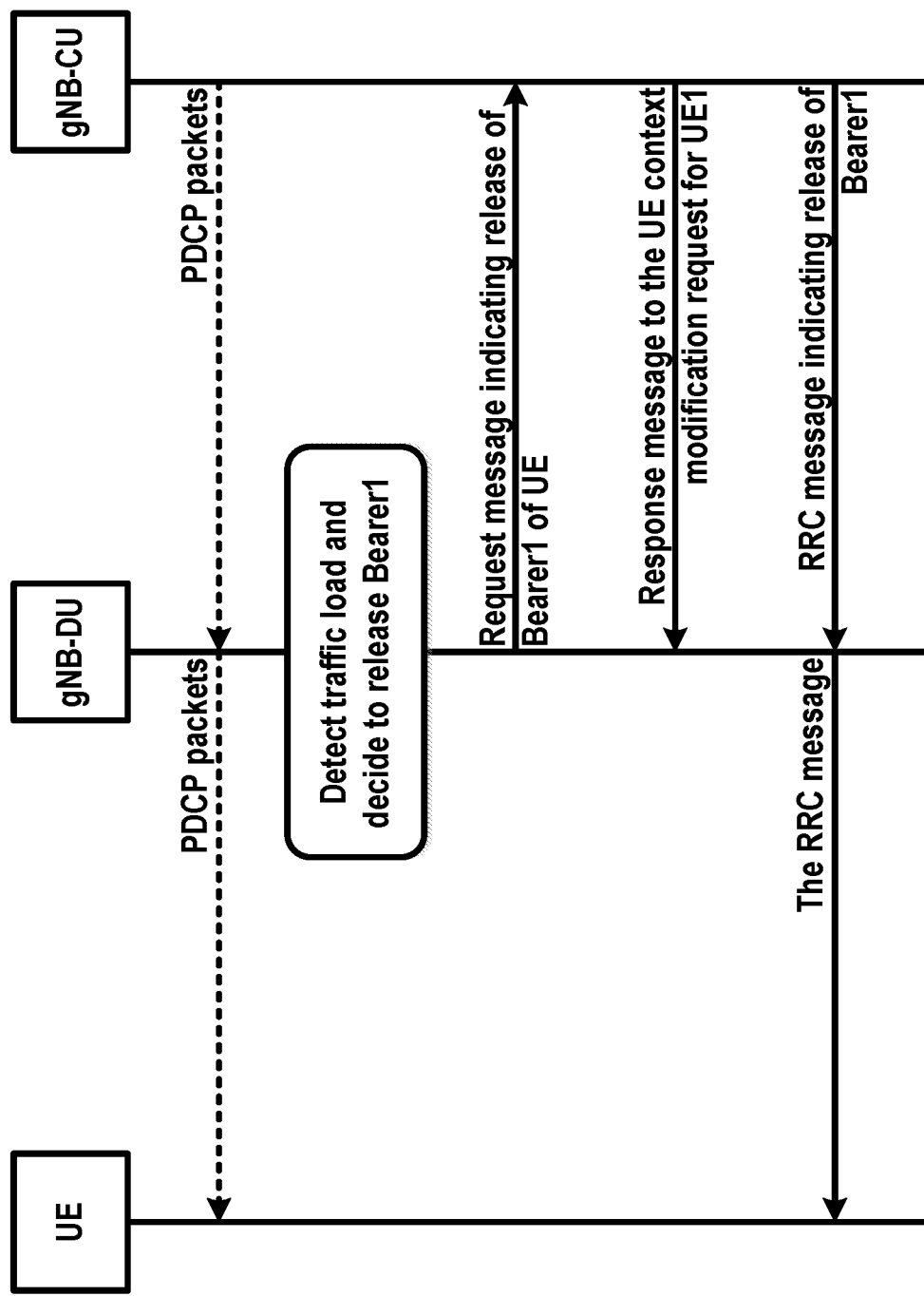
FIG. 18 is an example diagram of an aspect of an embodiment of the present disclosure.
Figure 19:
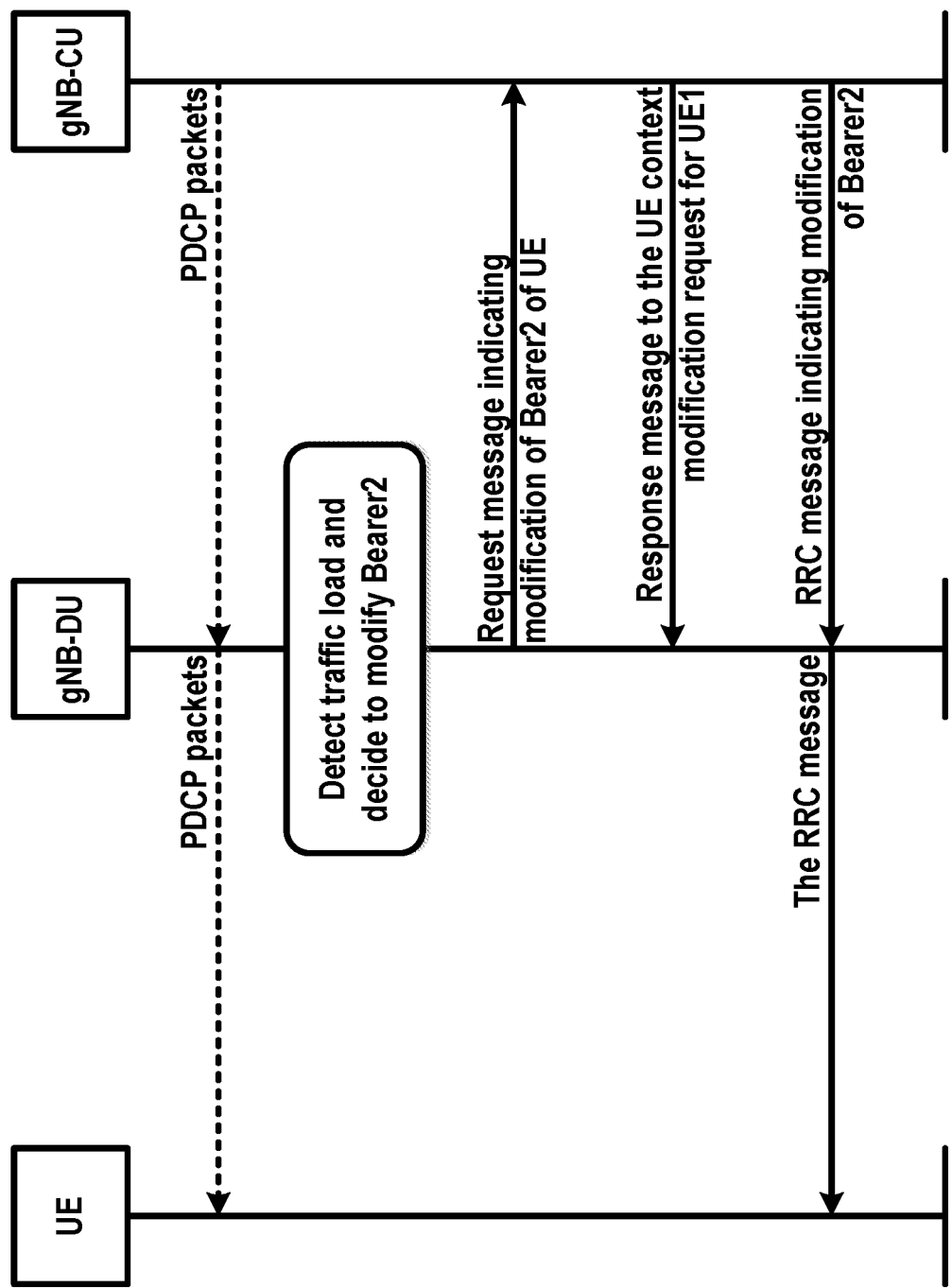
FIG. 19 is an example diagram of an aspect of an embodiment of the present disclosure.
Figure 20:
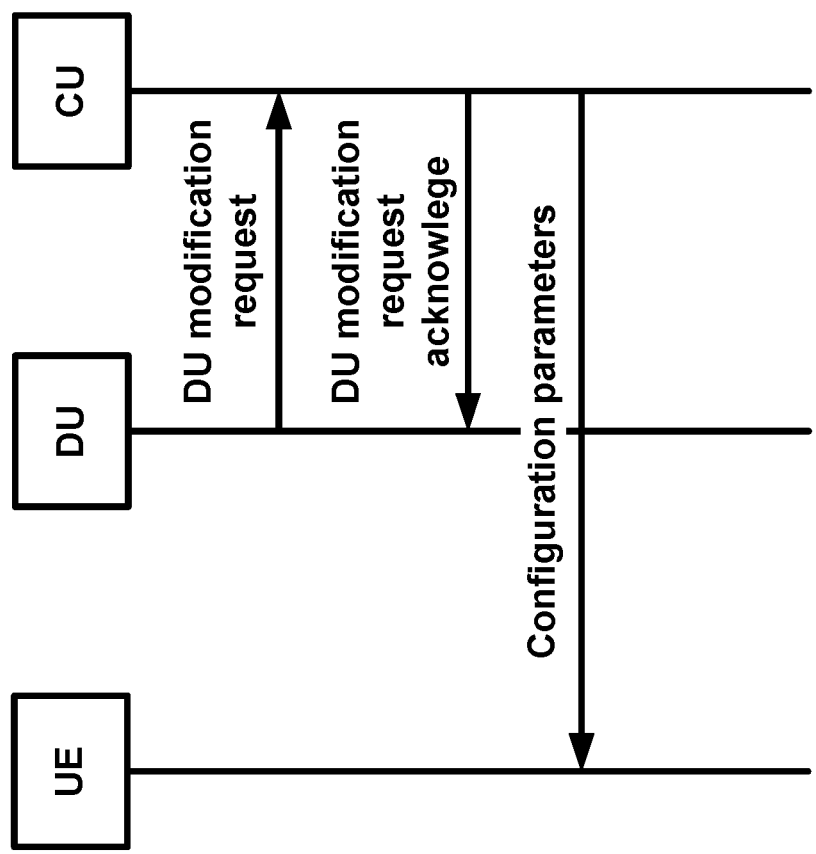
FIG. 20 is an example diagram of an aspect of an embodiment of the present disclosure.

In an example, as shown in FIG. 17, FIG. 18, FIG. 19, and/or FIG. 20, a distributed radio access network entity may transmit, to a central radio access network entity, a first message configured to request a distributed entity modification for a wireless device. The first message may be transmitted via an F1 interface between the distributed radio access network entity and the central radio access network entity. The first message may comprise at least one of a UE context modification required message, a UE context release request message, and/or a distributed entity modification request message (e.g. gNB-DU modification request, DU modification request). The first message may comprise at least one of: one or more data radio bearer identifiers of one or more data radio bearers for the wireless device that the distributed radio access network requests to release, setup, and/or modify; one or more logical channel identifiers (LCIDs) of one or more logical channels for the wireless device that the distributed radio access network requests to release, setup, and/or modify; one or more beam information (e.g. beam identifiers, beam index, synchronization signal block configuration information, reference signal configuration information, and/or the like) of one or more beams recovered by the wireless device; one or more beam information of one or more beams serving the wireless device; one or more beam information of one or more beams released by the wireless device; an indication parameter indicating that the wireless device changed one or more serving beams; and/or the like.

In an example, as shown in FIG. 17, if a distribute unit detects high load status (e.g. lack of radio resources, large data buffering status, high CPU employment, throttled CPU operation, high utilization of radio resources, lack of system memory, and/or the like), low radio channel quality (e.g. low RSRP/RSRQ, low quality of SRS received, low channel quality report (e.g. CQI report) from the wireless device, high packet retransmission rate, high packet transmission failure rate, and/or the like) and/or the like of one or more cells employed for a first bearer of the wireless device, the distributed unit may request to release/modify (e.g. release part (e.g. QoS flow) of the first bearer) the first bearer via the first message. In an example, the first bearer may comprise a data radio bearer (DRB) of the wireless device.

In an example, one or more beam information may comprise at least one of a beam identifier, a beam index, a synchronization signal block configuration information, a reference signal configuration information, a synchronization signal block scheduling information, a reference signal configuration scheduling information, and/or the like.

In an example, the first message may comprise at least one of an uplink radio resource measurement result measured by the distributed radio access network entity; an interference information associated with the wireless device (uplink interference measured by the distributed radio access network entity, downlink interference measured by the wireless device); an interference information associated with one or more cells of the distributed radio access network entity (uplink interference measured by the distributed radio access network entity, downlink interference measured by the wireless device); one or more radio link configuration changes; and/or the like.

In an example, the first message may comprise at least one or more radio configuration parameters for the wireless device, the one or more radio configuration parameters may be changed by the distributed radio access network entity and/or by the central radio access network entity. The first message may be configured to request changing one or more of the one or more radio configuration parameters and/or to inform that one or more of the one or more radio configuration parameters are changed and/or have been changed. The one or more radio configuration parameters may comprise one or more MAC configuration parameters, one or more RLC configuration parameters, one or more physical layer configuration parameters, and/or the like.

In an example, the one or more radio configuration parameters transmitted via the first message may comprise at least one of a bcch-Config (broadcast control channel configuration parameter), a pcch-Config (paging control channel configuration parameter), a rlc-Config (RLC configuration parameter), a logicalChannelConfig (logical channel configuration parameter), a macMainConfig (MAC configuration parameter), a sps-Config (semi-persistent scheduling configuration parameter), a rach-ConfigCommon (random access configuration parameter), a prach-Config (physical layer random access configuration parameter), a pdsch-ConfigCommon/a pdsch-ConfigDedicated (physical downlink shared channel configuration parameter), a pusch-ConfigCommon/a pusch-ConfigDedicated (physical uplink shared channel configuration parameter), a pucch-Config-Common/a pucch-ConfigDedicated (physical uplink control channel configuration parameter), a phich-Config (physical hybrid-ARQ indicator channel configuration parameter, a physical downlink control channel configuration parameter, a cqi-ReportConfg (channel quality indicator report configuration parameter, and/or the like.

In an example, the one or more radio configuration parameters may comprise at least one of a PMI report configuration parameter, an RI report configuration parameter), a schedulingRequestConfig (scheduling request configuration parameter), a soundingRS-UL-ConfigCommon/a soundingRS-UL-ConfigDedicated (sounding reference signal uplink configuration parameter), an uplinkPowerControlCommon/an uplinkPowerControlDedicated (uplink power control configuration parameter), a p-Max (uplink maximum power configuration parameter), a phr-Config (power headroom report configuration parameter), an antennaInfoCommon/an antennaInfoDedicated (antenna configuration parameter), an ul-CyclicPrefixLength (uplink cyclic prefix configuration parameter), a tdd-Config (a time division duplex configuration parameter), a system information broadcast message configuration parameter, a channel state information report configuration parameter, a DMRS-Config (demodulation reference signal configuration parameter), a synchronization signal configuration parameter, a reference signal configuration parameter, a drx-Config (discontinuous reception configuration parameter), a time alignment configuration parameter/a timing advance configuration parameter (e.g. time alignment timer, timing advance group identifier, timing advance group information, and/or the like), a RLC retransmission configuration parameter, a HARQ configuration parameter (hybrid automatic repeat request configuration parameter), and/or the like.

In an example, the central radio access network entity may configure one or more configuration parameters for the wireless device at least based one or more elements of the first message. In response to the first message, the central radio access network entity may release, setup, and/or modify one or more data radio bearers, one or more logical channels, one or more QoS flows, one or more PDU sessions, one or more logical channels for the wireless device at least based on one or more elements of the first message. In an example, if the first message indicates a request to release/modify the first bearer of the wireless device, the central unit may determine to release/modify the first bearer based on the request of the first message. The central radio access network entity may configure one or more configuration parameters for the wireless device, the one or more configuration parameters associated with one or more elements of the first message.

In an example, the central radio access network entity may transmit, to the distributed radio access network entity, a second message at least in response to configuring the one or more configuration parameters for the wireless device. The second message may be transmitted via an F1 interface between the central radio access network entity and the distributed radio access network entity. The second message may comprise one or more indications indicating at least one of: accepting one or more elements of the first message; rejecting one or more elements of the first message; and/or confirming one or more elements of the first message. The second message may comprise one or more configuration indications indicating that the distributed radio access network entity configures one or more configuration parameters for the wireless device at least based on one or more elements of the first message. The one or more configuration indications may comprise a configuration indication for at least one of one or more elements of the first message. In an example, the second message may comprise a UE context modification confirm message, a UE context modification request message, a UE context release command message, and/or the like.

In an example, the central radio access network entity may transmit, to the wireless device, a third message at least based on configuring the one or more configuration parameters for the wireless device at least based on one or more elements of the first message. The third message may comprise one or more RRC messages (radio resource control messages). The third message may comprise at least one of: one or more data radio bearer identifiers of one or more data radio bearers to release, setup, and/or modify; one or more logical channel identifiers (LCIDs) of one or more logical channels to release, setup, and/or modify; one or more QoS flow identifiers of one or more QoS flows to release, setup, and/or modify; one or more PDU session identifiers of one or more PDU sessions to release, setup, and/or modify; one or more beam information (e.g. beam identifiers, beam index, synchronization signal block configuration information, reference signal configuration information, and/or the like); one or more beam utilization information (e.g. beam information of beams for the wireless device to monitor, utilize, be restricted to utilize, remove, and/or the like); beam priority information to use; and/or the like. In an example, the third message comprise one or more elements of the one or more radio configuration parameters of the first message. The third message comprise one or more configuration parameter configured at least based on one or more elements of the one or more radio configuration parameters of the first message.

In an example, the distributed radio access network entity may decode the third message transmitted to the wireless device, and/or may determine one or more radio link configurations at least based on one or more elements of the third message.

In an example, the distributed radio access network entity may configure one or more elements of the first message and/or may transmit the first message at least based on detecting one or more radio network states. The one or more radio network states may comprise at least one of: a load state (physical resource block usage state and/or hardware load state, e.g. cpu, processor, ram, memory, system bus load state) of the distributed radio access network entity; a radio load state of one or more cells of the distributed radio access network entity; an average uplink/downlink buffer state information of the wireless device; a time alignment timer expiration; a channel state information received from one or more wireless device (e.g. a channel quality information, a precoding matrix indicator, a rank indicator); an uplink radio resource measurement result measured by the distributed radio access network entity; an interference information associated with the wireless device (uplink interference measured by the distributed radio access network entity, downlink interference measured by one or more wireless device); an interference information associated with one or more cells of the distributed radio access network entity (uplink interference measured by the distributed radio access network entity, downlink interference measured by one or more wireless device); one or more radio link configuration changes; and/or the like.

In an example, a distributed radio access network entity may transmit, to a central radio access network entity, a first message configured to request a distributed entity modification for a wireless device. The first message may comprise at least one of: one or more data radio bearer identifiers of one or more data radio bearers to be released; one or more data radio bearer identifiers of one or more data radio bearers to be modified; one or more radio configuration parameters to be changed; one or more beam information of one or more beams recovered by the wireless device; one or more beam information of one or more beams serving the wireless device; one or more beam information of one or more beams released by the wireless device; an indication parameter indicating that the wireless device changed one or more serving beams; and/or the like. The distributed radio access network entity may receive, from the central radio access network entity, a second message in response to the first message. The second message may comprise an indication indicating at least one of: accepting one or more elements of the first message; rejecting one or more elements of the first message; and/or confirming one or more elements of the first message.

In an example, the distributed radio access network entity may transmit, the first message based on at least one of: a load state (PRB usage state, hardware load state, and/or the like) of the distributed radio access network entity; a radio load state of one or more cells of the distributed radio access network entity; an average uplink/downlink buffer state information of the wireless device; a time alignment timer expiration; a channel state information received from the wireless device (e.g. a channel quality information, a precoding matrix indicator, a rank indicator); an uplink measurement result by the distributed radio access network entity; an interference information associated with the wireless device; an interference information associated with one or more cells of the distributed radio access network entity; and/or one or more radio link configuration changes.

In an example, the central radio access network entity may transmit, to the wireless device, a third message comprising one or more radio resource control parameters at least based on one or more elements of the first message. The one or more radio resource control parameters may comprise at least one of: one or more data radio bearer identifiers of one or more data radio bearers to be released; one or more data radio bearer identifiers of one or more data radio bearers to be modified; and/or one or more radio link configuration parameters to be changed. The distributed radio access network entity may decode the third message, and/or may determine one or more radio link configurations at least based on one or more elements of the third message.

Distributed Unit Status Information

In an example, a base station may consider radio resource condition and traffic status to configure wireless device control parameters, resource configuration parameters, and/or cell configuration parameters. In the functional split scenario, a base station central unit configures wireless device control parameters, and a base station distributed unit may monitor radio resource condition and traffic status of the distributed unit. In the functional split scenario, a base station central unit configures wireless device control parameters, and a base station distributed unit may monitor grant free resources (configured resources) and/LAA cell status of the distributed unit.

In an implementation of an existing technology, a base station CU may have less information of lower layer radio condition (e.g. physical layer, MAC layer, RLC layer, and/or the like). When a central unit configure wireless device configuration parameters, resource parameters, and/or cell configuration parameters, the lack of lower layer radio condition (e.g. configured grant resource radio channel status, grant free resource radio channel status, SPS resource radio channel status, LAA cell channel status and/or the like) and/or status information (e.g. configured grant resource utilization status, grant free resource utilization status, SPS resource status, LAA cell status information, and/or the like) may cause inappropriate configurations, which may decrease cellular system performance. In an example, the lack of lower layer status information may cause a central unit to configure system and/or wireless device configuration parameter inappropriate for current radio and/or traffic status. The inappropriate configuration may cause increased call dropping ratio, packet error rate, and/or packet transmission delay, and further may decrease communication reliability and/or increase data transmission latency.

Example implementation of embodiments may support a base station distributed unit to inform a base station central unit of lower layer radio condition information and/or traffic status of cells. Example implementation of embodiments may support a base station distributed unit to transmit status information of configured grant resource status, grant free resource status, SPS resource status (e.g. utilization information, collision status, failure status, channel quality). Example implementation of embodiments may support a base station distributed unit to transmit status information of LAA cell status information (e.g. LBT failure status, channel quality status, collision status, activated UE information on LAA cell, and/or the like).

In an example embodiment, a distributed unit may transmit, to a central unit, a grant free (e.g. configured grant type 1/2, configured grant, SPS) resource utilization information of a serving cell served by the distributed radio access network entity. The central unit may configure and/or reconfigure one or more grant free resources and/or wireless device resource configuration parameters at least based on the grant free resource utilization information. The central unit may request, to the distributed unit, a grant free resource utilization information report with an event based condition for the report and/or a periodicity to report. In an example embodiment, a distributed unit may transmit, to a central unit, a radio resource status information (e.g. LBT failure status, channel quality status, collision status, activated UE information, and/or the like) of a licensed assisted access (LAA) cell served by the distributed unit. The central unit may configure and/or reconfigure one or more configuration parameters for the licensed assisted access cell at least based on the radio resource status information. The central unit may request, to the distributed unit, a radio resource status information report for a licensed assisted access cell with an event based condition for the report and/or a periodicity to report. Example implementation of embodiments may increase communication reliability and/or reduce data transmission latency of wireless communication systems.

A new radio (NR) may support an uplink (UL) transmission without a UL grant, referred to as a grant-free (GF) UL transmission, for one or more service types, e.g., ultra-reliable low latency communications (URLLC). A base station in the NR, referred to as a gNB, may configure the time and frequency radio resource(s) for the GF UL transmission. A UE configured by the gNB to use the GF UL radio resources may transmit one or more data packets without a UL grant, which may result in reducing the signaling overhead comparing with a grant-based (GB) UL transmission. Such a service type that has strict requirements, especially in terms of latency and reliability such as URLLC, may be a candidate for which a UE may use the GF UL transmission.

The GF UL transmission may support multiple user equipments (UEs) accessing the same radio resources in order to achieve lower latency and lower signaling overhead than a GB UL transmission. A GF radio resource pool may be defined as a subset of radio resources from a common radio resource set (e.g. from all uplink shared channel radio resources). The radio resource pool may be used to allocate exclusive or partially overlapped radio resources for GF UL transmissions in a cell or to organize frequency/time reuse between different cells or parts of a cell (e.g. cell-center and cell-edge).

If a gNB configures multiple UEs with the same GF radio resource pool, there may be a collision between two or more UEs on their GF UL transmission. The collision at the same GF radio resources may be avoidable based on UE specific demodulation reference signal (DMRS) parameters that are distinguishable at the gNB, e.g., the root index if Zadoff-Chu (ZC) sequences are adopted, cyclic shift (CS) index, TDM/FDM pattern index if any, orthogonal cover code (OCC) sequences or index. The gNB may configure the UE specific DMRS parameters along with the time/frequency radio resources for the UE.

In an example, FIG. 34 is two examples of DMRS design with 4 UEs multiplexed on each DMRS symbol. The DMRS of 4 UEs are plotted with different patterns, respectively. Figure xxx considers an example with 2 DMRS symbols out of 14 orthogonal frequency-division multiplexing (OFDM) symbols. Top of FIG. 34 is a comb pattern used to divide resource elements (REs) in one symbol into DMRS RE groups, and a UE occupies a group of REs to transmit its DMRS. In this way, the DMRS of multiplexed UEs may be orthogonal to guarantee the accuracy of channel estimation and related measurements. Bottom of FIG. 34 is a Zadoff-Chu (ZC) sequence with different cyclic shifts used to accommodate multiple UEs' DMRSs in the same OFDM symbol. In this way, the channel impulse response (CIR) of multiplexed UEs may be effectively delayed and be separated in time domain, which may facilitate channel estimation and measurements. Note that the location of DMRS in Top of FIG. 34 follows legacy LTE design, which is an example only. For URLLC, DMRS may be put on the first 2 OFDM symbols.

Figure 35:
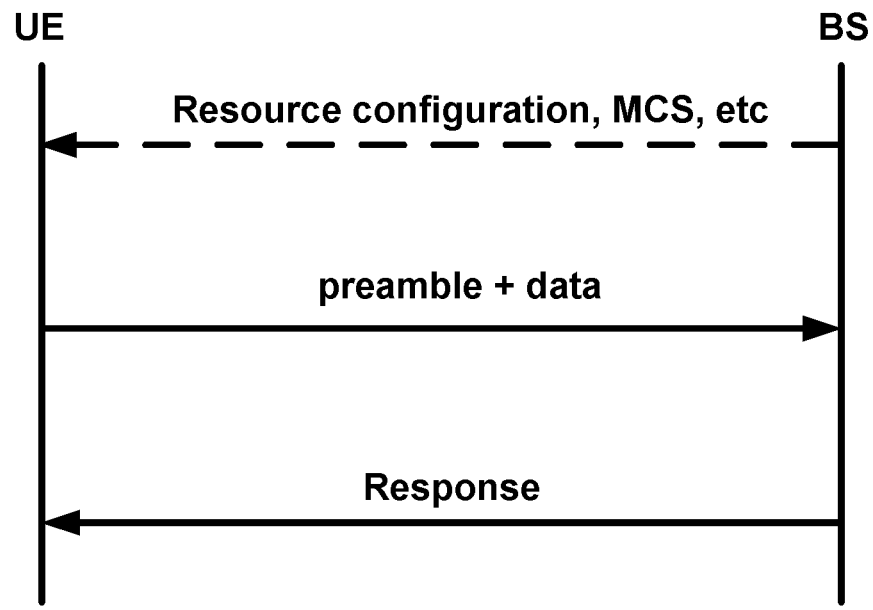
FIG. 35 is an example diagram of an aspect of an embodiment of the present disclosure.

To identify a UE ID from the collision over the same GF radio resource pool, instead of DMRS, a gNB may use a preamble sequence that may be transmitted together with the PUSCH data. The preamble may be designed to be reliable enough and to meet the detection requirement of a service, e.g., URLLC. FIG. 35 is an example of the basic procedure of GF UL transmission with a preamble may be that a UE may start a GF UL transmission in the configured radio resources when there is a packet in the UE buffer. The UE may transmit a preamble together with the data block in the first step and receive a response in the second step. The data may be repeated K times depending on a gNB configuration. The preamble may not be repeated as long as it is reliable enough. The response from a gNB may be a UL grant or a dedicated ACK/NACK transmitted in the downlink control information (DCI).

For UEs configured with a GF radio resource pool, a preamble sequence may be uniquely allocated to a UE with the assumption that the number of UEs sharing the same GF radio resources is smaller than the number of available preamble sequences. This may be the typical case considering that the number of URLLC UEs in a cell may not be large. In addition, the gNB may configure different GF radio resources for different sets of UEs such that the preamble sequences may be reused in different GF radio resources.

To have reliable detection performance, the preamble sequences may be mutually orthogonal, e.g. cyclic shifts of a ZC root sequence. Since the preamble sequence is transmitted together with data, it may be reused as the reference signals for the data demodulation. To ensure a reliable UE ID detection based on the preamble sequence, relatively high number of REs may be needed for the preamble transmission. To have reliable preamble detection performance while having balanced preamble overhead for GF and a low impact on other UEs, a gNB may configure a number of OFDM symbols for preamble transmission in time domain and a bandwidth in frequency domain, depending on whether DMRS may provide reliable detection performance.

There may be following possible configuration options in case the preamble bandwidth is larger than the data transmission bandwidth, Two set of GF UEs may share the same preamble transmission bandwidth, but different data transmission bandwidth, e.g., the preambles of both set of UEs are multiplexed in the same radio resources.

For a target UE, the preamble REs that are within the bandwidth for GF UL data transmission may be reused as the reference signals for GF data demodulation. The preambles that are transmitted outside of GF data bandwidth may be orthogonally multiplexed with the DMRS of a GB UE. This may reduce the impact to GB UEs.

Figure 36:
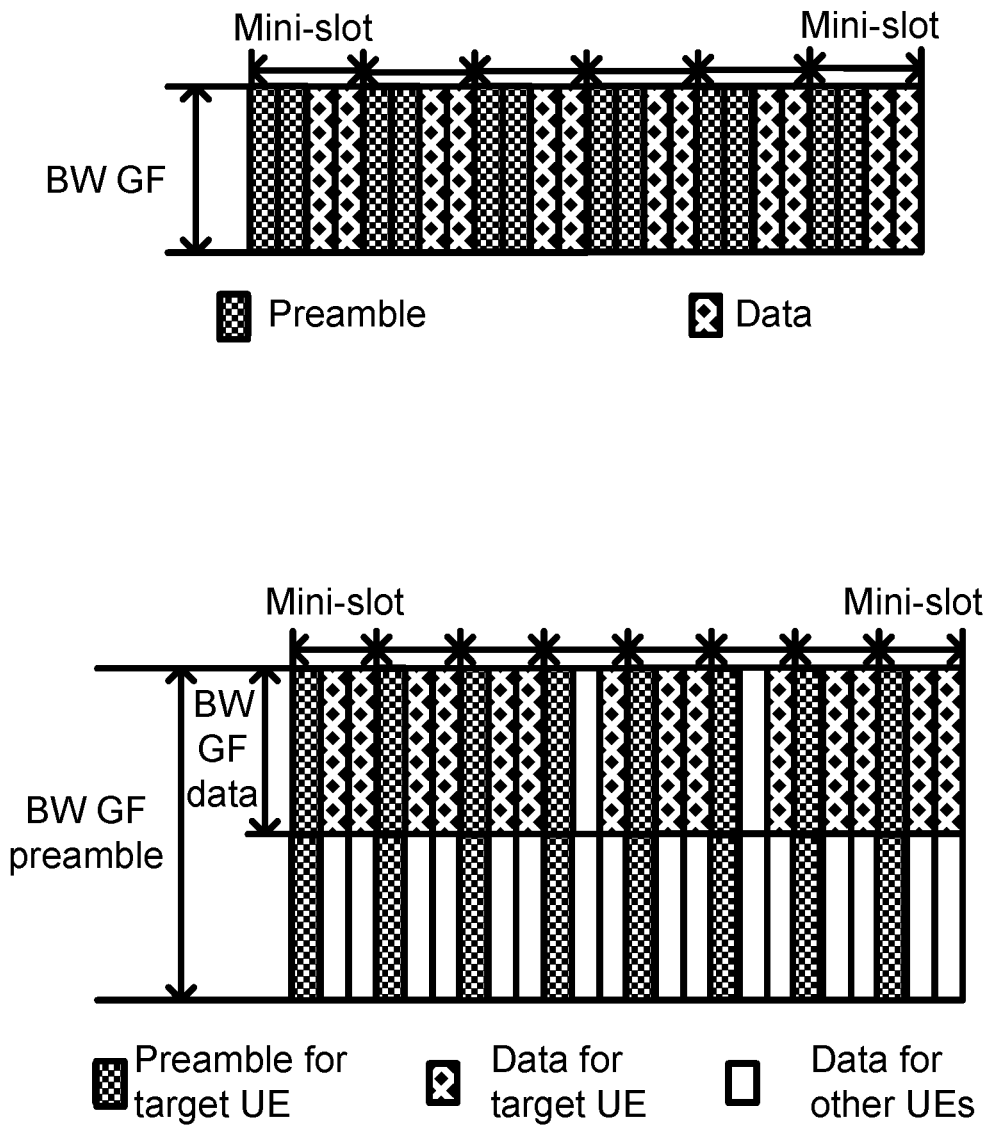
FIG. 36 is an example diagram of an aspect of an embodiment of the present disclosure.

FIG. 36 illustrate an example. In top of FIG. 36, one mini-slot contains 4 OFDM symbols and gNB configures two OFDM symbols for the preamble transmission. In bottom of FIG. 36, 3 OFDM symbols are contained in one mini-slot, and the preamble is configured to transmit in 1 OFDM symbol, but in larger transmission BW than the data transmission.

For the GF UL transmission, a gNB may support a K-repetition of the same transport block (TB) transmission over the GF radio resource pool until certain conditions are met. The UE may continue the repetitions upto K times for the same TB until one of the following conditions is met: If an UL grant is successfully received for a slot/mini-slot for the same TB; the number of repetitions for that TB reaches K; and/or other termination condition of repetition may apply.

The number of maximum repetitions, K, may be a configurable parameter that may be UE-specific, and/or cell-specific.

A mini-slot or a symbol may be a unit of the K-repetition. A network may configure the number of this repetition and the radio resource in advance. The network may assume a set of initial transmission and the repetition as one amount of the transmission. The network may not be required to prepare the case of only initial transmission or only repetition. One may call the set of initial transmission and this repetition as extended TTI. These repetitions may not be required to be contiguous in time. If transmissions are contiguous, it may allow coherent combining. If transmissions are not contiguous, it may allow time diversity.

Figure 37:
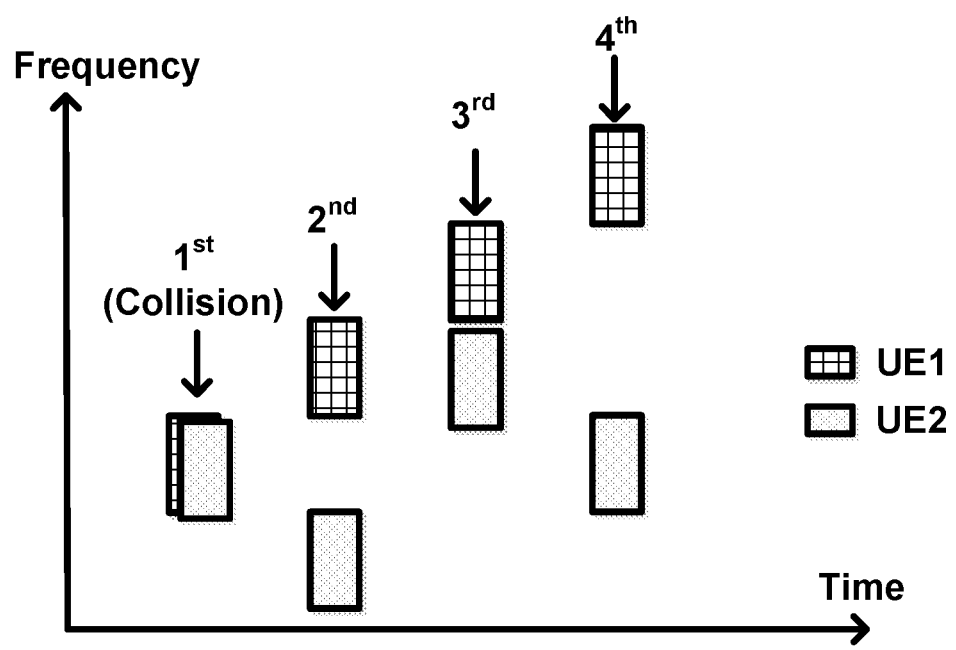
FIG. 37 is an example diagram of an aspect of an embodiment of the present disclosure.

When the GF UL transmission of two UEs collides in the same GF radio resource pool, a gNB may fail to detect both UEs' data. When the two UEs retransmit the data without UL grants, the two UEs may collide again. In such a case, hopping may be a way to solve the collision problem when radio resources are shared by multiple UEs. Hopping may randomize the collision relationship between UEs within a certain time interval, thus avoiding persistent collision. It may bring a diversity gain on the frequency domain. A UE-specific hopping pattern may be pre-configured by a gNB or obtained via some known UE-specific ID. FIG. 37 is an example of a UE-specific hopping pattern.

There may be many factors considered for the hopping pattern design, such as the number of resource units (RUs), the max number of UEs sharing the same RU, the recently used RU index, the recent hopping index or the current slot index, the information indicating recently used sequence, hopping pattern or hopping rule, etc. The sequence described above may be a DMRS, a spreading sequence, or a preamble sequence that may be UE-specific. FIG. 38 shows examples of GF resource index and configuration parameters.

The gNB may support to switch between GF and GB UL transmissions to balance resource utilization and delay/ reliability requirements of associated services. The GF UL transmission may be based on a semi-static resource configuration that may be beneficial to reduce latency. Such a pre-defined resource configuration may be hard to satisfy all potential services or packet sizes. The overhead may sometimes be large, and the packet size for a service, such as URLLC, may be variable. If a UE's data packet collides with other UE's packets, a re-attempt to access GF radio resources may not achieve the service requirements. In such cases, switching from GF to GB UL transmissions may be beneficial.

Figure 39:
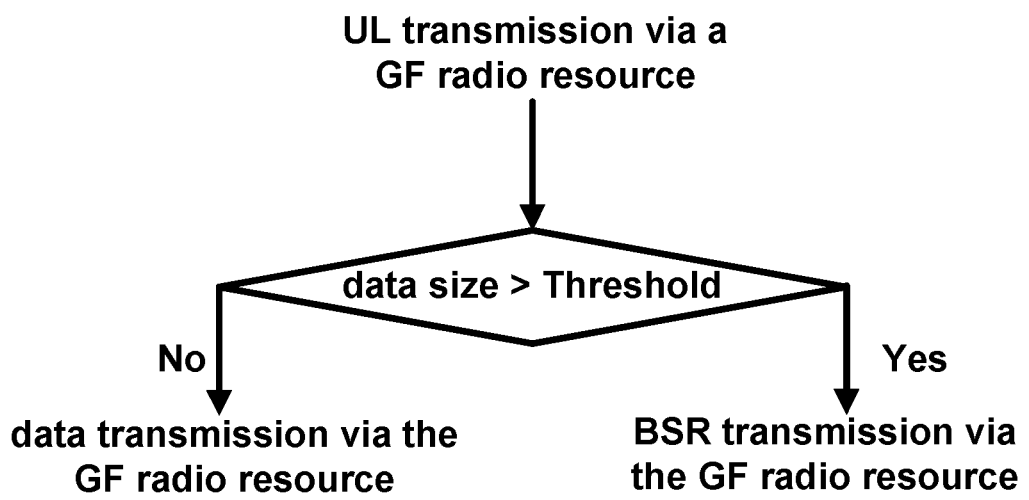
FIG. 39 is an example diagram of an aspect of an embodiment of the present disclosure.

FIG. 39 shows an example of uplink resource selection based on data size.

Figure 40:
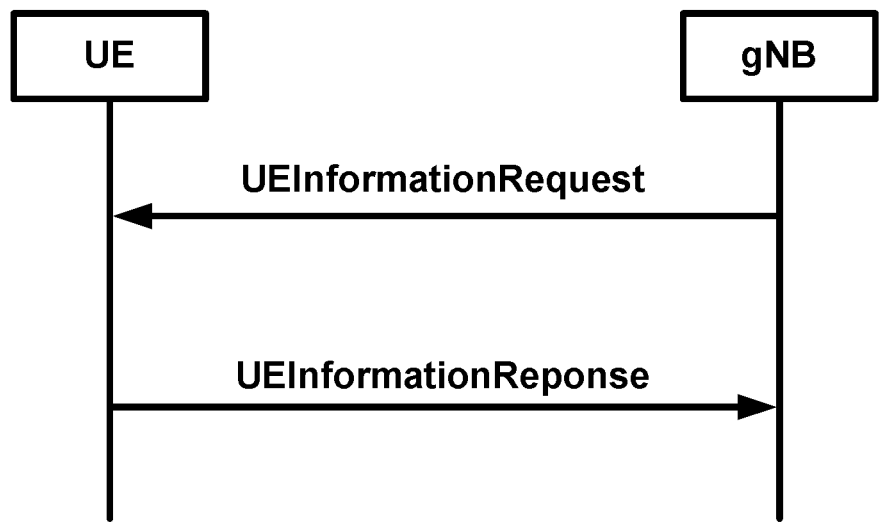
FIG. 40 is an example diagram of an aspect of an embodiment of the present disclosure.

To support the switching between GF and GB UL transmissions, the initial transmission on the pre-configured GF radio resources may include UE identification (ID), for example, explicit UE ID information (e.g. C-RNTI) or implicit UE information such as a DMRS cyclic shift (assuming use of ZC sequences) specific signature. To inform a gNB of whether the UE has remaining data to transmit, the UE may include buffer status reporting (BSR) with the initial data transmission. If a gNB successfully decodes data transmitted by a UE and determines that the UE has remaining data to transmit (e.g. from a BSR report), the gNB may switch scheduling for UE from GF to GB UL transmissions. If a gNB fails to decode data transmitted by the UE but successfully detects the UE ID from the uniquely assigned sequence (e.g., preamble and/or DMRS), the gNB may switch scheduling for UE from GF to GB UL transmissions. The UL grant for subsequent data transmissions may be with CRC scrambled by the UE C-RNTI (may be determined either by explicit signaling in the initial transmission or implicitly by the DMRS cyclic shift). In an example, FIG. 40 is an example of UE information request and response procedure.

One of the termination conditions for the K-repetitions may be a reception of a UL grant which schedules a UL (re)transmission for the same TB. A gNB may assign dedicated resources for retransmission in order to ensure the TB is delivered within the latency budget. This behavior may be classified as scheduling switching from GF to GB operation. In this case, a UE may need to link the received grant with the transmitted TB in order to understand which TB to be retransmitted in case there are multiple ongoing transmission processes at the UE. For these purposes, the UE and gNB may have the same notion of TB counting.

For the GF operation, the TB counting may not be possible if a gNB may not detect some TBs due to collisions. In order to make an association between a DCI with a TB, there may be several options. If there is no other transmission process at the UE side, it may directly associate the DCI with a TB which is being transmitted. If there are at least two different TBs, a UE may deduct that the DCI is for a particular TB by applying an implicit linkage assuming only one TB is transmitted in one transmission interval. In this case, if the interval between detected UE transmission and a grant is fixed, it may unambiguously determine which TB may be retransmitted. If the timing between a detected transmission and a retransmission grant is not preconfigured, an explicit indication of the retransmitted TB may be carried by DCI. If a UE detects that a grant for one TB overlaps with transmission of another ongoing TB, the UE may assume precedence of the grant comparing to the grant-free retransmissions. If a grant is received for a new TB (e.g. for aperiodic CSI reporting) and overlaps with the GF UL transmissions, the GF transmissions may be dropped in the resources. Alternatively, a prioritization rule whether to transmit a triggered report or GF data may be introduced depending on priority of the associated services. For example, if URLLC services is assumed, then the CSI reporting may be dropped in this example.

Another repetition termination condition may be to use a dedicated PHICH-like channel for early termination. For this option, the PHICH defined in LTE may be used as an acknowledge indicator. In LTE, the PHICH for a UE may be determined based on the physical resource block (PRB) and cyclic shift of the DMRS corresponding to the UE's PUSCH transmission. Similar design principle may be reused in the NR. Such a PHICH-like channel may optimize the control channel capacity and system capacity. If a gNB has successfully received a TB, the gNB may obtain the corresponding information about this transmission, such as the UE ID, the resource used for carrying this transmission, the DMRS used for this transmission, etc. The physical resources may be shared among multiple UEs who may have their own unique identifiers (e.g., DMRS) used in the GF radio resource pool. Therefore, even for GF UL transmission, if the gNB has successfully received a TB, a unique PHICH may be determined.

Using a sequence based signal may be used for early termination of K-repetition. In this case, a sequence based signal may be transmitted to inform the UE to terminate the repetition of transmission. In this case, the signal may be transmitted when a gNB successfully decodes a TB. The UE may perform a simple signal detection for the presence or absence to decide whether to continue the repetitions or not.

A gNB may switch from GF to GB UL transmissions in order to solve a GF radio resource shortage problem. In an example, some UEs whose delay requirements are not strict may use the GF radio resource to transmit data. A gNB may measure the status of the GF UL radio resource utilization based on statistics with respect to resource utilization, load, etc and set up a threshold policy to dynamically balance load or resource utilization of the GF UL radio resource. If the resource usage statistic of the GF UL radio resource exceeds the predefined threshold, it may be beneficial to switch some UEs from the GF UL radio resource to the GB UL radio resource, which may decrease the resource collision.

The GF resource pool configuration may not be known to UEs. It may only need to be coordinated between different cells for interference coordination. If the GF resource pools are known to UEs, those may be semi-statically configured by UE-specific RRC signaling or non-UE-specific RRC signaling. The RRC signaling for GF radio resource configuration may include at least one or more parameters indicating GF time/frequency radio resources, DMRS parameters, a modulation and coding scheme (MCS) or equivalently a transport block size (TBS), Number of repetitions K, and/or power control parameters.

A UE may need to know all necessary parameters for UL grant-free transmission before transmitting on the resource. For this, not only RRC signaling, but also the use of L1 signaling may be useful. For example, RRC signaling may configure the necessary parameters of GF UL transmission to the UE, and L1 signaling may adjust, modify, update, activate, and/or deactivate these parameters. The L1 signaling may be a PDCCH, similar to the signaling used for LTE UL semi-persistent scheduling (SPS).

The MCS may be indicated by the UE within the grant-free data. In an example, in order to avoid the blind decoding of MCS indication, the limited number of MCS levels may be pre-configured by a gNB, e.g., K bits may be used to indicate MCS of grant-free data, where K may be as small as possible. The number of REs used to transmit MCS indication in a resource group may be semi-statically configured. In the GF operation, there may be one common MCS predefined for all UEs. In this case, there may be a tradeoff between a spectrum efficiency and decoding reliability, e.g., the spectrum efficiency may be reduced if a low level of MCS is used, while the data transmission reliability gets higher. The NR may predefine a mapping rule between multiple time/frequency resources for UL grant-free transmission and MCSs. In an example, a UE may select an appropriate MCS according to a DL measurement and associated time/frequency resources to transmit UL data. In this way, UE may choose a MCS based on the channel status and increase the resource utilization.

Once the GF UL transmission parameters are configured, a GF UL transmission may be activated in different ways. The need for L1 activation signaling may depend on actual service types, and the dynamic activation (e.g, activation via L1 activation) may not be supported in the NR or may be configurable based on service and traffic considerations.

In an example, both activation schemes with and without L1 activation signaling may be supported. It may be up to a gNB to configure a UE which scheme may need to be used by considering, for example, traffic pattern, latency requirements, and other possible aspects. With the L1 activation signaling, a UE may transmit data with the configured time frequency radio resource after receiving L1 activation signaling from gNB. If the L1 activation is not configured, UE may start a UL transmission with the configured GF radio resource at any moment or in a certain time interval (which may be configured by RRC signaling or pre-defined) once the configuration is completed.

In an example, if a service that does not require high reliability and latency may benefit from reduced signaling overhead and power consumption, then the L1 activation signaling may be beneficial in combination with L1 deactivation signaling to control network resource load and utilization. When the L1 signaling is used, gNB may need to know whether the UE correctly receives it. An acknowledgement to the L1 signaling may be transmitted from a UE to a gNB.

For a delay sensitive service, however, the additional activation signaling may cause additional delay and may lead to potential service interruption/unavailability for the period of applying and requesting the activation. In this case, a gNB may configure a GF operation such that the GF UL transmission is activated as soon as a GF radio resource configuration and transmission parameters are configured.

There may be such a case that the GF radio resource is over-allocated which may result in the waste of radio resources with few UEs. In this case, L1 signalling may be useful to reconfigure the GF UL radio resource and/or one or more GF transmission parameters. By allowing L1 signaling-based reconfiguration, UEs may need to check downlink control signaling periodically whether the time/frequency resources for GF is the same or not. This may increase the power consumption of UE, and the periodicity to check the downlink control signaling may need to be configurable. In an example, if time/frequency radio resource utilization is more important, the periodicity may be configured to be short like every 1 minute or every radio frame. If the power consumption is more important, the periodicity may be configured to be long like every 1 hour. The periodicity to check downlink control signaling may need to be allowed to be separated from the periodicity of GF UL transmission, e.g., in order to shorten the latency. In an example, the periodicity of GF radio resource may be less than 1 ms like 0.125 ms but the periodicity to check downlink control signaling may be 1 minute or 1 hour.

For deactivating the activated GF operation, L1 deactivation signaling may be useful for all services in order to release resources as fast as possible.

In an example embodiment, a distributed radio access network entity (DU, distributed unit) may transmit, to a central radio access network entity (CU, central unit), a grant free resource utilization information of a serving cell served by the distributed radio access network entity. The central radio access network entity may configure and/or reconfigure one or more grant free resources at least based on the grant free resource utilization information. The central radio access network entity may request, to the distributed radio access network entity, a grant free resource utilization information report with an event based condition for the report and/or a periodicity to report.

In an example, a distributed radio access network entity may be connected to a central radio access network entity. The two entities may be connected via an F1 interface. A serving cell of the distributed radio access network entity may support one or more grant free resources for one or more wireless devices. The one or more grant free resources may be configured by the distributed radio access network entity and/or by the central radio access network entity. One or more of the one or more grant free resources may be utilized for one or more types of services (e.g. selected at least based on a bearer type, a wireless device subscription type, a slice type, a URLLC wireless device type, a machine type communication wireless device type, and/or the like).

In an example, the bearer (logical channel, data radio bearer, QoS flow, PDU session type) may be determined at least based on a QoS information of the bearer (e.g QCI, 5QI, and/or ARP values). The slice type may be determined at least based on a slice identifier (e.g. NSSAI, S-NSSAI, and/or the like) of a slice. In an example, a wireless device may have one or more slices for one or more services (e.g. vehicle communication, emergency service, mobile broadband service, push to talk service, streaming service, high priority services for high price subscribers, and/or the like).

In an example, the central radio access network entity may determine one or more grant free resources (e.g. configured grant/SPS/configured grant type 1 or type 2/periodic resources) for the serving cell of the distributed radio access network entity, and/or may transmit, to the distributed radio access network entity, a first grant free resource configuration information associated with the determined one or more grant free resources. The first grant free resource configuration information may be associated with one or more types of services. The first grant free resource configuration information may comprise at least one of: a grant free resource scheduling information (e.g. frequency, timing, periodicity, scheduling interval, and/or the like), a type of services (e.g. bearer type, slice type, and/or the like) allowed to utilize the determined one or more grant free resources, a wireless device type (e.g. wireless device subscription type, a URLLC wireless device type, machine type communication wireless device type, and/or the like) allowed to utilize the determined one or more grant free resources, a numerology configuration information (e.g. which TTI is utilized for the determined one or more grant free resources), one or more wireless device identifiers of one or more wireless devices allowed to utilize the determined one or more grant free resources (e.g. C-RNTI, SPSC-RNTI, IMSI, temporary wireless device identifier for a grant free resource, and/or the like), a grant free resource configuration index, and/or the like. In an example, the first grant free resource configuration information may be configured by the distributed radio access network entity.

Figure 21:
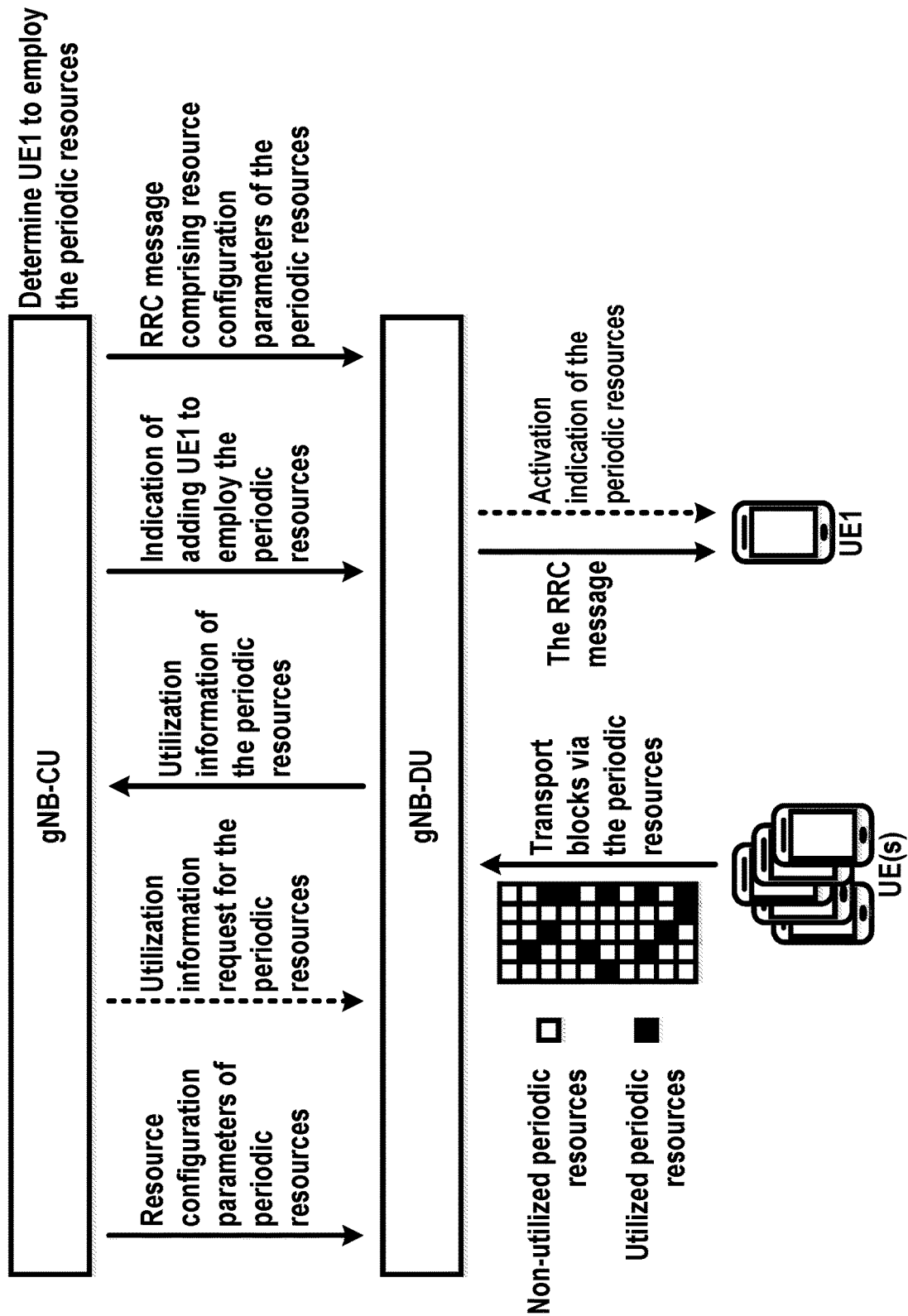
FIG. 21 is an example diagram of an aspect of an embodiment of the present disclosure.
Figure 22:
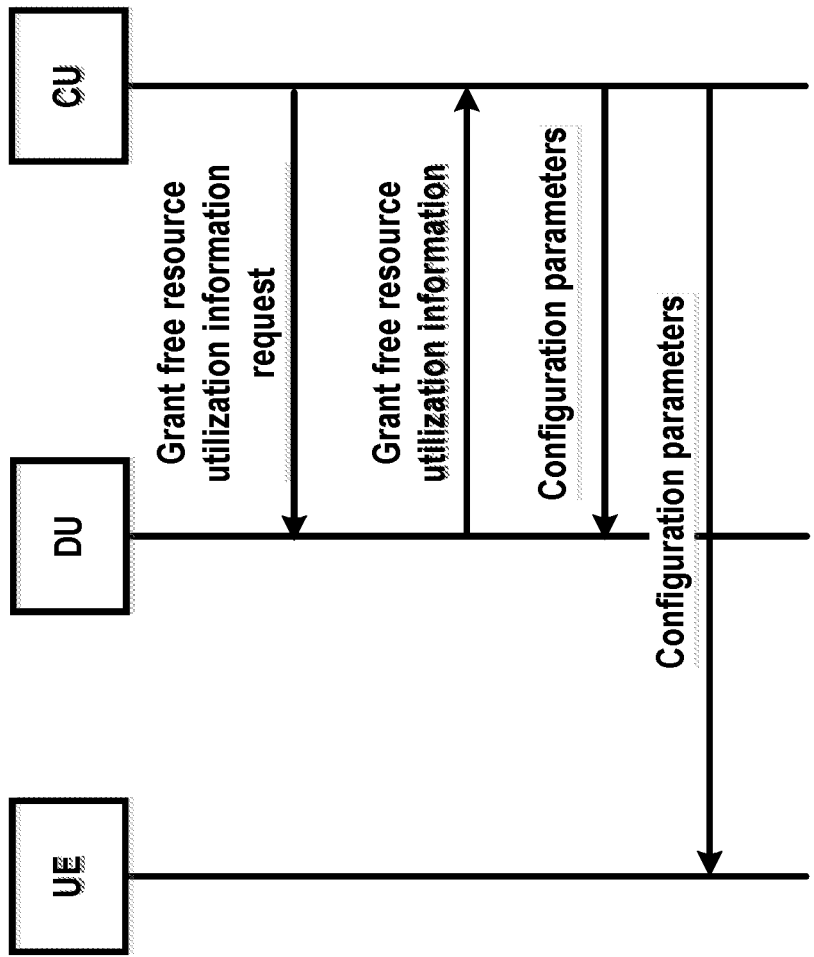
FIG. 22 is an example diagram of an aspect of an embodiment of the present disclosure.

In an example, as shown in FIG. 21 and/or FIG. 22, the central radio access network entity may transmit, to one or more wireless devices, one or more radio resource control parameters (e.g. one or more radio resource control parameters) at least based on one or more elements of the first grant free resource configuration information. In an example, in response to receiving the first grant free resource configuration information, the distributed radio access network entity may configure one or more radio configuration parameters at least based on one or more elements of the first grant free resource configuration information, and/or receive one or more packets from one or more wireless devices via one or more of the determined one or more grant free resources. In an example, the first grant free resource configuration information may be configured by the distributed radio access network entity.

In an example, the distributed radio access network entity may determine/configure one or more grant free resources for the serving cell of the distributed radio access network entity, and/or may transmit, to the central radio access network entity, a second grant free resource configuration information associated with the one or more grant free resources determined/configured by the distributed radio access network entity. The second grant free resource configuration information may comprise at least one of: a grant free resource scheduling information (e.g. frequency, timing, periodicity, scheduling interval, and/or the like), a type of services (e.g. bearer type, slice type, and/or the like) allowed to utilize the determined/configured one or more grant free resources, a wireless device type (e.g. wireless device subscription type, a URLLC wireless device type, machine type communication wireless device type, and/or the like) allowed to utilize the determined/configured one or more grant free resources, a numerology configuration information (e.g. which TTI is utilized for the configured one or more grant free resources), one or more wireless device identifiers of one or more wireless devices allowed to utilize the determined/configured one or more grant free resources (e.g. C-RNTI, SPSC-RNTI, IMSI, temporary wireless device identifier for a grant free resource, and/or the like), a grant free resource configuration index, and/or the like.

In an example, the central radio access network entity may transmit, to one or more wireless devices, one or more radio resource control parameters at least based on one or more elements of the second grant free resource configuration information received from the distributed radio access network entity. In an example, the distributed radio access network entity may receive one or more packets from one or more wireless devices via one or more of the determined/configured one or more grant free resources.

In an example, the central radio access network entity may transmit, to the distributed radio access network entity, a fourth message configured to request a grant free resource utilization information. In an example, the fourth message may be transmitted via the F1 interface. The fourth message may be a resource status request message. The fourth message may comprise at least one of: one or more cell identifiers (e.g. global cell identifier, physical cell identifier, unique cell identifier at least at the distributed radio access network entity, and/or the like) of one or more cells that the central radio access network entity requests a grant free resource utilization information for, a triggering condition of transmitting a grant free resource utilization information;

and/or a reporting periodicity of reporting a grant free resource utilization information.

In an example, the triggering condition may comprise at least one of: a maximum grant free resource utilization level threshold (e.g. the distributed radio access network entity may transmit a grant free resource utilization information to the central radio access network entity if a grant free resource utilization level of one or more cells is same and/or higher than the maximum grant free resource utilization level threshold); a minimum grant free resource utilization level threshold (e.g. the distributed radio access network entity may transmit a grant free resource utilization information to the central radio access network entity if a grant free resource utilization level of one or more cells is same and/or lower than the maximum grant free resource utilization level threshold); a threshold number of uplink transmission collisions (e.g. the distributed radio access network entity may transmit a grant free resource utilization information to the central radio access network entity if a number of uplink transmission collisions of two or more wireless devices on one or more grant free resources is same and/or larger than the threshold number of uplink transmission collisions); and/or the like. The fourth message may further comprise a period to measure a grant free resource utilization state to determine whether one or more elements of the triggering condition are satisfied.

In an example, the distributed radio access network entity may transmit, to the central radio access network entity, a first message comprising a grant free resource utilization information of the serving cell served by the distributed radio access network entity. The first message may be determined and/or transmitted at least based on one or more elements of the fourth message. In an example, the first message may be transmitted via the F1 interface. In an example, the first message may be a resource status update message. In an example, one or more elements of the grant free resource utilization information may be determined at least based on the period to measure a grant free resource utilization state, the period received via the fourth message.

In an example, a first message may be triggered at least based on the triggering condition and/or the reporting periodicity associated with one or more cells of the one or more cell identifiers received via the fourth message. In an example, if a ratio of used grant free resources of a serving cell of the distributed radio access network entity is higher than 80% (a maximum grant free resource utilization level threshold: a maximum ratio of used grant free resources), the distributed radio access network entity may transmit a grant free resource utilization information for the serving cell to the central radio access network entity. In an example, if a collision ratio of grant free resources of a serving cell of the distributed radio access network entity is lower than 5% (a minimum grant free resource utilization level threshold: a minimum ratio of a collision ratio of grant free resources), the distributed radio access network entity may transmit a grant free resource utilization information for the serving cell to the central radio access network entity.

In an example, the grant free resource utilization information of the first message may comprise at least one of: a ratio (e.g. a percentage) of used grant free resources (e.g. a numerator for the ratio may be an amount of grant free resources utilized by one or more wireless devices among configured grant free resources, and/or a denominator for the ratio may be an amount of configured grant free resources for one or more wireless devices); a collision ratio (e.g. a collision percentage) of grant free resources (e.g. a numerator for the collision ratio may be an amount of grant free resources simultaneously attempted to utilize by two or more wireless devices among configured grant free resources, a denominator for the collision ratio may be an amount of configured grant free resources for one or more wireless devices, and/or a denominator for the collision ratio may be an amount of grant free resources utilized by one or more wireless devices among configured grant free resources); an attempt collision ratio (e.g. an attempt collision percentage) of one or more wireless devices (e.g. a numerator for the attempt collision ratio may be a number of collided transmission attempts of one or more wireless devices via grant free resources, and/or a denominator for the attempt collision ratio may be a number of transmission attempts of one or more wireless devices via grant free resources); and/or the like.

In an example, the ratio of used grant free resources, the collision ratio of grant free resources, and/or the attempt collision ratio of one or more wireless devices may be comprise an indication indicating a ratio level (e.g. high/medium/low, high/medium_high/medium/medium_low/low, and/or the like).

The grant free resource utilization information may further comprise a numerator and/or a denominator for the ratio of used grant free resources, the collision ratio of grant free resources, the attempt collision ratio of one or more wireless devices, and/or the like. In an example, the grant free resource utilization information may comprise at least one of: a number of wireless devices activated to use grant free resources; an average number of wireless devices activated to use grant free resources; and/or the like. In an example, the grant free resource utilization information may comprise a time period to determine one or more elements of the grant free resource utilization information.

The grant free resource utilization information may be for one or more grant free resources associated with at least one of: a grant free resource scheduling information (e.g. frequency, timing, periodicity, scheduling interval, and/or the like), a type of services (e.g. bearer type, slice type, and/or the like), a wireless device type (e.g. wireless device subscription type, a URLLC wireless device type, machine type communication wireless device type, and/or the like), a numerology configuration information (e.g. which TTI is utilized for the configured one or more grant free resources), one or more wireless device identifiers of one or more wireless devices (e.g. C-RNTI, SPSC-RNTI, IMSI, temporary wireless device identifier for a grant free resource, and/or the like), a grant free resource configuration index, one or more beams to support the one or more grant free resources, and/or the like.

In an example, the distributed radio access network entity may transmit, to the central radio access network entity, a grant free resource configuration shift indication indicating that the distributed radio access network entity shifts a grant free resource configuration (e.g. grant free resource scheduling configuration) for one or more wireless device to another grant free resource configuration. The grant free resource configuration shift indication may comprise one or more grant free resource configuration index and/or one or more wireless device identifiers of one or more wireless devices associated with the grant free resource configuration shift indication.

In an example, the central radio access network entity may configure one or more grant free resources of the serving cell of the distributed radio access network entity at least based on one or more elements of the grant free resource utilization information received via the first message.

In an example, if the grant free resource utilization information received via the first message indicates that a collision ratio of grant free resources for a first service type in a first serving cell is 50%, the central radio access network entity may decide to increase an amount of grant free resources for the first service type in the first serving cell, may reschedule (increase) grant free resources for the first service type, and/or may transmit the rescheduled grant free resource configuration information to the distributed radio access network entity and/or one or more associated wireless devices. In this case (i.e. a collision ratio of grant free resources for a first service type in a first serving cell is 50%), the central radio access network entity may decide to decrease a number of wireless devices allowed to utilize the grant free resources, may reconfigure a list of wireless devices allowed to utilize the grant free resources, and/or may transmit the list to the distributed radio access network entity.

In an example, the central radio access network entity may transmit, to the distributed radio access network entity, a second message comprising a third grant free resource configuration information associated with the one or more grant free resources configured at least based on one or more elements of the grant free resource utilization information received via the first message. The third grant free resource configuration information may comprise at least one of: a grant free resource scheduling information (e.g. frequency, timing, periodicity, scheduling interval, and/or the like), a type of services (e.g. bearer type, slice type, and/or the like) allowed to utilize the determined one or more grant free resources, a wireless device type (e.g. wireless device subscription type, a URLLC wireless device type, machine type communication wireless device type, and/or the like) allowed to utilize the determined one or more grant free resources, a numerology configuration information (e.g. which TTI is utilized for the determined one or more grant free resources), one or more wireless device identifiers of one or more wireless devices allowed to utilize the determined one or more grant free resources (e.g. C-RNTI, SPSC-RNTI, IMSI, temporary wireless device identifier for a grant free resource, and/or the like), a grant free resource configuration index, and/or the like.

In an example, the third grant free resource configuration information of the second message may comprise a scheduling configuration information of an increased number of grant free resources if one or more elements of the grant free resource utilization information of the first message indicates that grant free resources assigned in the serving cell are not enough to support a requirement of wireless devices.

In an example, the central radio access network entity may transmit, to one or more wireless devices, a third message comprising a fourth grant free resource configuration information (e.g. one or more radio resource control parameters) associated with the one or more grant free resources configured at least based on one or more elements of the grant free resource utilization information received via the first message. In an example, in response to receiving the fourth grant free resource configuration information, the distributed radio access network entity may configure one or more radio configuration parameters at least based on one or more elements of the fourth grant free resource configuration information, and/or receive one or more packets from one or more wireless devices via one or more of the one or more grant free resources configured at least based on one or more elements of the grant free resource utilization information. In an example, the fourth grant free resource configuration information of the third message may comprise a scheduling configuration information of a decreased number of grant free resources if one or more elements of the grant free resource utilization information of the first message indicates that grant free resources assigned in the serving cell are used less than the central radio access network entity expected.

In an example, the central radio access network entity may transmit, to the distributed radio access network entity, at least one of: a first wireless device identifier of a first wireless device allowed to utilize one or more of the one or more grant free resources configured at least based on one or more elements of the grant free resource utilization information; and/or a wireless device specific message associated with the first wireless device. In an example, the wireless device specific message may comprise at least one of: one or more elements of the fourth grant free resource configuration information; and/or a grant free resource index of the one or more elements of the fourth grant free resource configuration information. The distributed radio access network entity may transmit, to the first wireless device at least based on one or more elements of the second message, a grant free resource activation indication indicating when the first wireless device is allowed to utilize the one or more of the one or more grant free resources configured at least based on one or more elements of the grant free resource utilization information. In an example, the central radio access network entity may transmit, to the first wireless device, a grant free resource activation indication indicating when the first wireless device is allowed to utilize the one or more of the one or more grant free resources configured at least based on one or more elements of the grant free resource utilization information.

In an example, a central radio access network entity may receive, from a distributed radio access network entity, a first message comprising a grant free resource utilization information of a serving cell served by the distributed radio access network entity. The central radio access network entity may configure one or more grant free resources of the serving cell at least based on the grant free resource utilization information. The central radio access network entity may transmit, to the distributed radio access network entity, a second message comprising a first grant free resource configuration information associated with the one or more grant free resources. In an example, the central radio access network entity may further transmit, to a wireless device, a third message comprising a second grant free resource configuration information at least based on the first grant free resource configuration information.

In an example, the central radio access network entity may transmit, to the distributed radio access network entity, at least one of: a first wireless device identifier of a first wireless device allowed to utilize one or more of the one or more grant free resources; and/or a wireless device specific message associated with the first wireless device allowed to utilize one or more of the one or more grant free resources. The wireless device specific message may comprise at least one of the second grant free resource configuration information and/or a grant free resource index of the second grant free resource configuration information. The distributed radio access network entity may transmit to the first wireless device, a grant free resource activation indication indicating when the first wireless device is allowed to utilize one or more of the one or more grant free resources.

In an example, the first message may be transmitted at least based on a fourth message transmitted by the central radio access network entity to the distributed radio access network entity. The fourth message may be configured to request the grant free resource utilization information. The fourth message comprises at least one of: a triggering condition of transmitting the grant free resource utilization information; and/or a reporting periodicity of reporting the grant free resource utilization information.

In an example, the grant free resource utilization information may comprise at least one of: a ratio of used grant free resources; a percentage of used grant free resources; a collision ratio of grant free resources (with a denominator: used GF resources and/or all GF resources); a collision ratio of access attempts of a wireless device to grant free resources; a number of access attempts of a wireless device; a grant free resource monitoring period information for one or more of the grant free resource utilization information; a number of wireless devices activated to utilize grant free resources (e.g. per beam and/or per cell); an average number of wireless devices activated to utilize grant free resources; and/or the like. The grant free resource configuration information may comprises at least one of a frequency information, a time information, and/or an interval information of one or more grant free resources.

Distributed Unit Status Information

In an example embodiment, a distributed radio access network entity (DU, distributed unit) may transmit, to a central radio access network entity (CU, central unit), a radio resource status information of a licensed assisted access (LAA) cell served by the distributed radio access network entity. The central radio access network entity may configure and/or reconfigure one or more configuration parameters for the licensed assisted access cell at least based on the radio resource status information. The central radio access network entity may request, to the distributed radio access network entity, a radio resource status information report for a licensed assisted access cell with an event based condition for the report and/or a periodicity to report.

In an example, a distributed radio access network entity may be connected to a central radio access network entity. The two entities may be connected via an F1 interface. One or more licensed assisted access (LAA) cells of the distributed radio access network entity may utilize one or more unlicensed spectrums (one or more unlicensed frequency bands). The one or more unlicensed spectrums may be shared with one or more networks, e.g. WLAN, other LTE networks, and/or the like. In an example, to share the one or more unlicensed spectrums with other networks, the distributed radio access network entity may use an LBT (Listen Before Talk) function, in which the distributed radio access network entity may detect energy level from other networks on its transmission frequency before transmitting packets through the frequency. In an example, if the energy level detected is higher than a threshold, the distributed radio access network entity may not transmit packets via the frequency.

Figure 23:
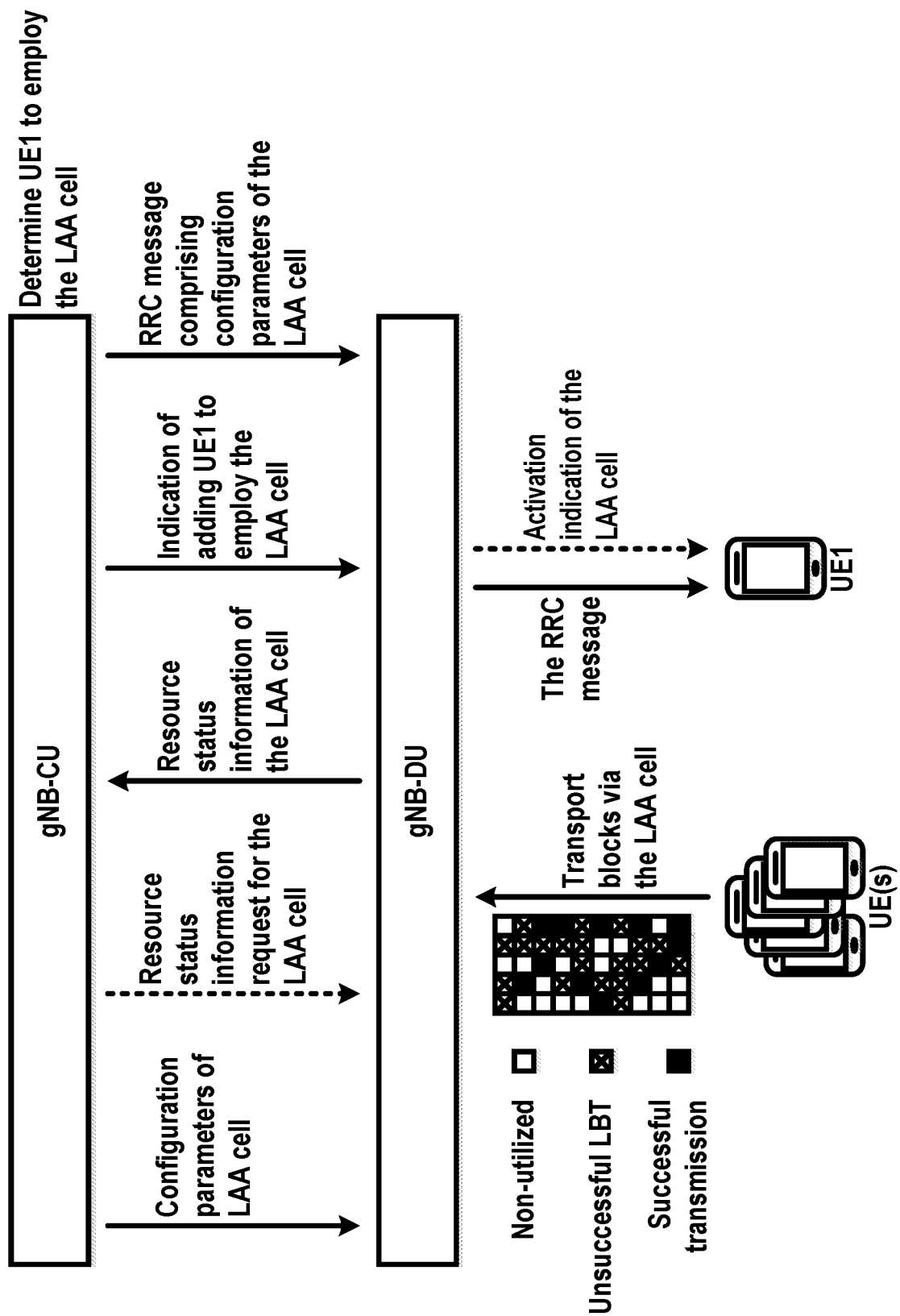
FIG. 23 is an example diagram of an aspect of an embodiment of the present disclosure.
Figure 24:
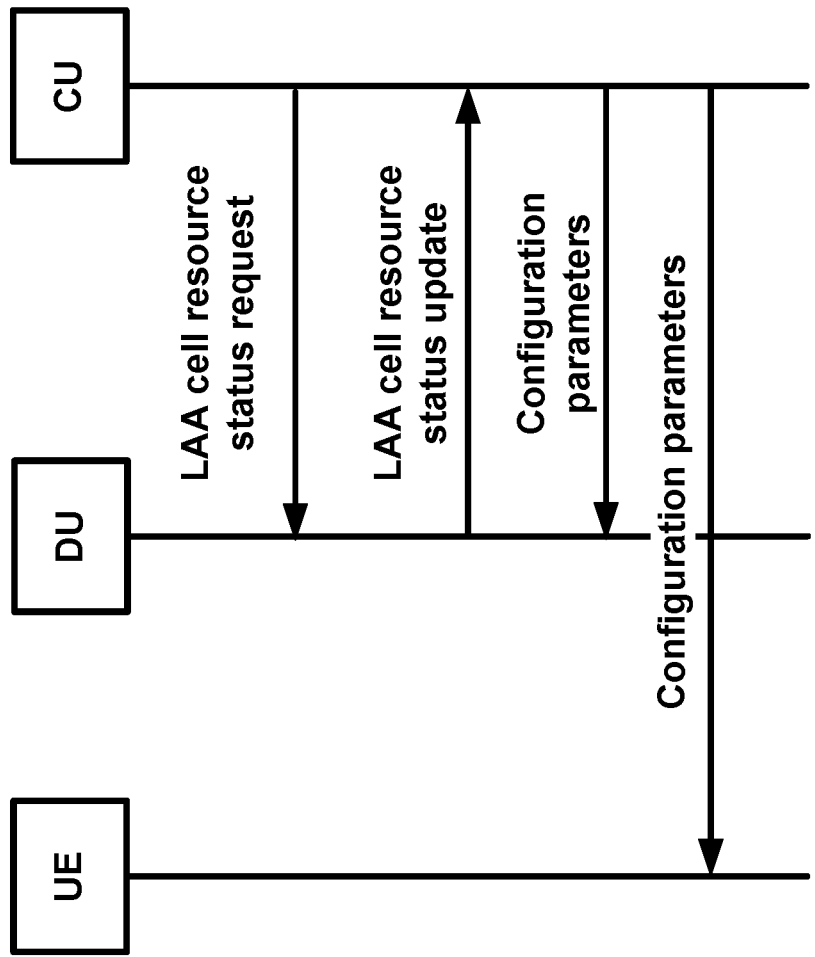
FIG. 24 is an example diagram of an aspect of an embodiment of the present disclosure.

In an example, as shown in FIG. 23 and/or FIG. 24, the central radio access network entity may transmit, to the distributed radio access network entity, a fourth message configured to request a radio resource status information of one or more licensed assisted access cells served by the distributed radio access network entity. In an example, the fourth message may be transmitted via the F1 interface. The fourth message may be a resource status request message. The fourth message may comprise at least one of: one or more cell identifiers (e.g. global cell identifier, physical cell identifier, unique cell identifier at least at the distributed radio access network entity, and/or the like) of one or more licensed assisted access cells that the central radio access network entity requests a radio resource status information for, a triggering condition of transmitting a radio resource status information; and/or a reporting periodicity of reporting a radio resource status information.

In an example, the triggering condition may comprise at least one of: a maximum LBT Failure Ratio threshold; a minimum LBT Failure Ratio threshold; a maximum LBT Success Ratio threshold; a minimum LBT Success Ratio threshold; a maximum PRB Tried threshold; a minimum PRB Tried threshold; a maximum PRB Failed threshold; a minimum PRB Failed threshold; a maximum PRB Used threshold; a minimum PRB Used threshold; a maximum PRB Usage threshold; a minimum PRB Usage threshold; a maximum Contention Level threshold; a minimum Contention Level threshold; a maximum Average CW (contention window) threshold; a minimum Average CW threshold; a maximum Current CW threshold; a minimum Current CW threshold; an indication indicating that the distributed radio access network entity may report a radio resource status information if absence of any other technology (network) is detected; and/or the like.

In an example, if one or more of measured results are same and/or larger than one or more associated maximum thresholds of the triggering condition, the distributed radio access network entity may transmit a radio resource status information of one or more licensed assisted access cells to the central radio access network entity. In an example, if one or more of measured results are same and/or smaller than one or more associated minimum thresholds of the triggering condition, the distributed radio access network entity may transmit a radio resource status information of one or more licensed assisted access cells to the central radio access network entity. The fourth message may further comprise a period to measure a radio resource status of one or more licensed assisted access cells to determine whether one or more elements of the triggering condition are satisfied.

In an example, the distributed radio access network entity may transmit, to the central radio access network entity, a first message comprising a radio resource status information of a licensed assisted access cell (LAA cell) served by the distributed radio access network entity. The first message may be determined and/or transmitted at least based on one or more elements of the fourth message. In an example, the first message may be transmitted via the F1 interface. The first message may be a resource status update message. In an example, one or more elements of the radio resource status information may be determined at least based on the period to measure a radio resource status, the period received via the fourth message.

Figure 25:
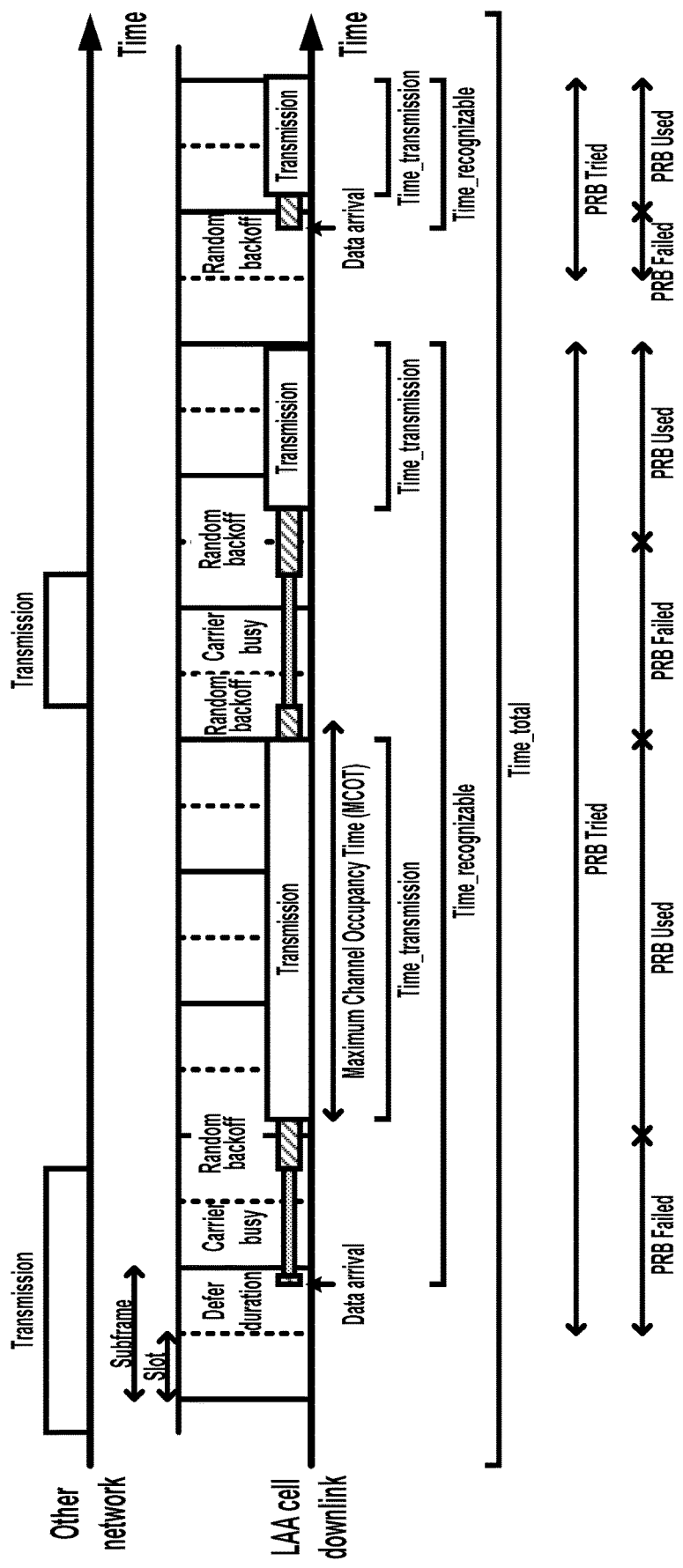
FIG. 25 is an example diagram of an aspect of an embodiment of the present disclosure.
Figure 26:
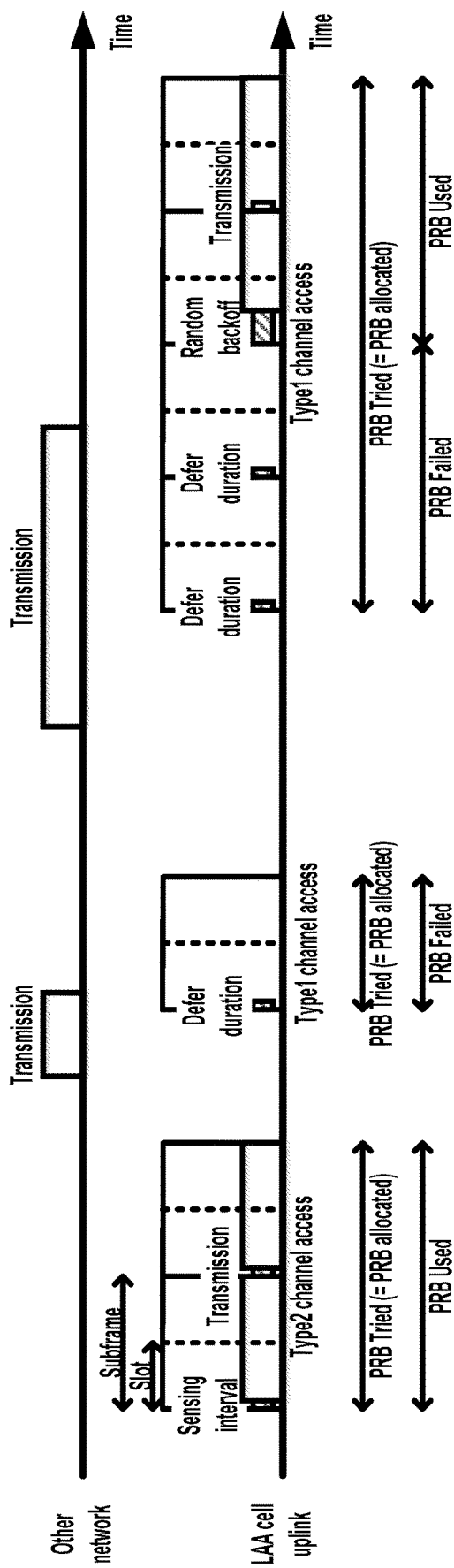
FIG. 26 is an example diagram of an aspect of an embodiment of the present disclosure.

In an example, as shown in FIG. 25 and/or FIG. 26, the radio resource status information of the licensed assisted access cell may comprise LBT Failure Ratio, LBT Success Ratio, PRB Tried, PRB Failed, PRB Used, PRB Usage, Contention Level, Average CW, Current CW, and/or absenceOfAnyOtherTechnology for the licensed assisted access cell (LAA cell). In an example, the absenceOfAnyOtherTechnology may indicate absence or presence of any other network sharing a frequency band used by the licensed assisted access cell of the distributed radio access network entity. In an example, the LBT Failure Ratio, the LBT Success Ratio, the PRB Tried, the PRB Failed, the PRB Used, and/or the PRB Usage may be determined in the time domain and/or in the time-frequency domain. In an example, in case of determining only in time domain, if one or more frequency domain resource blocks (PRBs) in a time slot are used for packet transmission, the time slot may be considered as used. In an example, if packet transmission starts or ends at the middle of a PRB (slot), the PRB may be considered as used. In an example, if packet transmission starts or ends at the middle of a PRB (slot), the PRB may be considered as failed.

In an example, the Contention Level may comprise a parameter indicating a level of contention on an unlicensed spectrum of the LAA cell (e.g. high contention, low contention; high contention, medium contention, low contention; or high contention, high medium contention, medium contention, low medium contention, low contention). For example, if the unlicensed spectrum is highly occupied by other networks (e.g. if a failure ratio in transmission attempts by the LAA cell is higher than a threshold, wherein the failure occurs because one or more other networks are transmitting through the unlicensed spectrum shared with the LAA cell), the Contention Level may be the high contention. For example, if the unlicensed spectrum is rarely occupied by other networks (e.g. if the failure ratio in transmission attempts by the LAA cell is lower than a threshold), the Contention Level may be the low contention.

In an example, the LBT Failure Ratio may comprise a ratio of a number of PRBs that the LAA cell used for packet transmission or tried to use but failed because of other networks' transmissions and a number of PRBs that the LAA cell tried to use for packet transmission but failed because of other networks' transmissions for a measurement time period during which resource status measurements are performed. For example, $$LBT\ Failure\ Ratio(T) = \frac{number\ of\ PRBs\ failed\ in\ packet\ transmission(T)}{number\ of\ PRBs\ used\ for\ packet\ transmission(T) + number\ of\ PRBs\ failed\ in\ packet\ transmission(T)} * 100,$$

where T is the measurement time period. In an example, for uplink transmission, the number of PRBs used for packet transmission or failed may be equivalent to the number of PRBs allocated for uplink transmission. In an example, for uplink transmission, a UE may report information of PRBs failed to use because of other networks' transmission to its serving eNB. In an example, for uplink transmission, an eNB may consider PRBs that the eNB allocated to a UE for uplink transmission but could not receive packets through as PRBs failed in packet transmission. In an example, the LBT Failure Ratio may be provided for downlink transmissions, for uplink transmission, and/or for all transmissions including both downlink and uplink transmissions.

In an example, the LBT Success Ratio may comprise a ratio of a number of PRBs that the LAA cell used for packet transmission or tried to use but failed because of other networks' transmissions and a number of PRBs that the LAA cell used for packet transmission during the measurement time period. For example, $$LBT\ Success\ Ratio(T) = \frac{number\ of\ PRBs\ used\ for\ packet\ transmission(T)}{number\ of\ PRBs\ used\ for\ packet\ transmission(T) + number\ of\ PRBs\ failed\ in\ packet\ transmission(T)} * 100,$$

where T is the measurement time period. In an example, for uplink transmission, the number of PRBs used for packet transmission or failed may be equivalent to the number of PRBs allocated for uplink transmission. In an example, for uplink transmission, a UE may report information of PRBs used for packet transmission to its serving eNB. In an example, for uplink transmission, an eNB may consider PRBs that the eNB received packets through as PRBs used for packet transmission. In an example, the LBT Failure Ratio may be provided for downlink transmissions, for uplink transmission, and/or for all transmissions including both downlink and uplink transmissions.

In an example, the PRB Tried may comprise a ratio of a number of all PRBs available and a number of PRBs that the LAA cell used for packet transmission or tried to use but failed because of other networks' transmissions during the measurement time period. For example, $$PRB\ Tried(T) = \frac{number\ of\ PRBs\ used\ for\ packet\ transmission(T) + number\ of\ PRBs\ failed\ in\ packet\ transmission(T)}{number\ of\ PRBs\ available(T)} * 100,$$

where T is the measurement time period. In an example, for uplink transmission, the number of PRBs used for packet transmission or failed may be equivalent to the number of PRBs allocated for uplink transmission. In an example, the PRB Tried may be provided for downlink transmissions, for uplink transmission, and/or for all transmissions including both downlink and uplink transmissions.

In an example, the PRB Failed may comprise a ratio of a number of all PRBs available and a number of PRBs that the LAA cell tried to use for packet transmission but failed because of other networks' transmissions during the measurement time period. For example, $$PRB\ Failed(T) = \frac{number\ of\ PRBs\ failed\ in\ packet\ transmission(T)}{number\ of\ PRBs\ available(T)} * 100,$$

where T is the measurement time period. In an example, for uplink transmission, a UE may report information of PRBs failed to use because of other networks' transmission to its serving eNB. In an example, for uplink transmission, an eNB may consider PRBs that the eNB allocated to a UE for uplink transmission but could not receive packets through as PRBs failed in packet transmission. In an example, the PRB Failed may be provided for downlink transmissions, for uplink transmission, and/or for all transmissions including both downlink and uplink transmissions.

In an example, the PRB Used may comprise a ratio of a number of all PRBs available and a number of PRBs that the LAA cell used for packet transmission during the measurement time period. For example, $$PRB\ Used(T) = \frac{number\ of\ PRBs\ used\ for\ packet\ transmission(T)}{number\ of\ PRBs\ available(T)} * 100,$$

where T is the measurement time period.

In an example, for uplink transmission, a UE may report information of PRBs used for packet transmission to its serving eNB. In an example, for uplink transmission, an eNB may consider PRBs that the eNB received packets through as PRBs used for packet transmission. In an example, the PRB Used may be provided for downlink transmissions, for uplink transmission, and/or for all transmissions including both downlink and uplink transmissions.

In an example, the PRB Usage may comprise Downlink PRB Usage and/or Uplink PRB Usage. In an example, the Downlink PRB Usage may comprise a ratio of a number of all PRBs available and a number of PRBs that the LAA cell used for downlink packet transmission during the measurement time period. For example, $$\text{Downlink } PRB \text{ Usage}(T) = \frac{\text{number of } PRBs \text{ used for downlink packet transmission}(T)}{\text{number of } PRBs \text{ available}(T)} * 100,$$

where T is the measurement time period. In an example, the Uplink PRB Usage may comprise a ratio of the number of all PRBs available and the number of PRBs that the LAA cell used for uplink packet transmission or tried to use for uplink packet transmission but failed because of other networks' transmissions during the measurement time period. For example, $$\text{Uplink } PRB \text{ Usage}(T) = \frac{\text{number of } PRBs \text{ used for uplink packet transmission}(T) + \text{number of } PRBs \text{ failed in uplink packet transmission}(T)}{\text{number of } PRBs \text{ available}(T)} * 100,$$

where T is the measurement time period. In an example, for the Uplink PRB Usage, the number of PRBs used for uplink packet transmission or failed may be equivalent to the number of PRBs allocated for uplink transmission.

In an example, the Average CW may comprise average contention window sizes of each channel access priority class (e.g. CWp=1, CWp=2, CWp=3, and/or CWp=4) for a measurement time period during which status measurements are performed and/or total average contention window size of all channel access priority classes for the measurement time period. In an example, the average contention window size may be calculated by averaging (e.g. combining) all contention window sizes used in every channel access procedure for transmission during the measurement time period for each channel access priority class. For example, $$\text{average contention window } size_p(T) = \frac{\text{sum of contention window sizes for each } transmission_p(T)}{\text{number of all } transmissions_p(T)}.$$

where T is the measurement time period, and p is the channel access priority class, e.g. p=1, 2, 3, or 4. In an example, the total average contention window size may be calculated by averaging all contention window sizes used in every channel access procedure for transmission for all channel access priority class during the measurement time period. For example, $$\text{total average contention window size } (T) = \frac{\sum_{p=1}^{4} \text{sum of contention window sizes for each } transmission_p(T)}{\sum_{p=1}^{4} \text{number of all } transmissions_p(T)}.$$

In an example, the Average CW may be provided for downlink transmissions, for uplink transmission, and/or for all transmissions including both downlink and uplink transmissions. In an example, uplink transmissions using the type 2 UL channel access procedure are excluded in calculation of the Average CW.

In an example, the Current CW may comprise current contention window sizes for each channel access priority class (e.g. CWp=1, CWp=2, CWp=3, and/or CWp=4) and/or total current contention window size of all channel access priority classes. In an example, the current contention window size for each channel access priority class may be a contention window size that the LAA cell is currently using for packet transmission of the channel access priority class. In an example, the total current contention window size may be calculated by averaging the current contention window sizes for each channel access priority class. For example, $$\text{total current contention window size} = \frac{\sum_{p=1}^{4} \text{current contention window } size_p}{\text{number of channel access priority classes}},$$

where the number of channel access priority classes may be 4. In an example, the Current CW may be provided for downlink transmissions, for uplink transmission, and/or for all transmissions including both downlink and uplink transmissions. In an example, uplink transmissions using the type 2 UL channel access procedure are excluded in calculation of the Current CW.

In an example, the central radio access network entity may configure one or more network configuration parameters of the LAA cell of the distributed radio access network entity at least based on one or more elements of the radio resource status information of the LAA cell received via the first message from the distributed radio access network entity.

In an example, if an LBT Failure Ratio for the LAA cell in the first message is 90%, the central radio access network entity may consider the unlicensed frequency of the LAA cell is highly congested. In this case, the central radio access network may redirect one or more wireless devices served via LAA cell to another cell (e.g. another LAA cell using another unlicensed frequency, and/or a cell using a licensed frequency). The central radio access network may initiate a handover of one or more of the one or more wireless device towards another cell, and/or add secondary cells for one or more of the one or more wireless devices.

In an example, if a PRB Usage for the LAA cell in the first message is 10%, the central radio access network entity may consider that the unlicensed frequency of the LAA cell is not congested and/or has an enough capacity to support more packet transmissions. In this case, the central radio access network may allow more wireless devices to utilize the LAA cell. The central radio access network may transmit, to a neighboring base station, a resource status information of the LAA cell, and/or the neighboring base station may initiate a handover and/or a secondary base station addition towards the LAA cell. The central radio access network may also add the LAA cell as a secondary cell for other wireless devices.

In an example, the central radio access network entity may transmit, to the distributed radio access network entity, a second message comprising one or more of the one or more network configuration parameters. The distributed radio access network entity may configure one or more network configuration parameters at least based on one or more elements of the second message. In an example, the central radio access network entity may transmit, to one or more wireless devices, a third message comprising one or more radio resource control configuration parameters at least based on the one or more network configuration parameters. The one or more wireless device may transmit and/or receive one or more packets via the LAA cell at least based on one or more elements of the third message. In an example, the one or more network configuration parameters of the second message may be to add or remove the LAA cell as a secondary cell for one or more wireless devices. In an example, the one or more radio resource radio resource control configuration parameters may be a command for a wireless device to add or remove the LAA cell as a secondary cell.

In an example, the central radio access network entity may transmit, to a first radio access network entity (e.g. neighboring base station), a fifth message at least based on one or more elements of the first message and/or the radio resource status information for the LAA cell received via the first message. The fifth message may be configured to indicate at least one of: a load status of the licensed assisted access (LAA) cell with one or more elements of the radio resource status information (e.g. load information message and/or resource status update message); a handover request towards a cell of the first radio access network entity (e.g. handover request message); a handover request acknowledge configured to accept a handover request received by the central radio access network entity from the first radio access network entity (e.g. handover request acknowledge message); a handover preparation failure configured to reject a handover request received by the central radio access network entity from the first radio access network entity (e.g. handover preparation failure message); and/or the like.

In an example, the fifth message may be configured to indicate at least one of: a multi (and/or dual) connectivity initiation request for one or more cells of the first radio access network entity (e.g. SgNB addition request message and/or SeNB addition request message); a multi (and/or dual) connectivity initiation request acknowledge configured to accept a multi connectivity initiation request received by the central radio access network entity from the first radio access network entity (e.g. SgNB addition request acknowledge message and/or SeNB addition request acknowledge message); a multi (and/or dual) connectivity initiation request reject configured to reject a multi connectivity initiation request received by the central radio access network entity from the first radio access network entity (e.g. SgNB addition request reject message and/or SeNB addition request reject message); and/or the like.

In an example, the fifth message may be configured to indicate at least one of: a multi (and/or dual) connectivity modification request for one or more cells of the first radio access network entity (e.g. SgNB modification request message and/or SeNB modification request message); a multi (and/or dual) connectivity modification request acknowledge configured to accept a multi connectivity modification request received by the central radio access network entity from the first radio access network entity (e.g. SgNB modification request acknowledge message and/or SeNB modification request acknowledge message); a multi (and/or dual) connectivity modification request reject configured to reject a multi connectivity modification request received by the central radio access network entity from the first radio access network entity (e.g. SgNB modification request reject message and/or SeNB modification request reject message); and/or the like.

In an example, the fifth message may be configured to indicate at least one of: a multi (and/or dual) connectivity modification required for one or more cells of the distributed radio access network entity (e.g. SgNB modification required message and/or SeNB modification required message); a multi (and/or dual) connectivity modification confirmation configured to accept a multi connectivity modification requirement received by the central radio access network entity from the first radio access network entity (e.g. SgNB modification confirm message and/or SeNB modification confirm message); a multi (and/or dual) connectivity modification refusal configured to reject a multi connectivity modification requirement received by the central radio access network entity from the first radio access network entity (e.g. SgNB modification refuse message and/or SeNB modification refuse message); and/or the like.

In an example, the fifth message may be configured to indicate at least one of: a multi (and/or dual) connectivity release request for one or more cells of the first radio access network entity (e.g. SgNB release request message and/or SeNB release request message); a multi (and/or dual) connectivity release required for one or more cells of the distributed radio access network entity (e.g. SgNB release required message and/or SeNB release required message); a multi (and/or dual) connectivity release confirmation configured to accept a multi connectivity release requirement received by the central radio access network entity from the first radio access network entity (e.g. SgNB release confirm message and/or SeNB release confirm message); and/or the like.

In an example, a central radio access network entity may receive, from a distributed radio access network entity, a first message comprising a radio resource status information of a licensed assisted access cell served by the distributed radio access network entity. The radio resource status information may comprise at least one of an LBT Failure Ratio, an LBT Success Ratio, a PRB Tried, a PRB Failed, a PRB Used, a PRB Usage, a Contention Level, an Average CW, a Current CW, and/or an absenceOfAnyOtherTechnology. The central radio access network entity may configure one or more network configuration parameters at least based on the radio resource status information. The central radio access network entity may transmit, to the distributed radio access network entity, a second message comprising one or more of the one or more network configuration parameters.

In an example, the central radio access network entity may transmit, to a wireless device, a third message comprising one or more radio resource control configuration parameters at least based on the one or more network configuration parameters. The first message may be transmitted at least based on a fourth message transmitted by the central radio access network entity to the distributed radio access network entity. The fourth message may be configured to request the radio resource status information of the licensed assisted access cell. The fourth message may comprise at least one of: a triggering condition of transmitting the radio resource status information; and/or a periodicity of transmitting the radio resource status information.

In an example, the central radio access network entity may transmit, to a first radio access network entity, a fifth message at least based on one or more elements of the first message. The fifth message may be configured to indicate at least one of: a load status of the licensed assisted access cell with one or more elements of the radio resource status information; a handover request; a handover request acknowledge configured to accept a handover request received by the central radio access network entity from the first radio access network entity; a handover preparation failure configured to reject a handover request received by the central radio access network entity from the first radio access network entity; a multi connectivity initiation request; a multi connectivity initiation request acknowledge configured to accept a multi connectivity initiation request received by the central radio access network entity from the first radio access network entity; a multi connectivity initiation request reject configured to reject a multi connectivity initiation request received by the central radio access network entity from the first radio access network entity; a multi connectivity modification request; a multi connectivity modification request acknowledge configured to accept a multi connectivity modification request received by the central radio access network entity from the first radio access network entity; a multi connectivity modification request reject configured to reject a multi connectivity modification request received by the central radio access network entity from the first radio access network entity; and/or the like.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 41:
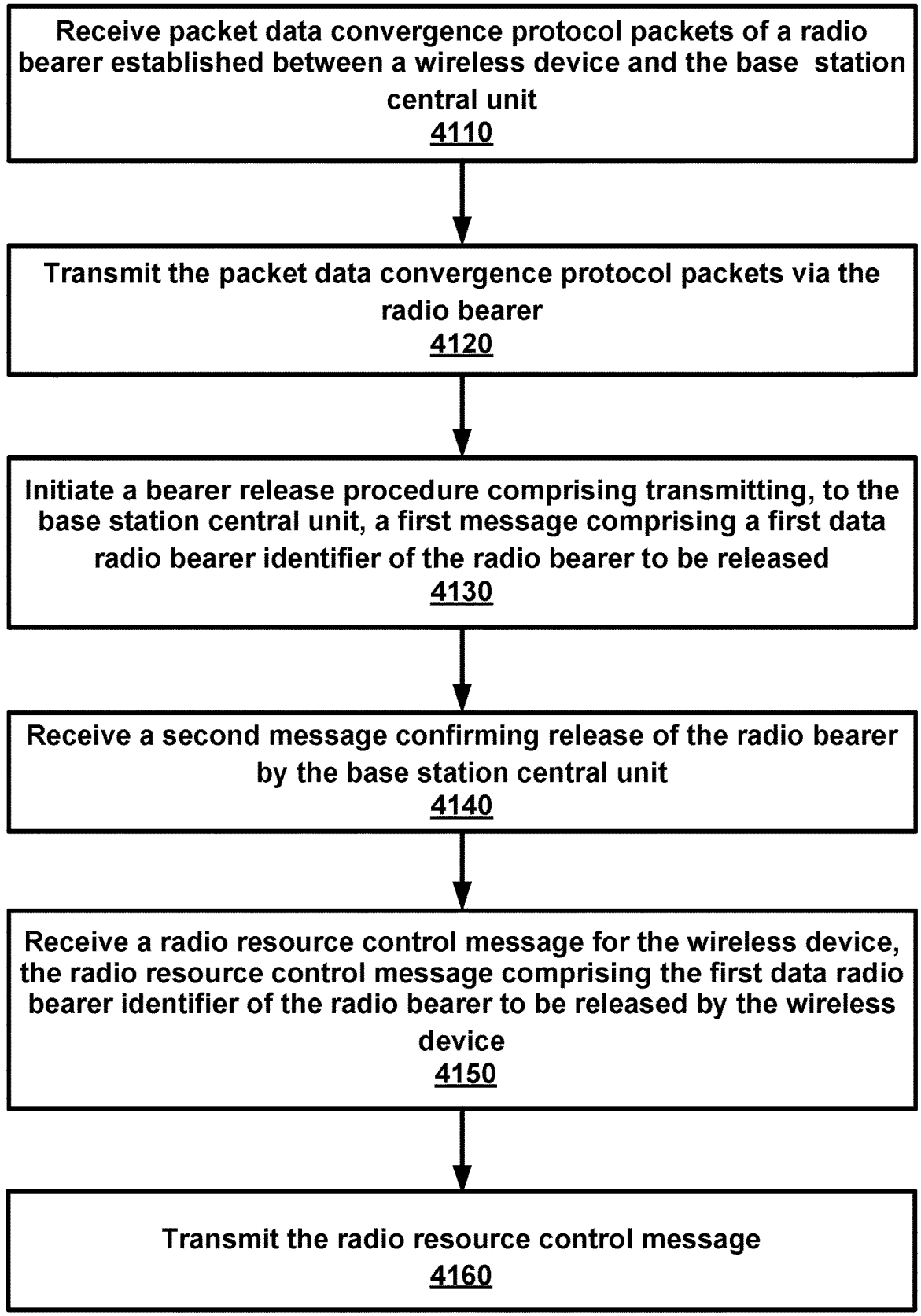
FIG. 41 is a flow diagram of an aspect of an embodiment of the present disclosure.

FIG. 41 is an example flow diagram as per an aspect of an embodiment of the present disclosure. At 4110, a base station distributed unit may receive, from a base station central unit, packet data convergence protocol (PDCP) packets of a radio bearer established between a wireless device and the base station central unit. At 4120, the base station distributed unit may transmit, to the wireless device, the PDCP packets via the radio bearer. At 4130, the base station distributed unit may initiate a bearer release procedure. The bearer release procedure may comprise transmitting, to the base station central unit, a first message. The first message may comprise a first data radio bearer identifier of the radio bearer to be released. At 4140, the base station distributed unit may receive, from the base station central unit, a second message confirming release of the radio bearer by the base station central unit. At 4150, the base station distributed unit may receive, from the base station central unit, a radio resource control message for the wireless device. The radio resource control message may comprise the first data radio bearer identifier of the radio bearer to be released by the wireless device. At 4160, the base station distributed unit may transmit, to the wireless device, the radio resource control message.

According to an embodiment, the base station distributed unit may release the radio bearer as part of the bearer release procedure. According to an embodiment, the base station distributed unit may release the radio bearer based on the first message.

According to an embodiment, the base station distributed unit may transmit the first message based on a load status of the base station distributed unit. According to an embodiment, the base station distributed unit may transmit the first message based on a radio load status of one or more cells of the base station distributed unit. According to an embodiment, the base station distributed unit may transmit the first message based on an uplink or downlink buffer state information of the wireless device. According to an embodiment, the base station distributed unit may transmit the first message based on a time alignment timer expiration. According to an embodiment, the base station distributed unit may transmit the first message based on a channel state information received from the wireless device. According to an embodiment, the base station distributed unit may transmit the first message based on an uplink channel measurement by the base station distributed unit. According to an embodiment, the base station distributed unit may transmit the first message based on a radio link interference associated with the wireless device. According to an embodiment, the base station distributed unit may transmit the first message based on a radio link interference associated with one or more cells of the base station distributed unit. According to an embodiment, the base station distributed unit may transmit the first message based on one or more radio link configuration changes.

According to an embodiment, the first message may comprise a first data radio bearer identifier of a second data radio bearer required to be released. According to an embodiment, the first message may comprise a second data radio bearer identifier of a second data radio bearer required to be modified. According to an embodiment, the first message may comprise one or more radio configuration parameters to be changed. According to an embodiment, the first message may comprise one or more beam information of one or more beams recovered by the wireless device. According to an embodiment, the first message may comprise one or more beam information of one or more beams serving the wireless device. According to an embodiment, the first message may comprise one or more beam information of one or more beams released by the wireless device. According to an embodiment, the first message may comprise an information element indicating that the wireless device changed one or more serving beams.

According to an embodiment, the radio resource control message may further comprise one or more radio resource control parameters determined based on the first message. The one or more radio resource control parameters may comprise a second data radio bearer identifier of a second data radio bearer required to be modified. The one or more radio resource control parameters may comprise one or more radio link configuration parameters to be changed.

According to an embodiment, the base station distributed unit may decode the radio resource control message. According to an embodiment, the base station distributed unit may determine one or more radio link configurations based on the radio resource control message.

Figure 42:
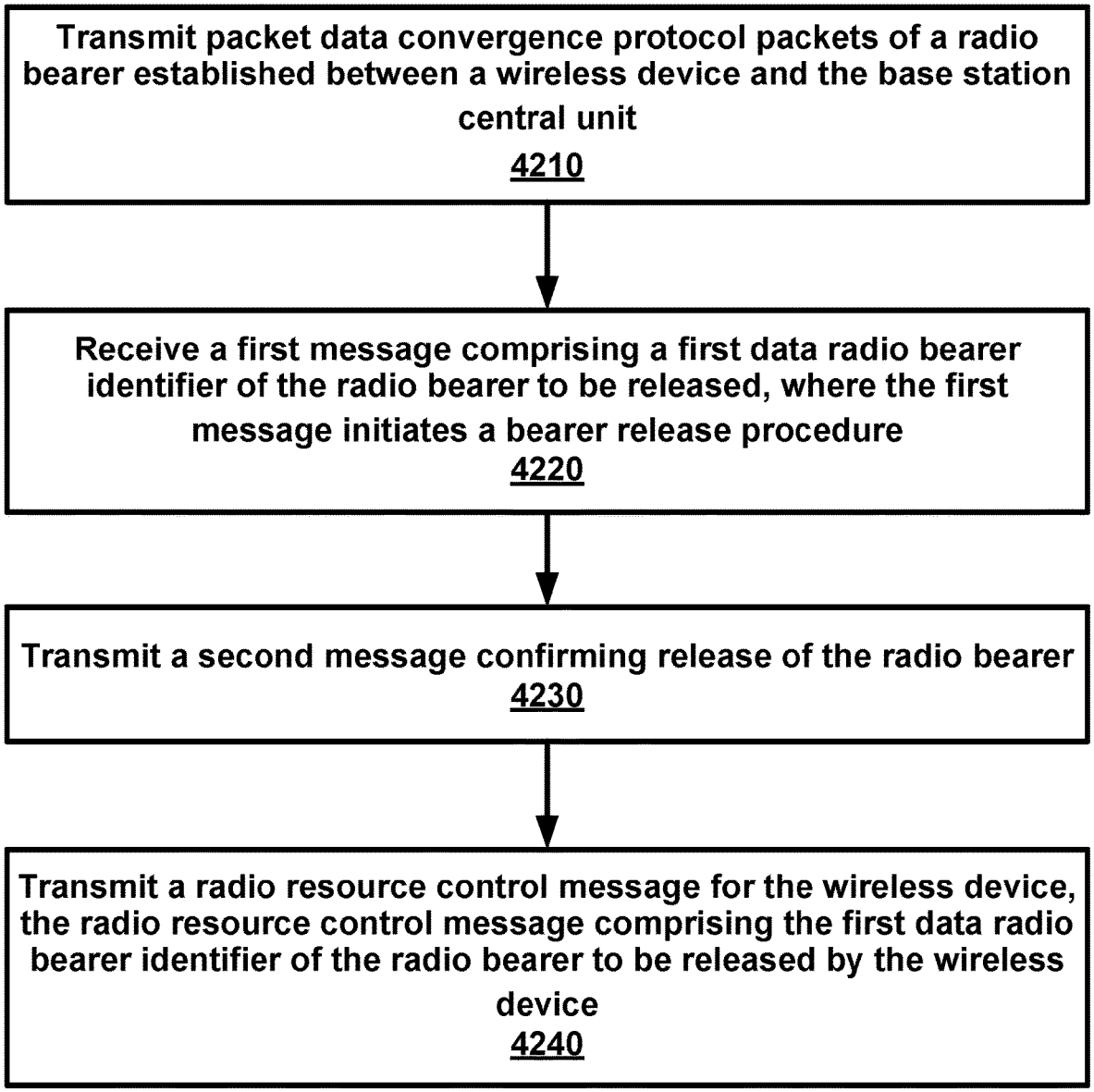
FIG. 42 is a flow diagram of an aspect of an embodiment of the present disclosure.

FIG. 42 is an example flow diagram as per an aspect of an embodiment of the present disclosure. At 4210, a base station central unit may transmit, to a base station distributed unit, packet data convergence protocol (PDCP) packets of a radio bearer established between a wireless device and the base station central unit. At 4220, the base station central unit may receive, from the base station distributed unit, a first message comprising a first data radio bearer identifier of the radio bearer to be released. The first message may initiate a bearer release procedure. At 4230, the base station central unit may transmit, to the base station distributed unit, a second message confirming release of the radio bearer. At 4240, the base station central unit may transmit, to the base station distributed unit, a radio resource control message for the wireless device. The radio resource control message may comprise the first data radio bearer identifier of the radio bearer to be released by the wireless device.

According to an embodiment, the base station distributed unit may release the radio bearer as part of the bearer release procedure. According to an embodiment, the base station central unit may release the radio bearer based on the first message.

According to an embodiment, the base station distributed unit may transmit the first message based on a load status of the base station distributed unit. According to an embodiment, the base station distributed unit may transmit the first message based on a radio load status of one or more cells of the base station distributed unit. According to an embodiment, the base station distributed unit may transmit the first message based on an uplink or downlink buffer state information of the wireless device. According to an embodiment, the base station distributed unit may transmit the first message based on a time alignment timer expiration. According to an embodiment, the base station distributed unit may transmit the first message based on a channel state information received from the wireless device. According to an embodiment, the base station distributed unit may transmit the first message based on an uplink channel measurement by the base station distributed unit. According to an embodiment, the base station distributed unit may transmit the first message based on a radio link interference associated with the wireless device. According to an embodiment, the base station distributed unit may transmit the first message based on. According to an embodiment, the base station distributed unit may transmit the first message based on a radio link interference associated with one or more cells of the base station distributed unit. According to an embodiment, the base station distributed unit may transmit the first message based on one or more radio link configuration changes.

According to an embodiment, the first message may comprise a first data radio bearer identifier of a second data radio bearer required to be released. According to an embodiment, the first message may comprise a second data radio bearer identifier of a second data radio bearer required to be modified. According to an embodiment, the first message may comprise one or more radio configuration parameters to be changed. According to an embodiment, the first message may comprise one or more beam information of one or more beams recovered by the wireless device. According to an embodiment, the first message may comprise one or more beam information of one or more beams serving the wireless device. According to an embodiment, the first message may comprise one or more beam information of one or more beams released by the wireless device. According to an embodiment, the first message may comprise an information element indicating that the wireless device changed one or more serving beams.

According to an embodiment, the radio resource control message may further comprise one or more radio resource control parameters determined based on the first message. According to an embodiment, the one or more radio resource control parameters may comprise a second data radio bearer identifier of a second data radio bearer required to be modified. According to an embodiment, the one or more radio resource control parameters may comprise one or more radio link configuration parameters to be changed.

Figure 43:
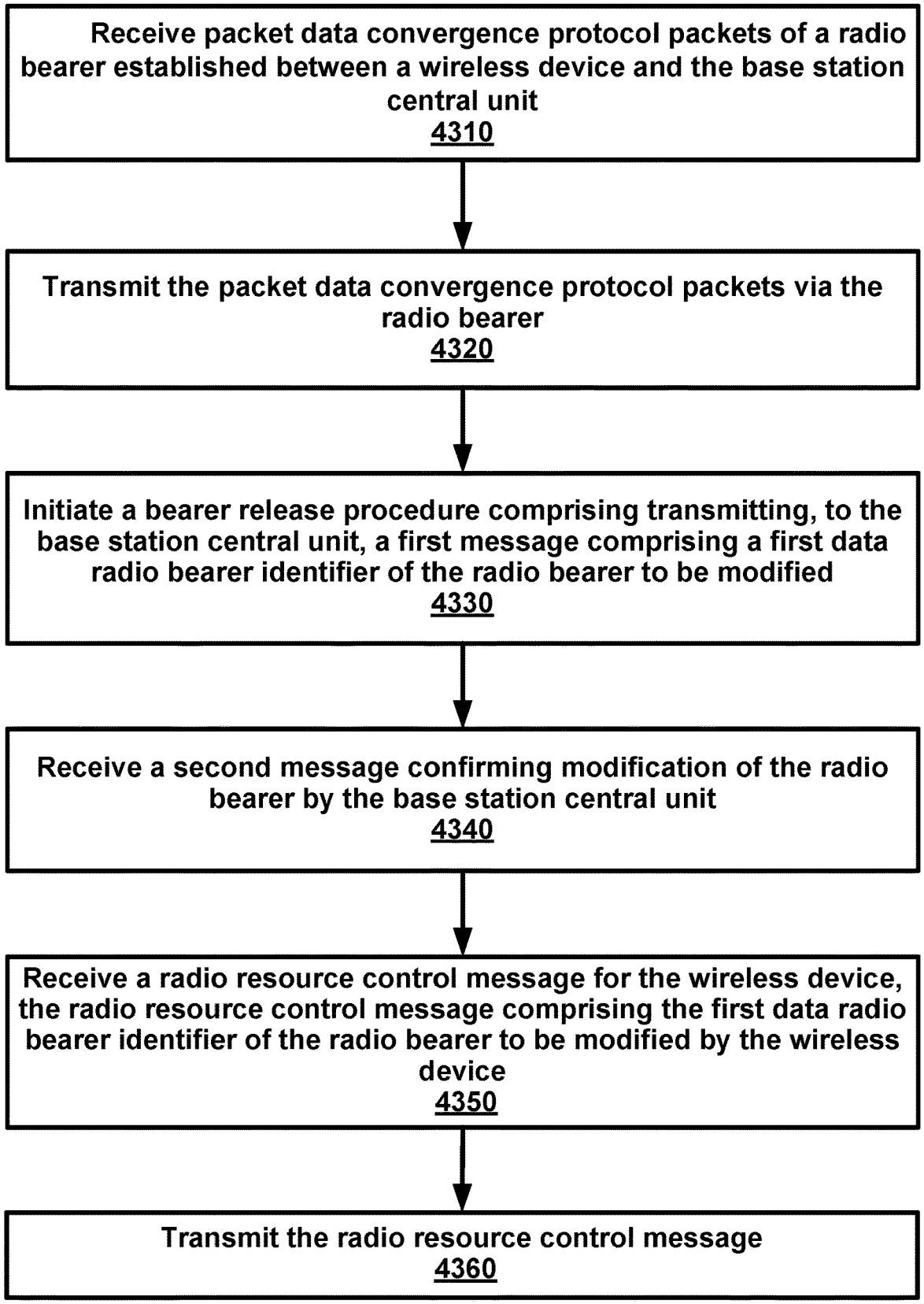
FIG. 43 is a flow diagram of an aspect of an embodiment of the present disclosure.

FIG. 43 is an example flow diagram as per an aspect of an embodiment of the present disclosure. At 4310, a base station distributed unit may receive, from a base station central unit, packet data convergence protocol (PDCP) packets of a radio bearer established between a wireless device and the base station central unit. At 4320, the base station distributed unit may transmit, to the wireless device, the PDCP packets via the radio bearer. At 4330, the base station distributed unit may initiate a bearer release procedure. The bearer release procedure may comprise transmitting, to the base station central unit, a first message. The first message may comprise a first data radio bearer identifier of the radio bearer to be modified. At 4340, the base station distributed unit may receive, from the base station central unit, a second message confirming modification of the radio bearer by the base station central unit. At 4350, the base station distributed unit may receive, from the base station central unit, a radio resource control message for the wireless device. The radio resource control message may comprise the first data radio bearer identifier of the radio bearer to be modified by the wireless device. At 4360, the base station distributed unit may transmit, to the wireless device, the radio resource control message.

According to an embodiment, the second message may comprise a first information element. According to an embodiment, the first information element may indicate accepting one or more elements of the first message. According to an embodiment, the first information element may indicate rejecting one or more elements of the first message. According to an embodiment, the first information element may indicate confirming one or more elements of the first message.

Figure 44:
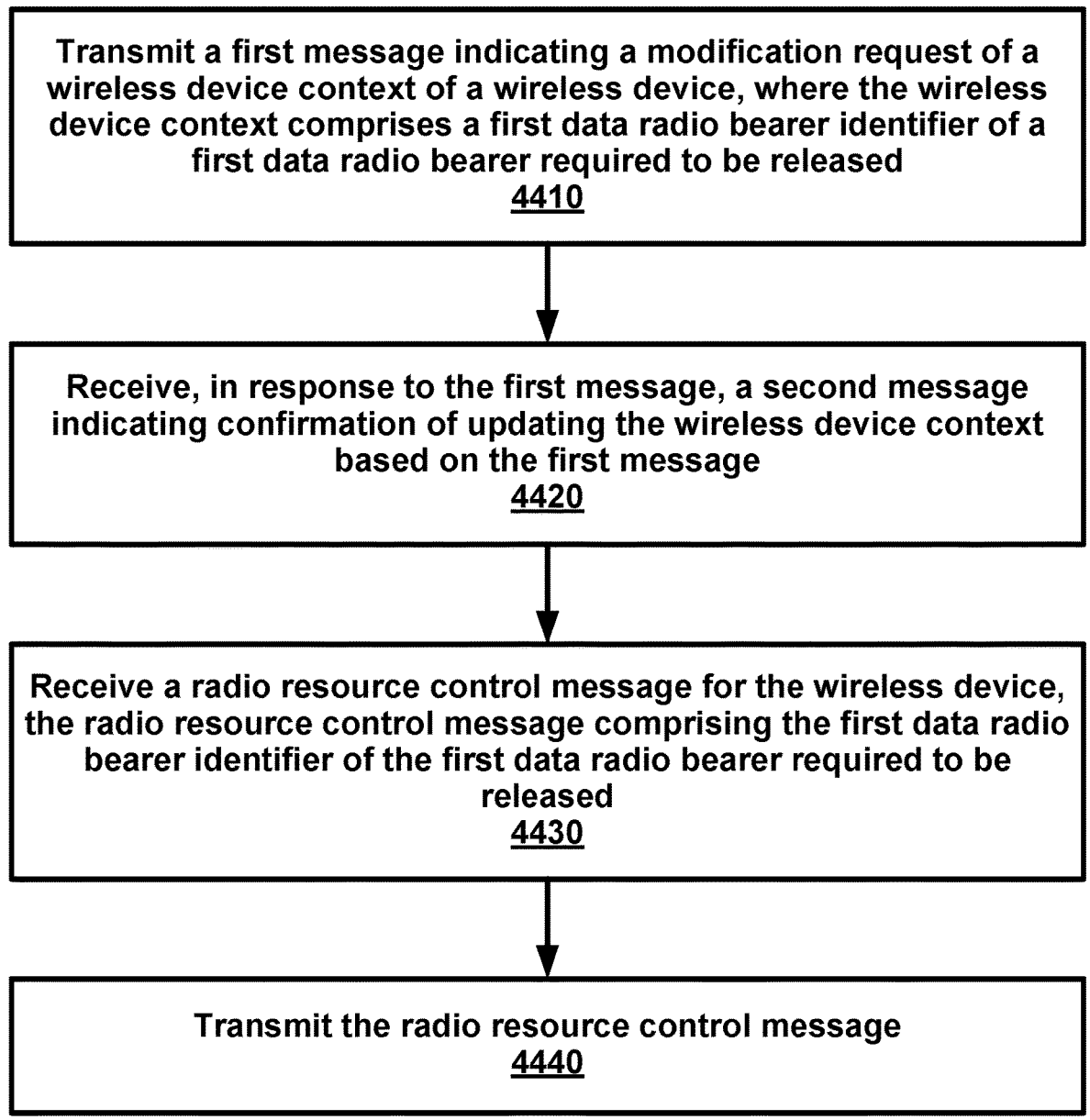
FIG. 44 is a flow diagram of an aspect of an embodiment of the present disclosure.

FIG. 44 is an example flow diagram as per an aspect of an embodiment of the present disclosure. At 4410, a base station distributed unit may transmit, to a base station central unit, a first message indicating a modification request of a wireless device context of a wireless device. The wireless device context may comprise a first data radio bearer identifier of a first data radio bearer required to be released. At 4420, the base station distributed unit may receive, from the base station central unit and in response to the first message, a second message. The second message may indicate confirmation of updating the wireless device context based on the first message. At 4430, the base station distributed unit may receive, from the base station central unit, a radio resource control message for the wireless device. The radio resource control message may comprise the first data radio bearer identifier of the first data radio bearer required to be released. At 4440, the base station distributed unit may transmit, to the wireless device, the radio resource control message.

Figure 45:
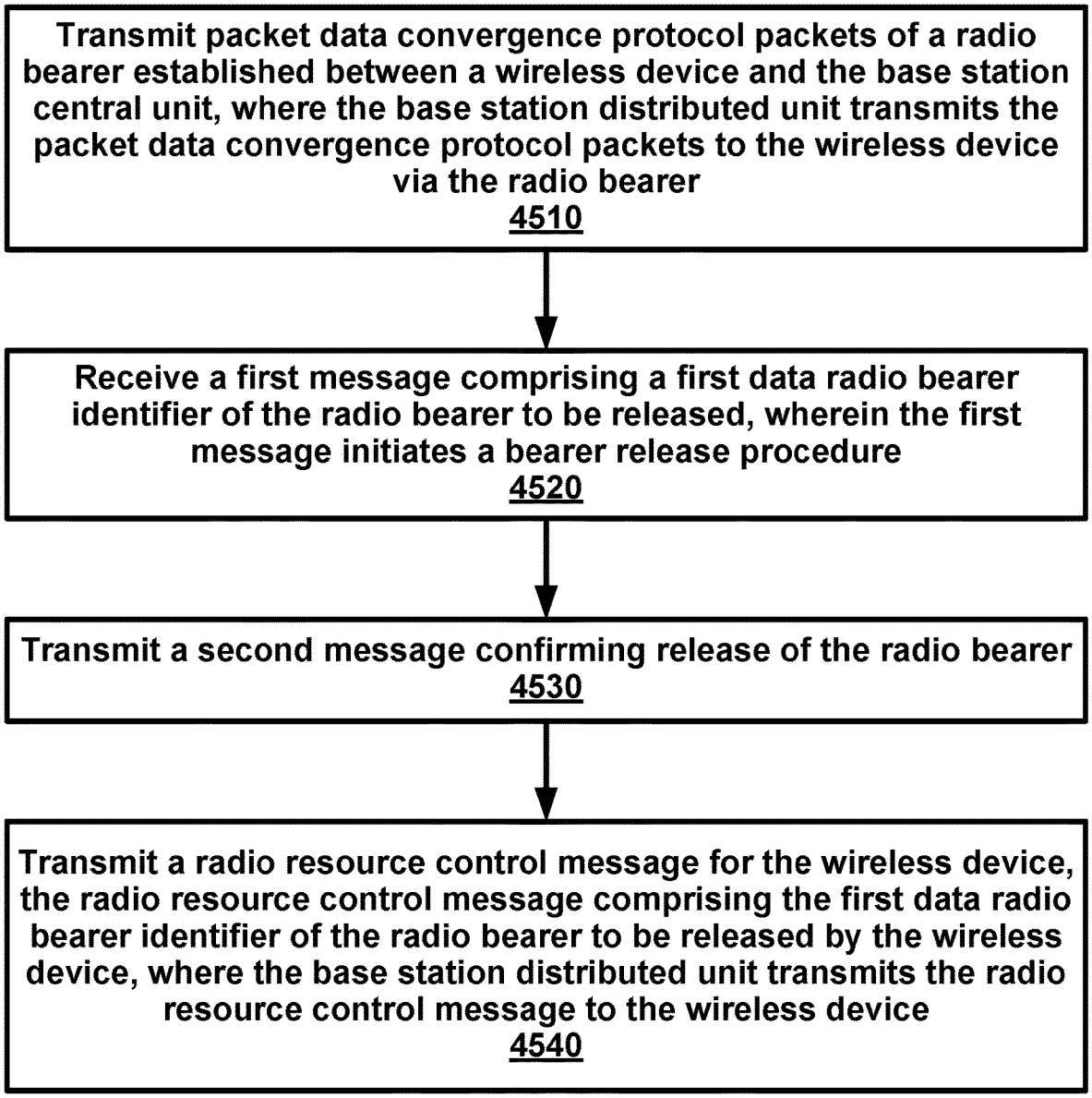
FIG. 45 is a flow diagram of an aspect of an embodiment of the present disclosure.

FIG. 45 is an example flow diagram as per an aspect of an embodiment of the present disclosure. At 4510, a base station central unit may transmit, to a base station distributed unit, packet data convergence protocol (PDCP) packets of a radio bearer established between a wireless device and the base station central unit. The base station distributed unit may transmit the PDCP packets to the wireless device via the radio bearer. At 4520, the base station central unit may receive, from the base station distributed unit, a first message. The first message may comprise a first data radio bearer identifier of the radio bearer to be released. The first message may initiate a bearer release procedure. At 4530, the base station central unit transmit, to the base station distributed unit, a second message confirming release of the radio bearer. At 4540, the base station central unit may transmit, to the base station distributed unit, a radio resource control message for the wireless device. The radio resource control message may comprise the first data radio bearer identifier of the radio bearer to be released by the wireless device. The base station distributed unit may transmit the radio resource control message to the wireless device.

Figure 46:
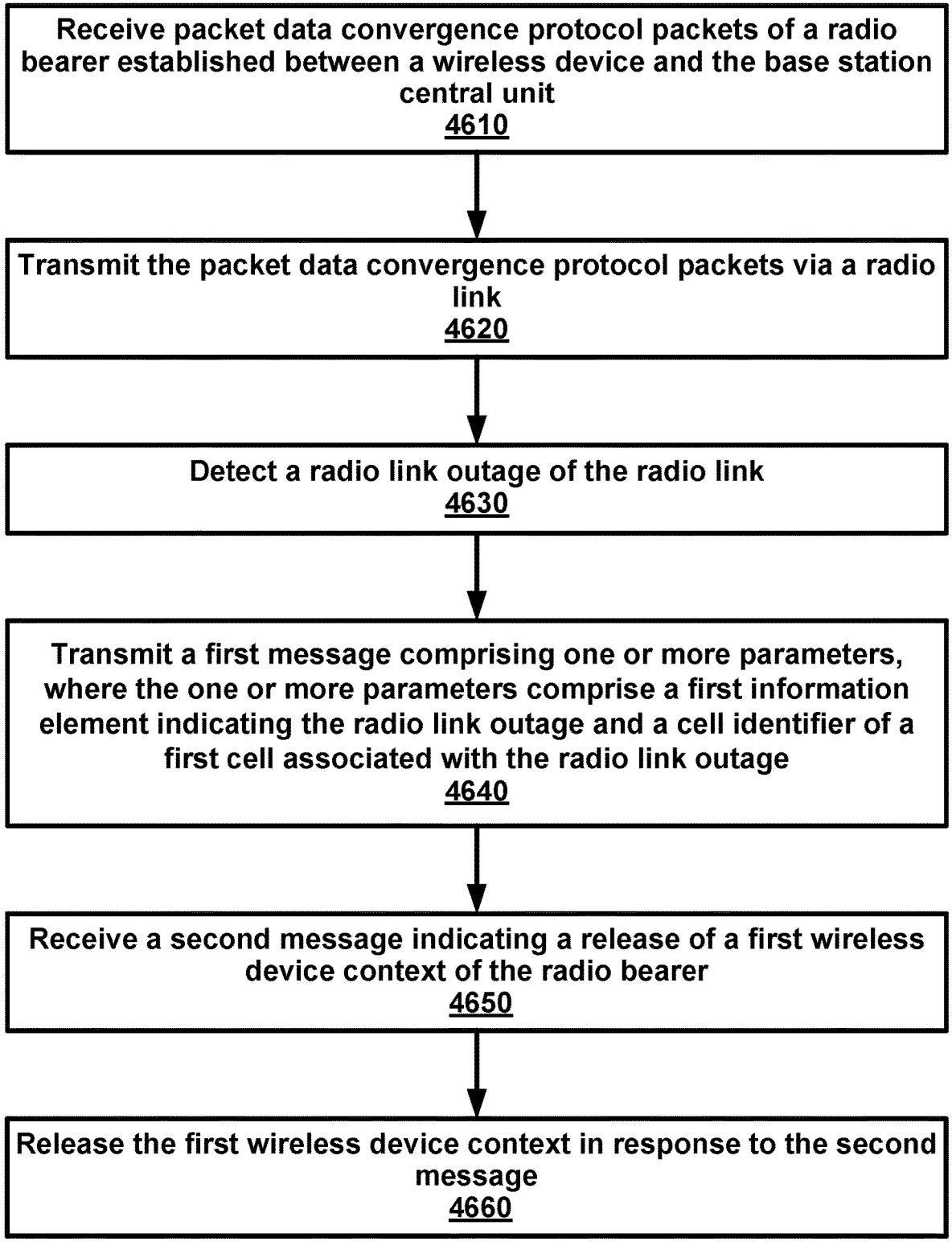
FIG. 46 is a flow diagram of an aspect of an embodiment of the present disclosure.

FIG. 46 is an example flow diagram as per as aspect of an embodiment of the present disclosure. At 4610, a base station distributed unit may receive, from a base station central unit, packet data convergence protocol (PDCP) packets of a radio bearer established between a wireless device and the base station central unit. At 4620, the base station distributed unit may transmit, to the wireless device, the PDCP packets via a radio link. At 4630, the base station distributed unit may detect a radio link outage of the radio link. At 4640, the base station distributed unit may transmit, to the base station central unit, a first message. The first message may comprise one or more parameters. The one or more parameters may comprise a first information element indicating the radio link outage. The one or more parameters may comprise a cell identifier of a first cell associated with the radio link outage. At 4650, the base station distributed unit may receive, from the base station central unit and in response to the one or more parameters, a second message indicating a release of a first wireless device context of the radio bearer. At 4660, the base station distributed unit may release the first wireless device context in response to the second message.

According to an embodiment, the one or more parameters may further comprise a second information element indicating that a number of downlink packet retransmissions reaches a threshold number of downlink packet retransmissions. According to an embodiment, the one or more parameters may further comprise a third information element indicating at least one failure to receive a channel status information report from the wireless device. According to an embodiment, the one or more parameters may further comprise a fourth information element indicating expiration of a time duration without receiving at least one transport block from the wireless device. According to an embodiment, the one or more parameters may further comprise a fifth information element indicating at least one failure to receive a precoding matrix indicator from the wireless device. According to an embodiment, the one or more parameters may further comprise a sixth information element indicating at least on failure to receive a rank indicator from the wireless device. According to an embodiment, the one or more parameters may further comprise a seventh information element indicating a connection loss of the wireless device.

According to an embodiment, the base station central unit may determine a radio link failure of the wireless device based on the one or more parameters of the first message. According to an embodiment, the base station central unit may transmit, to a core network entity, a third message indicating a release request for a second wireless device context of the wireless device. The second wireless device context may comprise an interface connection between the base station central unit and the core network entity for the wireless device.

According to an embodiment, the first wireless device context may comprise a data radio bearer. According to an embodiment, the first wireless device context may comprise a logical channel. According to an embodiment, the first wireless device context may comprise a security configuration parameter. According to an embodiment, the first wireless device context may comprise an information parameter associated with the wireless device.

According to an embodiment, the second message may comprise a wireless device identifier of the wireless device. According to an embodiment, the second message may comprise a first information element indicating that a cause of the release of the first wireless device context is a radio link failure of the wireless device.

According to an embodiment, the base station distributed unit may transmit, to the base station central unit, a third message indicating completion of the release of the first wireless device context.

FIG. 47 is an example flow diagram as per an aspect of an embodiment of the present disclosure. At 4710, a base station central unit may transmit, to a base station distributed unit, packet data convergence protocol (PDCP) packets of a radio bearer established between a wireless device and the base station central unit. The base station distributed unit may transmit the PDCP packets to the wireless device via a radio link. At 4720, the base station central unit may receive, from the base station distributed unit, a first message. The first message may comprise one or more parameters. The one or more parameters may comprise a first information element indicating a radio link outage of the radio link. The one or more parameters may comprise a cell identifier of a first cell associated with the radio link outage. At 4730, the base station central unit may transmit, to the base station distributed unit and in response to the one or more parameters, a second message indicating a release of a first wireless device context of the radio bearer of the wireless device.

According to an embodiment, the base station distributed unit may release the first wireless device context in response to the second message.

According to an embodiment, the one or more parameters may further comprise a second information element indicating that a number of downlink packet retransmissions reaches a threshold number of downlink packet retransmissions. According to an embodiment, the one or more parameters may further comprise a third information element indicating at least one failure to receive a channel status information report from the wireless device. According to an embodiment, the one or more parameters may further comprise a fourth information element indicating expiration of a time duration without receiving at least one transport block from the wireless device. According to an embodiment, the one or more parameters may further comprise a fifth information element indicating at least one failure to receive a precoding matrix indicator from the wireless device. According to an embodiment, the one or more parameters may further comprise a sixth information element indicating at least on failure to receive a rank indicator from the wireless device. According to an embodiment, the one or more parameters may further comprise a seventh information element indicating a connection loss of the wireless device.

According to an embodiment, the base station central unit may determine a radio link failure of the wireless device based on the one or more parameters of the first message.

According to an embodiment, the base station central unit may transmit, to a core network entity, a third message indicating a release request for a second wireless device context of the wireless device. The second wireless device context may comprise an interface connection between the base station central unit and the core network entity for the wireless device.

According to an embodiment, the first wireless device context may comprise a data radio bearer. According to an embodiment, the first wireless device context may comprise a logical channel. According to an embodiment, the first wireless device context may comprise a security configuration parameter. According to an embodiment, the first wireless device context may comprise an information parameter associated with the wireless device.

Figure 48:
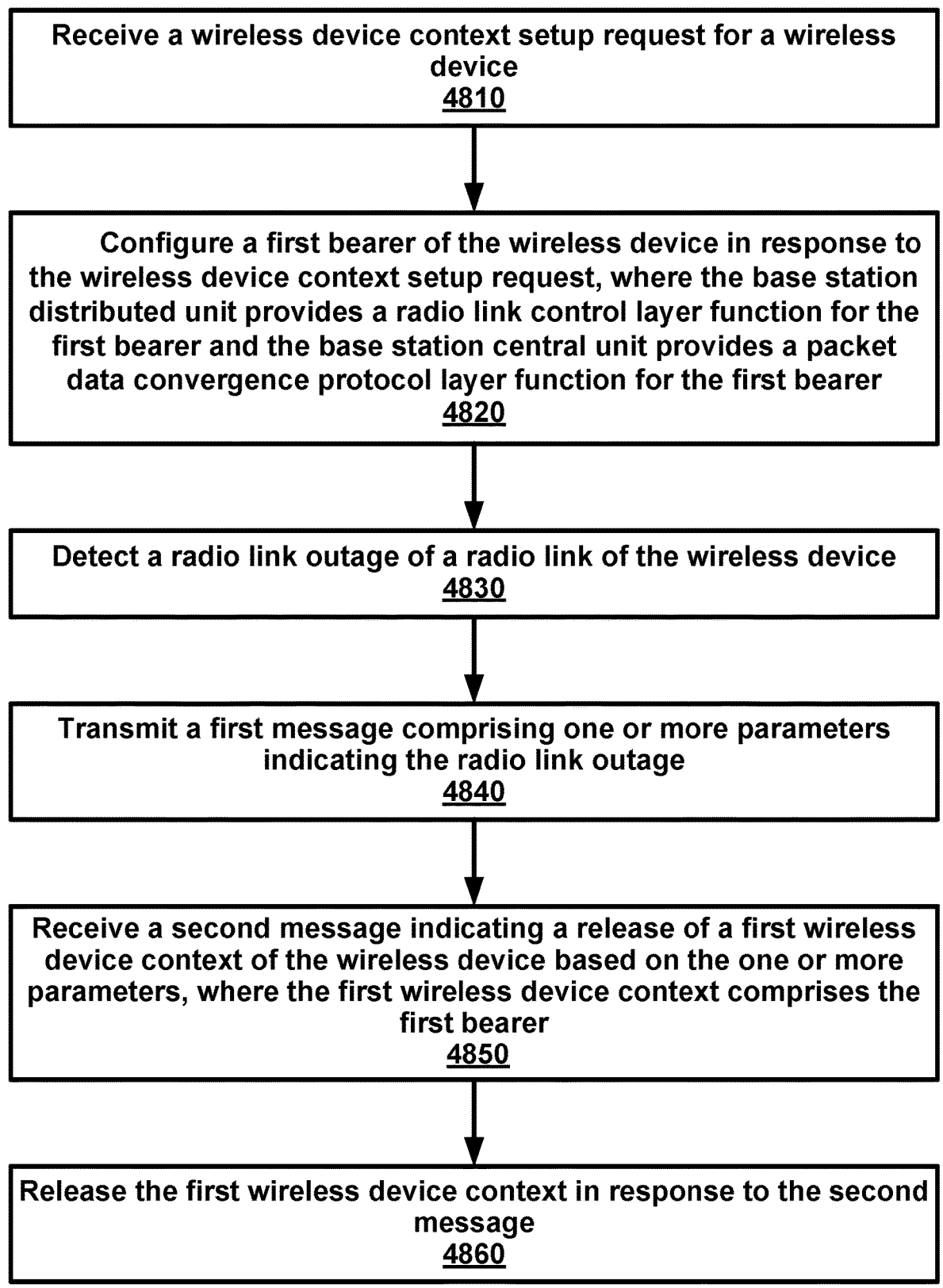
FIG. 48 is a flow diagram of an aspect of an embodiment of the present disclosure.

FIG. 48 is an example flow diagram as per an aspect of an embodiment of the present disclosure. At 4810, a base station distributed unit may receive, from a base station central unit, a wireless device context setup request for a wireless device. At 4820, the base station distributed unit may configure a first bearer of the wireless device in response to the wireless device context setup request. The base station distributed unit may provide a radio link control layer function for the first bearer. The base station central unit may provide a packet data convergence protocol layer function for the first bearer. At 4830, the base station distributed unit may detect a radio link outage of a radio link of the wireless device. At 4840, the base station distributed unit may transmit, to the base station central unit, a first message comprising one or more parameters indicating the radio link outage. At 4850, the base station distributed unit may receive, from the base station central unit, a second message indicating a release of a first wireless device context of the wireless device based on the one or more parameters. The first wireless device context may comprise the first bearer. At 4860, the base station distributed unit may release the first wireless device context in response to the second message.

Figure 49:
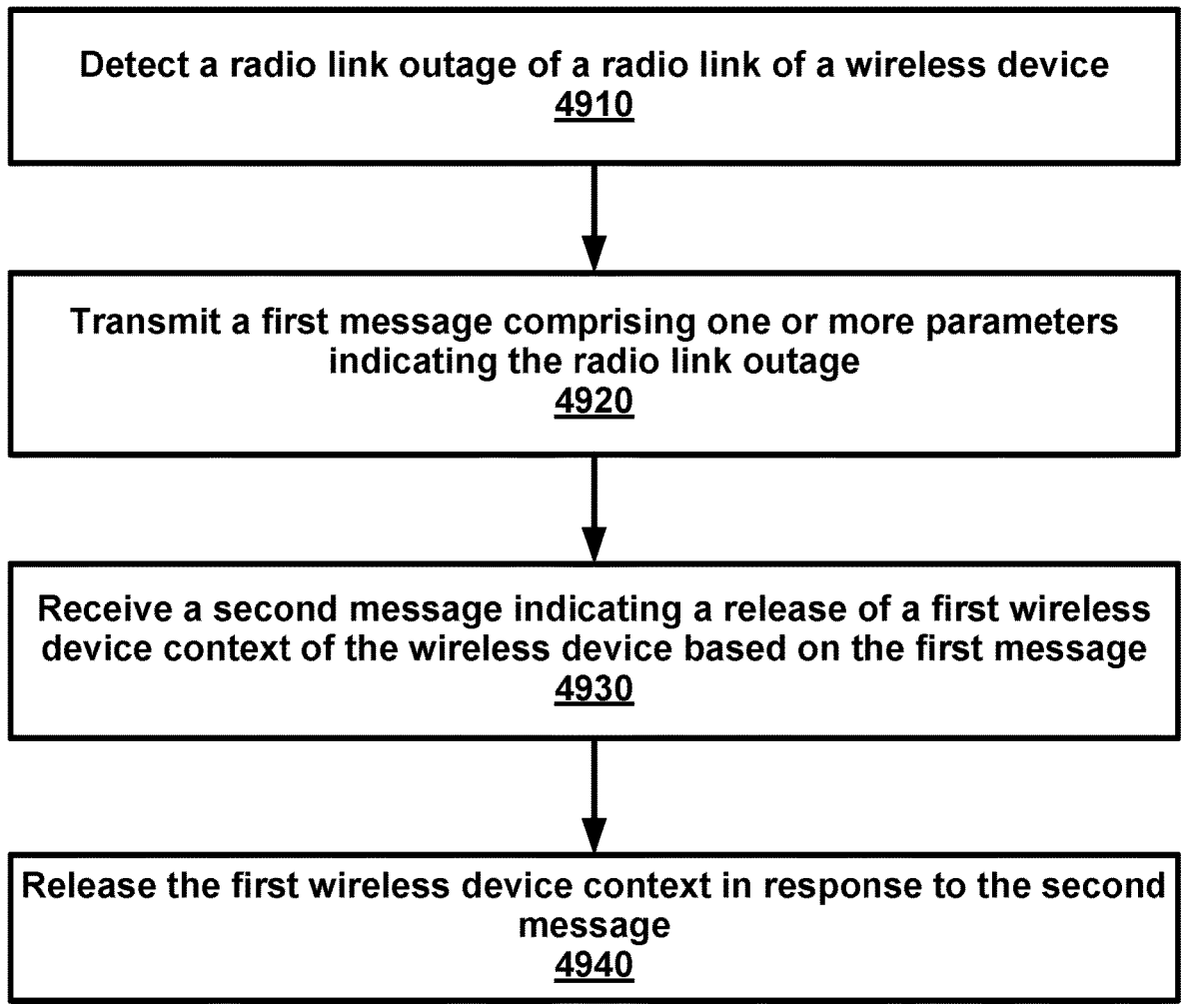
FIG. 49 is a flow diagram of an aspect of an embodiment of the present disclosure.

FIG. 49 is an example flow diagram as per an aspect of an embodiment of the present disclosure. At 4910, a base station distributed unit may detect a radio link outage of a radio link of a wireless device. At 4920, the base station distributed unit may transmit, to a base station central unit, a first message comprising one or more parameters indicating the radio link outage. At 4930, the base station distributed unit may receive, from the base station central unit, a second message indicating a release of a first wireless device context of the wireless device based on the first message. At 4940, the base station distributed unit may release the first wireless device context in response to the second message.

Figure 50:
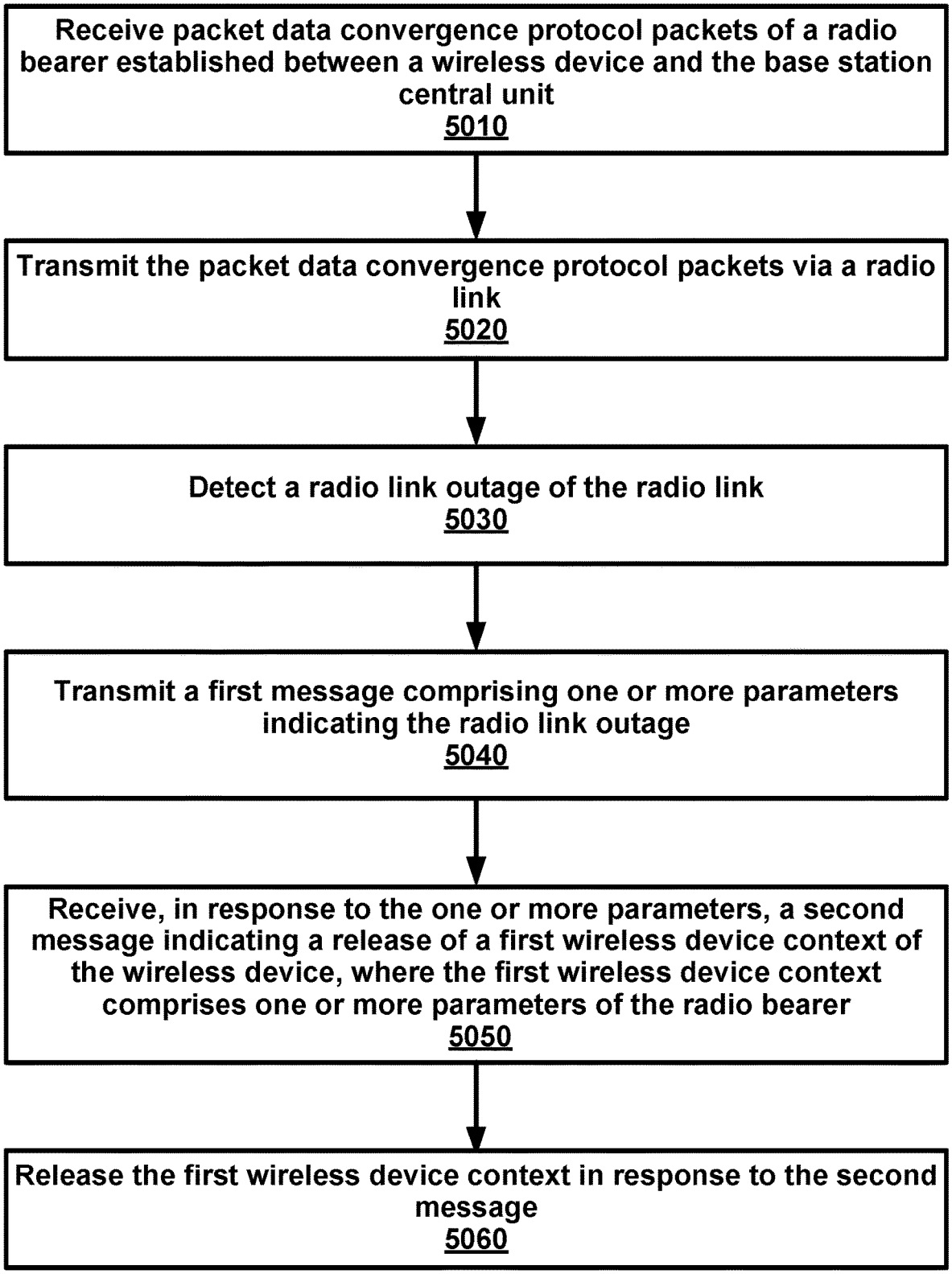
FIG. 50 is a flow diagram of an aspect of an embodiment of the present disclosure.

FIG. 50 is an example flow diagram as per an aspect of an embodiment of the present disclosure. At 5010, a base station distributed unit may receive, from a base station central unit, packet data convergence protocol (PDCP) packets of a radio bearer established between a wireless device and the base station central unit. At 5020, the base station distributed unit may transmit, to the wireless device, the PDCP packets via a radio link. At 5030, the base station distributed unit may detect a radio link outage of the radio link. At 5040, the base station distributed unit may transmit, to the base station central unit, a first message comprising one or more parameters indicating the radio link outage. At 5050, the base station distributed unit may receive, from the base station central unit and in response to the one or more parameters, a second message indicating a release of a first wireless device context of the wireless device. The first wireless device context may comprise one or more parameters of the radio bearer. At 5060, the base station distributed unit may release the first wireless device context in response to the second message.

Figure 51:
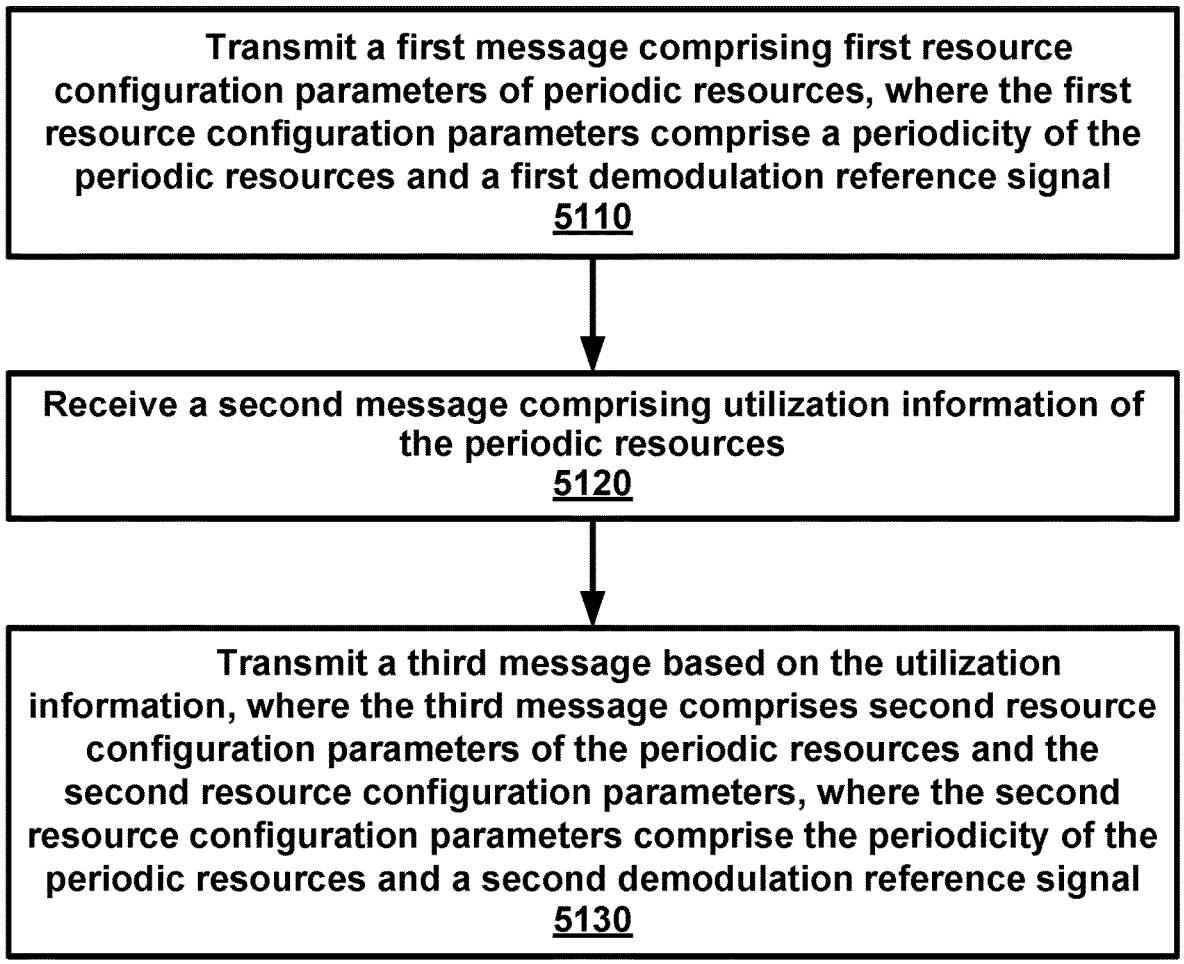
FIG. 51 is a flow diagram of an aspect of an embodiment of the present disclosure.

FIG. 51 is an example flow diagram as per an aspect of an embodiment of the present disclosure. At 5110, a base station central unit may transmit, to a first wireless device and via a base station distributed unit, a first message comprising first resource configuration parameters of periodic resources. The first resource configuration parameters may comprise a periodicity of the periodic resources. The first resource configuration parameters may comprise a first demodulation reference signal. At 5120, the base station central unit may receive, from the base station distributed unit, a second message comprising utilization information of the periodic resources. At 5130, the base station central unit may transmit, to a second wireless device and via the base station distributed unit, a third message based on the utilization information. The third message may comprise second resource configuration parameters of the periodic resources. The second resource configuration parameters may comprise the periodicity of the periodic resources. The second resource configuration parameters may comprise a second demodulation reference signal.

According to an embodiment, the utilization information may comprise a value indicating utilized resources of the periodic resources. According to an embodiment, the value may be a ratio of the utilized resources of the periodic resources to a total of the periodic resources. According to an embodiment, the first resource configuration parameters may further comprise a periodic resource index of the periodic resources. According to an embodiment, the periodic resources may be associated with a first cell.

According to an embodiment, the base station central unit may transmit, to the base station distributed unit, a fourth message comprising a first configuration parameter indicating the first wireless device employs the periodic resources. According to an embodiment, the base station central unit may transmit, to the base station distributed unit, a fifth message comprising a second configuration parameter indicating the second wireless device employs the periodic resources.

According to an embodiment, the base station central unit may determine that the second wireless device employs the periodic resources based on the utilization information.

According to an embodiment, the base station distributed unit may transmit to the second wireless device, a periodic resource activation control information indicating when the second wireless device is allowed to employ the periodic resources.

According to an embodiment, the utilization information may indicate a ratio of used periodic resources. According to an embodiment, the utilization information may indicate a percentage of used periodic resources. According to an embodiment, the utilization information may indicate a collision ratio of the periodic resources. According to an embodiment, the utilization information may indicate a time period considered for the utilization information. According to an embodiment, the utilization information may indicate a number of wireless devices activated to utilize the periodic resources.

According to an embodiment, the first resource configuration parameters and the second resource configuration parameters may further comprise a size of the periodic resources. According to an embodiment, the first resource configuration parameters and the second resource configuration parameters may further comprise a frequency offset of the periodic resource.

According to an embodiment, the base station central unit may send, to the base station distributed unit, a fourth message indicating a request for the utilization information of the periodic resources.

According to an embodiment, the fourth message may comprise a triggering condition for transmitting the utilization information. According to an embodiment, the fourth message may comprise a periodicity of reporting the utilization information.

Figure 52:
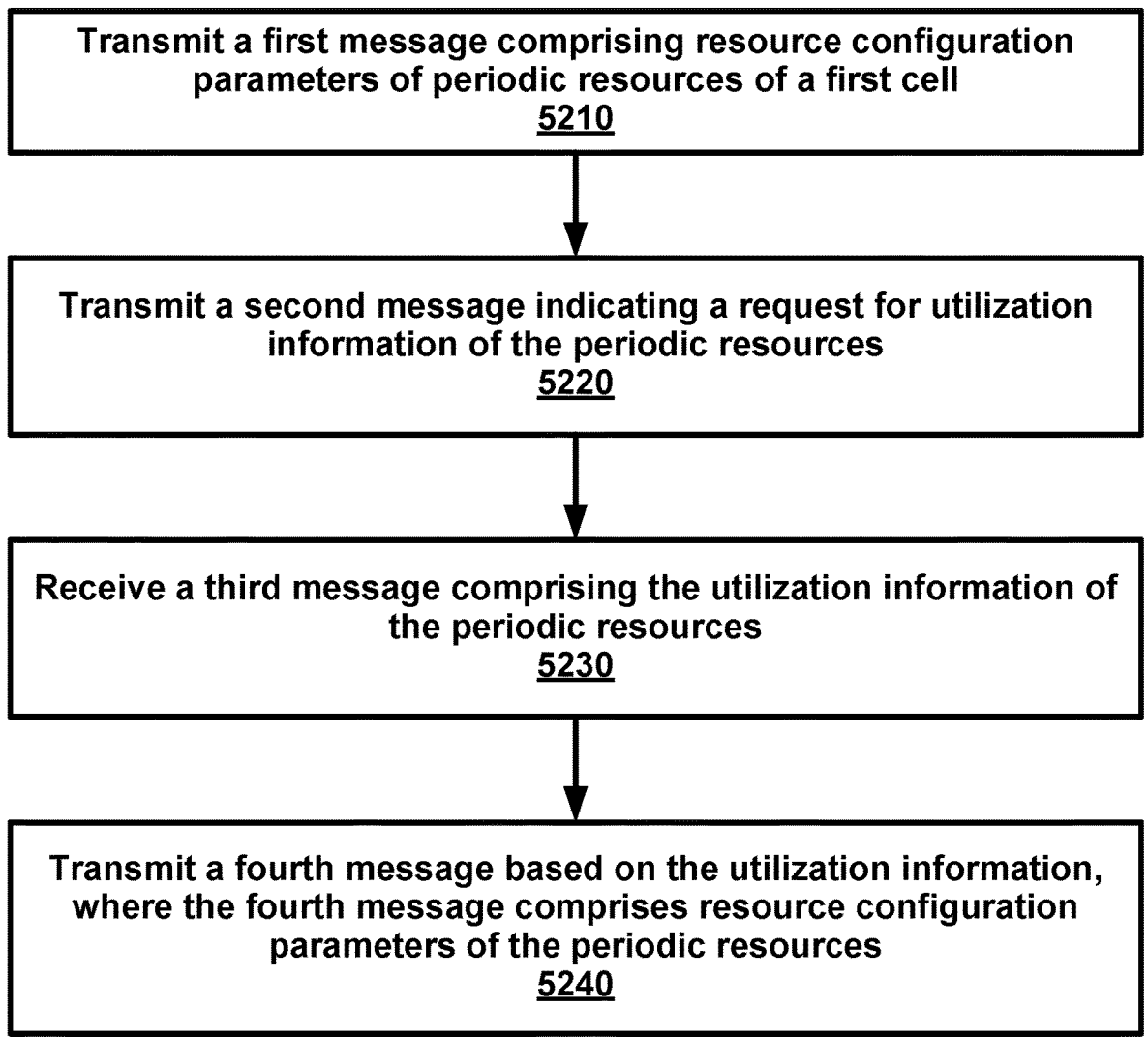
FIG. 52 is a flow diagram of an aspect of an embodiment of the present disclosure.

FIG. 52 is an example flow diagram as per an aspect of an embodiment of the present disclosure. At 5210, a base station central unit may transmit, to a first wireless device, a first message comprising resource configuration parameters of periodic resources of a first cell. At 5220, the base station central unit may transmit, to a base station distributed unit, a second message indicating a request for utilization information of the periodic resources. At 5230, the base station central unit may receive, from the base station distributed unit, a third message comprising the utilization information of the periodic resources. At 5240, the base station central unit may transmit, to the first wireless device and via the base station distributed unit, a fourth message based on the utilization information. The fourth message may comprise resource configuration parameters of the periodic resources.

According to an embodiment, the utilization information may comprise a first information element indicating a ratio of utilized resources of the periodic resources to a total of the periodic resources.

Figure 53:
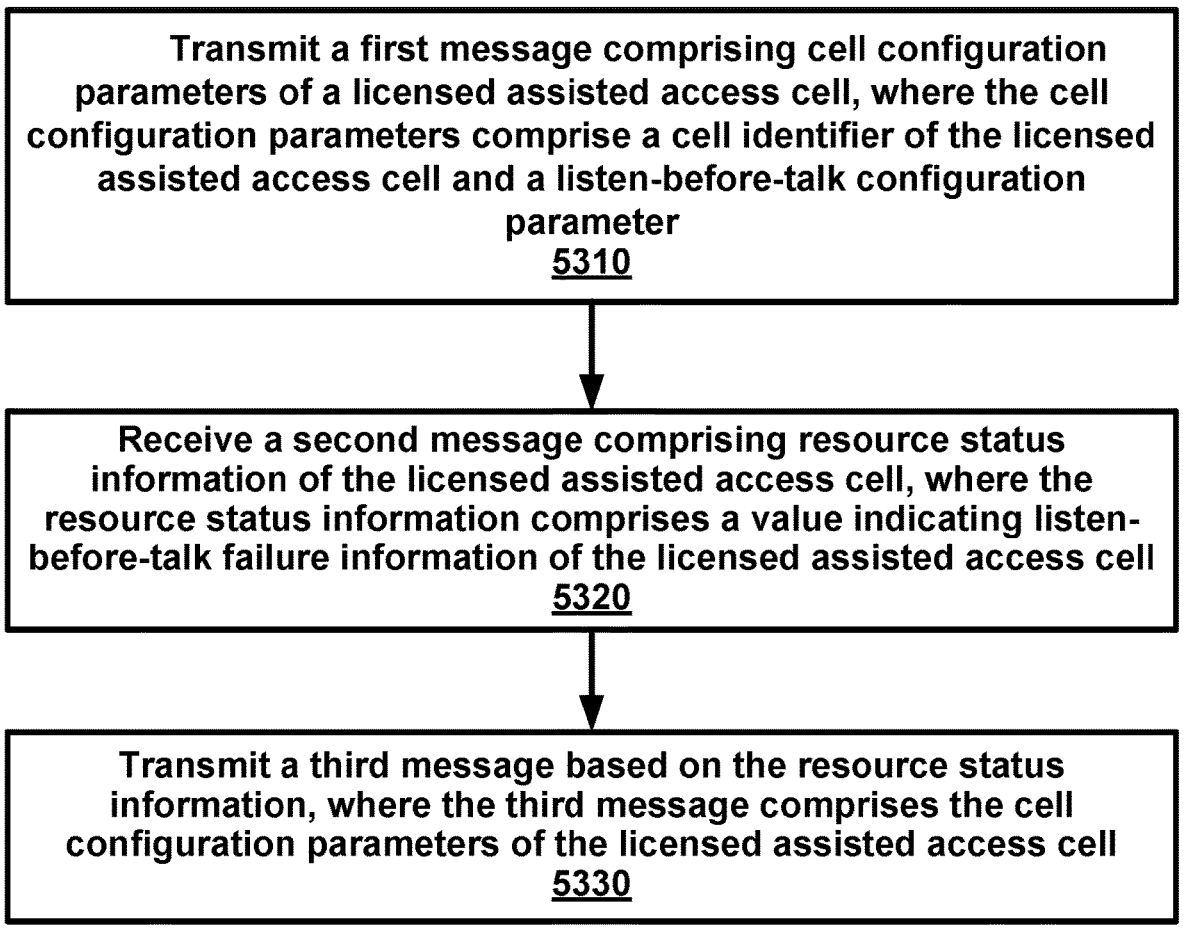
FIG. 53 is a flow diagram of an aspect of an embodiment of the present disclosure.

FIG. 53 is an example flow diagram as per an aspect of an embodiment of the present disclosure. At 5310, a base station central unit may transmit, to a first wireless device and via a base station distributed unit, a first message comprising cell configuration parameters of a licensed assisted access cell. The cell configuration parameters may comprise a cell identifier of the licensed assisted access cell. The cell configuration parameters may comprise a listen-before-talk configuration parameter. At 5320, the base station central unit may receive, from the base station distributed unit, a second message comprising resource status information of the licensed assisted access cell. The resource status information may comprise a value indicating listen-before-talk failure information of the licensed assisted access cell. At 5330, the base station central unit may transmit, to a second wireless device and via the base station distributed unit, a third message based on the resource status information. The third message may comprise the cell configuration parameters of the licensed assisted access cell.

According to an embodiment, the resource status information may indicate a listen-before-talk failure ratio. According to an embodiment, the resource status information may indicate a listen-before-talk success ratio. According to an embodiment, the resource status information may indicate a first information of physical resource block tried to be employed. According to an embodiment, the resource status information may indicate a second information of physical resource blocks failed to be employed. According to an embodiment, the resource status information may indicate a third information of physical resource blocks employed. According to an embodiment, the resource status information may indicate a contention level. According to an embodiment, the resource status information may indicate an average contention window size. According to an embodiment, the resource status information may indicate a current contention window size. According to an embodiment, the resource status information may indicate an information element indicating absence of other technology.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
  receiving, by a base station distributed unit from a base station central unit, packet data convergence protocol (PDCP) packets of a radio bearer established between a wireless device and the base station central unit;
  transmitting, by the base station distributed unit to the wireless device, the PDCP packets via a radio link;
  detecting, by the base station distributed unit, a radio link outage of the radio link;
  transmitting, by the base station distributed unit to the base station central unit, a first message comprising:
    a first information element indicating the radio link outage; and
    a cell identifier of a first cell associated with the radio link outage;
  receiving, by the base station distributed unit from the base station central unit, a second message indicating a release of a first wireless device context of the radio bearer; and
  releasing, by the base station distributed unit, the first wireless device context in response to the second message.

2. The method of claim 1, wherein the first message further comprises at least one of:
  a second information element indicating that a number of downlink packet retransmissions reaches a threshold number of downlink packet retransmissions;
  a third information element indicating at least one failure to receive a channel status information report from the wireless device;
  a fourth information element indicating expiration of a time duration without receiving at least one transport block from the wireless device;

a fifth information element indicating at least one failure to receive a precoding matrix indicator from the wireless device;
a sixth information element indicating at least on failure to receive a rank indicator from the wireless device; or
a seventh information element indicating a connection loss of the wireless device.

3. The method of claim 1, wherein the base station central unit determines a radio link failure of the wireless device based on the first message.

4. The method of claim 1, further comprising transmitting, by the base station central unit to a core network entity, a third message indicating a release request for a second wireless device context of the wireless device, wherein the second wireless device context comprises an interface connection between the base station central unit and the core network entity for the wireless device.

5. The method of claim 1, wherein the first wireless device context comprises at least one of:
a data radio bearer;
a logical channel;
a security configuration parameter; or
an information parameter associated with the wireless device.

6. The method of claim 1, wherein the second message comprises at least one of:
a wireless device identifier of the wireless device; or
a first information element indicating that a cause of the release of the first wireless device context is a radio link failure of the wireless device.

7. The method of claim 1, further comprising transmitting, by the base station distributed unit to the base station central unit, a third message indicating completion of the release of the first wireless device context.

8. A base station distributed unit comprising:
one or more processors; and
memory storing instructions that, when executed by the one or more processors, cause the base station distributed unit to:
receive, from a base station central unit, packet data convergence protocol (PDCP) packets of a radio bearer established between a wireless device and the base station central unit;
transmit, to the wireless device, the PDCP packets via a radio link;
detect a radio link outage of the radio link;
transmit, to the base station central unit, a first message comprising:
a first information element indicating the radio link outage; and
a cell identifier of a first cell associated with the radio link outage;
receive, from the base station central unit, a second message indicating a release of a first wireless device context of the radio bearer; and
release the first wireless device context in response to the second message.

9. The base station distributed unit of claim 8, wherein the first message further comprises at least one of:
a second information element indicating that a number of downlink packet retransmissions reaches a threshold number of downlink packet retransmissions;
a third information element indicating at least one failure to receive a channel status information report from the wireless device;
a fourth information element indicating expiration of a time duration without receiving at least one transport block from the wireless device;
a fifth information element indicating at least one failure to receive a precoding matrix indicator from the wireless device;
a sixth information element indicating at least on failure to receive a rank indicator from the wireless device; or
a seventh information element indicating a connection loss of the wireless device.

10. The base station distributed unit of claim 8, wherein the base station central unit determines a radio link failure of the wireless device based on the first message.

11. The base station distributed unit of claim 8, wherein the base station central unit transmits, to a core network entity, a third message indicating a release request for a second wireless device context of the wireless device, wherein the second wireless device context comprises an interface connection between the base station central unit and the core network entity for the wireless device.

12. The base station distributed unit of claim 8, wherein the first wireless device context comprises at least one of:
a data radio bearer;
a logical channel;
a security configuration parameter; or
an information parameter associated with the wireless device.

13. The base station distributed unit of claim 8, wherein the second message comprises at least one of:
a wireless device identifier of the wireless device; or
a first information element indicating that a cause of the release of the first wireless device context is a radio link failure of the wireless device.

14. The base station distributed unit of claim 8, wherein the instructions, when executed by the one or more processors, further cause the base station distributed unit to transmit, to the base station central unit, a third message indicating completion of the release of the first wireless device context.

15. A method comprising:
transmitting, by a base station central unit to a base station distributed unit, packet data convergence protocol (PDCP) packets of a radio bearer established between a wireless device and the base station central unit, wherein the base station distributed unit transmits the PDCP packets to the wireless device via a radio link;
receiving, by the base station central unit from the base station distributed unit, a first message comprising:
a first information element indicating a radio link outage of the radio link; and
a cell identifier of a first cell associated with the radio link outage;
transmitting, by the base station central unit to the base station distributed unit and in response to the first message, a second message indicating a release of a first wireless device context of the radio bearer of the wireless device.

16. The method of claim 15, further comprising releasing, by the base station distributed unit, the first wireless device context in response to the second message.

17. The method of claim 15, wherein the first message further comprises at least one of:
a second information element indicating that a number of downlink packet retransmissions reaches a threshold number of downlink packet retransmissions;

a third information element indicating at least one failure to receive a channel status information report from the wireless device;

a fourth information element indicating expiration of a time duration without receiving at least one transport block from the wireless device;

a fifth information element indicating at least one failure to receive a precoding matrix indicator from the wireless device;

a sixth information element indicating at least on failure to receive a rank indicator from the wireless device; or a seventh information element indicating a connection loss of the wireless device.

18. The method of claim 15, further comprising determining, by the base station central unit, a radio link failure of the wireless device based on the first message.

19. The method of claim 15, further comprising transmitting, by the base station central unit to a core network entity, a third message indicating a release request for a second wireless device context of the wireless device, wherein the second wireless device context comprises an interface connection between the base station central unit and the core network entity for the wireless device.

20. The method of claim 15, wherein the first wireless device context comprises at least one of:

a data radio bearer;

a logical channel;

a security configuration parameter; or an information parameter associated with the wireless device.

* * * * *